(12) United States Patent
Zaman et al.

(10) Patent No.: US 9,229,918 B2
(45) Date of Patent: *Jan. 5, 2016

(54) PRESENTING AN APPLICATION CHANGE THROUGH A TILE

(71) Applicant: Microsoft Technology Licensing, LLC, Redmond, WA (US)

(72) Inventors: Nazia Zaman, Kirkland, WA (US); Sean L. Flynn, North Bend, WA (US); Rebecca Deutsch, Seattle, WA (US); Chantal M. Leonard, Seattle, WA (US); Jesse Clay Satterfield, Seattle, WA (US); David A. Machaj, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/659,442

(22) Filed: Mar. 16, 2015

(65) Prior Publication Data

US 2015/0193403 A1 Jul. 9, 2015

Related U.S. Application Data

(63) Continuation of application No. 14/089,149, filed on Nov. 25, 2013, now Pat. No. 9,015,606, which is a continuation of application No. 12/977,584, filed on Dec. 23, 2010, now Pat. No. 8,612,874.

(51) Int. Cl.
*G06F 15/00* (2006.01)
*G06F 13/00* (2006.01)

(Continued)

(52) U.S. Cl.
CPC ............ *G06F 17/2247* (2013.01); *G06F 3/048* (2013.01); *G06F 3/04842* (2013.01)

(58) Field of Classification Search
CPC ....................................................... G06F 3/048
USPC ....................................................... 715/73–765
See application file for complete search history.

(56) References Cited

U.S. PATENT DOCUMENTS

| | | |
|---|---|---|
| 4,686,332 A | 8/1987 | Greanias et al. |
| 4,823,283 A | 4/1989 | Diehm et al. |

(Continued)

FOREIGN PATENT DOCUMENTS

| | | |
|---|---|---|
| CN | 1129889 | 8/1996 |
| CN | 1326564 | 12/2001 |

(Continued)

OTHER PUBLICATIONS

"Authoritative Dictionary of IEEE Standards Terms, 7th ed.", Definitions—processor, memory, and storage, 2000, 3 pages.

(Continued)

*Primary Examiner* — Kevin Nguyen
(74) *Attorney, Agent, or Firm* — Jim Banowsky; Kate Drakos; Micky Minhas

(57) ABSTRACT

This document describes techniques and apparatuses for presenting an application change through a tile. These techniques enable a user to see content associated with content changes to an application or other information about the application, such as a new article, new email, or a software update having become available since a user last visited the application. By so doing, the techniques enable a user to forgo visiting the application or permit the user to quickly and easily decide whether or not to visit the application.

20 Claims, 17 Drawing Sheets

(51) Int. Cl.
*G06F 17/22* (2006.01)
*G06F 3/048* (2013.01)
*G06F 3/0484* (2013.01)

(56) References Cited

U.S. PATENT DOCUMENTS

| | | | |
|---|---|---|---|
| 4,843,538 A | 6/1989 | Lane et al. | |
| 5,045,997 A | 9/1991 | Watanabe | |
| 5,046,001 A | 9/1991 | Barker et al. | |
| 5,189,732 A | 2/1993 | Kondo | |
| 5,231,578 A | 7/1993 | Levin et al. | |
| 5,237,647 A | 8/1993 | Roberts et al. | |
| 5,258,748 A | 11/1993 | Jones | |
| 5,297,032 A | 3/1994 | Trojan et al. | |
| 5,305,435 A | 4/1994 | Bronson | |
| 5,321,750 A | 6/1994 | Nadan | |
| 5,339,392 A | 8/1994 | Risberg et al. | |
| 5,351,995 A | 10/1994 | Booker et al. | |
| 5,406,307 A | 4/1995 | Hirayama et al. | |
| 5,432,932 A | 7/1995 | Chen et al. | |
| 5,463,725 A | 10/1995 | Henckel et al. | |
| 5,485,197 A | 1/1996 | Hoarty | |
| 5,487,143 A | 1/1996 | Southgate | |
| 5,490,241 A | 2/1996 | Mallgren et al. | |
| 5,491,783 A | 2/1996 | Douglas et al. | |
| 5,495,566 A | 2/1996 | Kwatinetz | |
| 5,497,776 A | 3/1996 | Yamazaki et al. | |
| 5,506,951 A | 4/1996 | Ishikawa | |
| 5,510,808 A | 4/1996 | Cina, Jr. et al. | |
| 5,511,148 A | 4/1996 | Wellner | |
| 5,515,495 A | 5/1996 | Ikemoto | |
| 5,555,369 A | 9/1996 | Menendez et al. | |
| 5,568,604 A | 10/1996 | Hansen | |
| 5,574,836 A | 11/1996 | Broemmelsiek | |
| 5,586,244 A | 12/1996 | Berry et al. | |
| 5,596,697 A | 1/1997 | Foster et al. | |
| 5,598,523 A | 1/1997 | Fujita | |
| 5,603,053 A | 2/1997 | Gough et al. | |
| 5,611,060 A | 3/1997 | Belfiore et al. | |
| 5,623,613 A | 4/1997 | Rowe et al. | |
| 5,640,176 A | 6/1997 | Mundt et al. | |
| 5,650,827 A | 7/1997 | Tsumori et al. | |
| 5,657,049 A | 8/1997 | Ludolph et al. | |
| 5,659,693 A | 8/1997 | Hansen | |
| 5,661,773 A | 8/1997 | Swerdloff et al. | |
| 5,664,128 A | 9/1997 | Bauer | |
| 5,675,329 A | 10/1997 | Barker | |
| 5,680,562 A | 10/1997 | Conrad et al. | |
| 5,687,331 A | 11/1997 | Volk et al. | |
| 5,694,150 A | 12/1997 | Sigona et al. | |
| 5,712,995 A | 1/1998 | Cohn | |
| 5,731,813 A | 3/1998 | O'Rourke et al. | |
| 5,740,389 A | 4/1998 | Li et al. | |
| 5,761,485 A | 6/1998 | Munyan | |
| 5,771,042 A | 6/1998 | Santos-Gomez | |
| 5,793,415 A | 8/1998 | Gregory et al. | |
| 5,817,019 A | 10/1998 | Kawashima | |
| 5,819,284 A | 10/1998 | Farber et al. | |
| 5,821,930 A | 10/1998 | Hansen | |
| 5,838,889 A | 11/1998 | Booker | |
| 5,844,547 A | 12/1998 | Minakuchi et al. | |
| 5,847,706 A | 12/1998 | Kingsley | |
| 5,859,636 A | 1/1999 | Pandit | |
| 5,860,073 A | 1/1999 | Ferrel et al. | |
| 5,867,799 A | 2/1999 | Lang et al. | |
| 5,880,725 A | 3/1999 | Southgate | |
| 5,889,517 A | 3/1999 | Ueda et al. | |
| 5,898,434 A | 4/1999 | Small et al. | |
| 5,905,492 A | 5/1999 | Straub et al. | |
| 5,914,720 A | 6/1999 | Maples et al. | |
| 5,940,076 A | 8/1999 | Sommers et al. | |
| 5,959,621 A | 9/1999 | Nawaz et al. | |
| 5,963,204 A | 10/1999 | Ikeda et al. | |
| 5,969,720 A | 10/1999 | Lisle et al. | |
| 6,008,809 A | 12/1999 | Brooks | |
| 6,008,816 A | 12/1999 | Eisler et al. | |
| 6,009,519 A | 12/1999 | Jones et al. | |
| 6,011,542 A | 1/2000 | Durrani et al. | |
| 6,016,145 A | 1/2000 | Horvitz et al. | |
| 6,028,600 A | 2/2000 | Rosin et al. | |
| 6,037,937 A | 3/2000 | Beaton et al. | |
| 6,057,839 A | 5/2000 | Advani et al. | |
| 6,061,061 A | 5/2000 | Conrad et al. | |
| 6,064,383 A | 5/2000 | Skelly | |
| 6,072,476 A | 6/2000 | Harada et al. | |
| 6,097,392 A | 8/2000 | Leyerle | |
| 6,104,418 A | 8/2000 | Tanaka et al. | |
| 6,108,003 A | 8/2000 | Hall, Jr. et al. | |
| 6,111,585 A | 8/2000 | Choi | |
| 6,115,040 A | 9/2000 | Bladow et al. | |
| 6,115,724 A | 9/2000 | Booker | |
| 6,163,749 A | 12/2000 | McDonough et al. | |
| 6,166,736 A | 12/2000 | Hugh | |
| 6,167,439 A | 12/2000 | Levine et al. | |
| 6,188,405 B1 | 2/2001 | Czerwinski et al. | |
| 6,211,921 B1 | 4/2001 | Cherian et al. | |
| 6,212,564 B1 | 4/2001 | Harter et al. | |
| 6,216,141 B1 * | 4/2001 | Straub et al. | 715/234 |
| 6,239,798 B1 | 5/2001 | Ludolph et al. | |
| 6,266,098 B1 | 7/2001 | Cove et al. | |
| 6,278,448 B1 | 8/2001 | Brown et al. | |
| 6,281,940 B1 | 8/2001 | Sciammarella | |
| 6,310,610 B1 | 10/2001 | Beaton et al. | |
| 6,311,058 B1 | 10/2001 | Wecker et al. | |
| 6,313,854 B1 | 11/2001 | Gibson | |
| 6,340,979 B1 | 1/2002 | Beaton et al. | |
| 6,346,935 B1 | 2/2002 | Nakajima et al. | |
| 6,369,837 B1 | 4/2002 | Schirmer | |
| 6,385,630 B1 | 5/2002 | Ejerhed | |
| 6,396,963 B2 | 5/2002 | Shaffer et al. | |
| 6,411,307 B1 | 6/2002 | Rosin et al. | |
| 6,424,338 B1 | 7/2002 | Andersone | |
| 6,426,753 B1 | 7/2002 | Migdal | |
| 6,433,789 B1 | 8/2002 | Rosman | |
| 6,448,987 B1 | 9/2002 | Easty et al. | |
| 6,449,638 B1 | 9/2002 | Wecker et al. | |
| 6,456,334 B1 | 9/2002 | Duhault | |
| 6,489,977 B2 | 12/2002 | Sone | |
| 6,505,243 B1 | 1/2003 | Lortz | |
| 6,507,352 B1 | 1/2003 | Cohen et al. | |
| 6,507,643 B1 | 1/2003 | Groner | |
| 6,510,144 B1 | 1/2003 | Dommety et al. | |
| 6,510,466 B1 | 1/2003 | Cox et al. | |
| 6,510,553 B1 | 1/2003 | Hazra | |
| 6,525,749 B1 | 2/2003 | Moran et al. | |
| 6,538,635 B1 | 3/2003 | Ringot | |
| 6,545,669 B1 | 4/2003 | Kinawi et al. | |
| 6,570,582 B1 | 5/2003 | Sciammarella et al. | |
| 6,570,597 B1 | 5/2003 | Seki et al. | |
| 6,577,323 B1 | 6/2003 | Jamieson et al. | |
| 6,577,350 B1 | 6/2003 | Proehl et al. | |
| 6,591,244 B2 | 7/2003 | Jim et al. | |
| 6,597,374 B1 | 7/2003 | Baker et al. | |
| 6,628,309 B1 | 9/2003 | Dodson et al. | |
| 6,636,246 B1 | 10/2003 | Gallo et al. | |
| 6,658,147 B2 | 12/2003 | Gorbatov et al. | |
| 6,661,436 B2 | 12/2003 | Barksdale et al. | |
| 6,662,023 B1 | 12/2003 | Helle | |
| 6,675,387 B1 | 1/2004 | Boucher et al. | |
| 6,690,387 B2 | 2/2004 | Zimmerman et al. | |
| 6,697,825 B1 | 2/2004 | Underwood et al. | |
| 6,707,449 B2 | 3/2004 | Hinckley et al. | |
| 6,710,771 B1 | 3/2004 | Yamaguchi et al. | |
| 6,721,958 B1 | 4/2004 | Dureau | |
| 6,724,403 B1 | 4/2004 | Santoro et al. | |
| 6,727,892 B1 | 4/2004 | Murphy | |
| 6,784,925 B1 | 8/2004 | Tomat et al. | |
| 6,798,421 B2 | 9/2004 | Baldwin | |
| 6,798,649 B1 | 9/2004 | Olodort | |
| 6,801,203 B1 | 10/2004 | Hussain | |
| 6,807,558 B1 | 10/2004 | Hassett et al. | |
| 6,832,355 B1 | 12/2004 | Duperrouzel et al. | |
| 6,857,104 B1 | 2/2005 | Cahn | |
| 6,859,909 B1 | 2/2005 | Lerner et al. | |

(56) References Cited

U.S. PATENT DOCUMENTS

| | | | |
|---|---|---|---|
| 6,865,297 B2 | 3/2005 | Loui |
| 6,873,329 B2 | 3/2005 | Cohen et al. |
| 6,876,312 B2 | 4/2005 | Yu |
| 6,885,974 B2 | 4/2005 | Holle |
| 6,904,597 B2 | 6/2005 | Jin |
| 6,920,445 B2 | 7/2005 | Bae |
| 6,920,619 B1 | 7/2005 | Milekic |
| 6,938,101 B2 | 8/2005 | Hayes et al. |
| 6,961,731 B2 | 11/2005 | Holbrook |
| 6,971,067 B1 | 11/2005 | Karson et al. |
| 6,972,776 B2 | 12/2005 | Davis et al. |
| 6,975,306 B2 | 12/2005 | Hinckley et al. |
| 6,976,210 B1 | 12/2005 | Silva et al. |
| 6,978,303 B1 | 12/2005 | McCreesh et al. |
| 6,983,310 B2 | 1/2006 | Rouse |
| 6,987,991 B2 | 1/2006 | Nelson |
| 7,013,041 B2 | 3/2006 | Miyamoto |
| 7,017,119 B1 | 3/2006 | Johnston et al. |
| 7,019,757 B2 | 3/2006 | Brown et al. |
| 7,028,264 B2 | 4/2006 | Santoro et al. |
| 7,032,187 B2 | 4/2006 | Keely, Jr. et al. |
| 7,036,090 B1 | 4/2006 | Nguyen |
| 7,036,091 B1 | 4/2006 | Nguyen |
| 7,042,460 B2 | 5/2006 | Hussain et al. |
| 7,051,291 B2 | 5/2006 | Sciammarella et al. |
| 7,058,955 B2 | 6/2006 | Porkka |
| 7,065,385 B2 | 6/2006 | Jarrad et al. |
| 7,065,386 B1 | 6/2006 | Smethers |
| 7,075,535 B2 | 7/2006 | Aguera y Arcas |
| 7,089,507 B2 | 8/2006 | Lection et al. |
| 7,091,998 B2 | 8/2006 | Miller-Smith |
| 7,093,201 B2 | 8/2006 | Duarte |
| 7,106,349 B2 | 9/2006 | Baar et al. |
| 7,111,044 B2 | 9/2006 | Lee |
| 7,133,707 B1 | 11/2006 | Rak et al. |
| 7,133,859 B1 | 11/2006 | Wong |
| 7,139,800 B2 | 11/2006 | Bellotti et al. |
| 7,146,573 B2 | 12/2006 | Brown et al. |
| 7,155,729 B1 | 12/2006 | Andrew et al. |
| 7,158,123 B2 | 1/2007 | Myers et al. |
| 7,158,135 B2 | 1/2007 | Santodomingo et al. |
| 7,178,111 B2 | 2/2007 | Glein et al. |
| 7,180,527 B2 | 2/2007 | Sakai et al. |
| 7,181,699 B2 | 2/2007 | Morrow et al. |
| 7,194,506 B1 | 3/2007 | White et al. |
| 7,197,702 B2 | 3/2007 | Niyogi et al. |
| 7,210,099 B2 | 4/2007 | Rohrabaugh et al. |
| 7,216,588 B2 | 5/2007 | Suess |
| 7,249,326 B2 | 7/2007 | Stoakley et al. |
| 7,251,782 B1 | 7/2007 | Albers |
| 7,262,775 B2 | 8/2007 | Calkins et al. |
| 7,263,668 B1 | 8/2007 | Lentz |
| 7,277,924 B1 | 10/2007 | Wichmann et al. |
| 7,280,097 B2 | 10/2007 | Chen |
| 7,283,620 B2 | 10/2007 | Adamczyk |
| 7,289,806 B2 | 10/2007 | Morris et al. |
| 7,296,184 B2 | 11/2007 | Derks et al. |
| 7,296,242 B2 | 11/2007 | Agata et al. |
| 7,304,638 B2 | 12/2007 | Murphy |
| 7,310,100 B2 | 12/2007 | Hussain |
| 7,333,092 B2 | 2/2008 | Zadesky et al. |
| 7,333,120 B2 | 2/2008 | Venolia |
| 7,336,263 B2 | 2/2008 | Valikangas |
| 7,343,567 B2 | 3/2008 | Mann et al. |
| 7,348,965 B2 | 3/2008 | Itoh |
| 7,369,647 B2 | 5/2008 | Gao et al. |
| 7,376,907 B2 * | 5/2008 | Santoro et al. ............ 715/765 |
| 7,386,807 B2 | 6/2008 | Cummins et al. |
| 7,388,578 B2 | 6/2008 | Tao |
| 7,403,191 B2 | 7/2008 | Sinclair |
| 7,404,147 B2 | 7/2008 | Bell et al. |
| 7,408,538 B2 | 8/2008 | Hinckley et al. |
| 7,409,646 B2 | 8/2008 | Vedbrat et al. |
| 7,412,663 B2 | 8/2008 | Lindsay et al. |
| 7,433,920 B2 | 10/2008 | Blagsvedt et al. |
| 7,437,678 B2 | 10/2008 | Awada et al. |
| 7,447,520 B2 | 11/2008 | Scott |
| 7,454,717 B2 | 11/2008 | Hinckley et al. |
| 7,461,151 B2 | 12/2008 | Colson et al. |
| 7,469,380 B2 | 12/2008 | Wessling et al. |
| 7,469,381 B2 | 12/2008 | Ording |
| 7,478,326 B2 | 1/2009 | Holecek et al. |
| 7,479,949 B2 | 1/2009 | Jobs |
| 7,480,870 B2 | 1/2009 | Anzures |
| 7,483,418 B2 | 1/2009 | Maurer |
| 7,484,182 B1 | 1/2009 | Smith |
| 7,487,467 B1 | 2/2009 | Kawahara et al. |
| 7,496,830 B2 | 2/2009 | Rubin et al. |
| 7,500,175 B2 | 3/2009 | Colle et al. |
| 7,506,269 B2 | 3/2009 | Lang |
| 7,512,966 B2 | 3/2009 | Lyons, Jr. et al. |
| 7,532,196 B2 | 5/2009 | Hinckley |
| 7,549,131 B2 | 6/2009 | Lengeling et al. |
| 7,577,918 B2 | 8/2009 | Lindsay |
| 7,581,034 B2 | 8/2009 | Polivy et al. |
| 7,593,995 B1 | 9/2009 | He et al. |
| 7,595,810 B2 | 9/2009 | Louch |
| 7,599,790 B2 | 10/2009 | Rasmussen et al. |
| 7,600,189 B2 | 10/2009 | Fujisawa |
| 7,600,234 B2 | 10/2009 | Dobrowski et al. |
| 7,606,714 B2 | 10/2009 | Williams et al. |
| 7,607,096 B2 | 10/2009 | Oreizy et al. |
| 7,607,106 B2 | 10/2009 | Ernst et al. |
| 7,610,563 B2 | 10/2009 | Nelson et al. |
| 7,614,018 B1 | 11/2009 | Ohazama et al. |
| 7,619,615 B1 | 11/2009 | Donoghue |
| 7,636,071 B2 | 12/2009 | O'Gorman |
| 7,640,518 B2 | 12/2009 | Forlines et al. |
| 7,644,361 B2 | 1/2010 | Wu et al. |
| 7,653,883 B2 | 1/2010 | Hotelling et al. |
| 7,656,393 B2 | 2/2010 | King et al. |
| 7,657,849 B2 | 2/2010 | Chaudhri et al. |
| 7,663,607 B2 | 2/2010 | Hotelling et al. |
| 7,664,067 B2 | 2/2010 | Pointer |
| 7,669,140 B2 | 2/2010 | Matthews et al. |
| 7,671,756 B2 | 3/2010 | Herz et al. |
| 7,676,767 B2 | 3/2010 | Hofmeister et al. |
| 7,681,138 B2 | 3/2010 | Grasser et al. |
| 7,689,916 B1 | 3/2010 | Goel et al. |
| 7,694,221 B2 | 4/2010 | Fortes |
| 7,702,683 B1 | 4/2010 | Kirshenbaum |
| 7,730,425 B2 | 6/2010 | de los Reyes et al. |
| 7,746,388 B2 | 6/2010 | Jeon |
| 7,755,674 B2 | 7/2010 | Kaminaga |
| 7,760,187 B2 | 7/2010 | Kennedy |
| 7,765,490 B2 | 7/2010 | Lai et al. |
| 7,774,366 B2 | 8/2010 | Fisher et al. |
| 7,792,925 B1 | 9/2010 | Werner et al. |
| 7,821,780 B2 | 10/2010 | Choy |
| 7,834,861 B2 | 11/2010 | Lee |
| 7,840,979 B2 | 11/2010 | Poling et al. |
| 7,844,915 B2 | 11/2010 | Platzer et al. |
| D631,043 S | 1/2011 | Kell |
| 7,877,707 B2 | 1/2011 | Westerman et al. |
| 7,880,728 B2 | 2/2011 | De Los Reyes et al. |
| 7,889,180 B2 | 2/2011 | Byun et al. |
| 7,890,882 B1 | 2/2011 | Nelson |
| 7,895,309 B2 | 2/2011 | Belali et al. |
| 7,898,529 B2 | 3/2011 | Fitzmaurice et al. |
| 7,903,115 B2 | 3/2011 | Platzer et al. |
| 7,904,832 B2 | 3/2011 | Ubillos |
| 7,924,271 B2 | 4/2011 | Christie |
| 7,933,632 B2 | 4/2011 | Flynt et al. |
| 7,956,847 B2 | 6/2011 | Christie |
| 7,962,281 B2 | 6/2011 | Rasmussen et al. |
| 7,983,718 B1 | 7/2011 | Roka |
| 7,987,431 B2 | 7/2011 | Santoro et al. |
| 7,996,045 B1 | 8/2011 | Bauer et al. |
| 8,006,276 B2 | 8/2011 | Nakagawa et al. |
| 8,028,239 B1 | 9/2011 | Al-Hilali et al. |
| 8,050,030 B2 | 11/2011 | Wu et al. |
| 8,065,628 B2 | 11/2011 | Oshiro et al. |
| 8,086,275 B2 | 12/2011 | Wykes |
| 8,102,858 B1 | 1/2012 | Rahim et al. |

(56) References Cited

U.S. PATENT DOCUMENTS

| | | |
|---|---|---|
| 8,108,781 B2 | 1/2012 | Laansoo et al. |
| 8,126,865 B1 | 2/2012 | Bharat et al. |
| 8,131,808 B2 | 3/2012 | Aoki et al. |
| 8,134,727 B1 | 3/2012 | Shmunis et al. |
| 8,140,993 B2 | 3/2012 | Balasubramanian |
| 8,150,924 B2 | 4/2012 | Buchheit et al. |
| 8,171,431 B2 | 5/2012 | Grossman et al. |
| 8,175,653 B2 | 5/2012 | Smuga |
| 8,176,436 B2 | 5/2012 | Arend et al. |
| 8,176,438 B2 | 5/2012 | Zaman et al. |
| 8,190,707 B2 | 5/2012 | Trivedi et al. |
| 8,209,623 B2 | 6/2012 | Barletta et al. |
| 8,212,788 B2 | 7/2012 | Lam |
| 8,225,193 B1 | 7/2012 | Kleinschnitz et al. |
| 8,238,876 B2 | 8/2012 | Teng |
| 8,239,785 B2 | 8/2012 | Hinckley |
| 8,245,152 B2 | 8/2012 | Brunner et al. |
| 8,245,156 B2 | 8/2012 | Mouilleseaux et al. |
| 8,250,494 B2 | 8/2012 | Butcher |
| 8,255,473 B2 | 8/2012 | Eren et al. |
| 8,255,812 B1 | 8/2012 | Parparita et al. |
| 8,255,818 B2 | 8/2012 | Bales et al. |
| 8,259,437 B2 | 9/2012 | Vesely |
| 8,261,213 B2 | 9/2012 | Hinckley |
| 8,266,550 B1 | 9/2012 | Cleron et al. |
| 8,269,736 B2 | 9/2012 | Wilairat |
| 8,272,104 B2 | 9/2012 | Chen et al. |
| 8,279,241 B2 | 10/2012 | Fong |
| 8,280,901 B2 | 10/2012 | McDonald |
| 8,289,688 B2 | 10/2012 | Behar et al. |
| 8,290,926 B2 | 10/2012 | Ozzie et al. |
| 8,291,344 B2 | 10/2012 | Chaudhri |
| 8,294,669 B2 | 10/2012 | Partridge et al. |
| 8,300,392 B2 | 10/2012 | Weng |
| 8,307,279 B1 | 11/2012 | Fioravanti et al. |
| 8,312,383 B2 | 11/2012 | Gilfix |
| 8,327,295 B2 | 12/2012 | Ikeda et al. |
| 8,334,871 B2 | 12/2012 | Hamilton et al. |
| 8,355,698 B2 | 1/2013 | Teng et al. |
| 8,384,726 B1 | 2/2013 | Grabowski et al. |
| 8,385,952 B2 | 2/2013 | Friedman et al. |
| 8,411,046 B2 | 4/2013 | Kruzeniski et al. |
| 8,429,565 B2 | 4/2013 | Agarawala et al. |
| 8,434,019 B2 | 4/2013 | Nelson |
| 8,448,083 B1 | 5/2013 | Migos et al. |
| 8,453,056 B2 | 5/2013 | Gupta et al. |
| 8,473,870 B2 | 6/2013 | Hinckley et al. |
| 8,473,871 B1 | 6/2013 | Sandler et al. |
| 8,493,510 B2 | 7/2013 | Bryan et al. |
| 8,504,936 B2 | 8/2013 | Gimpl et al. |
| 8,525,808 B1 | 9/2013 | Buening |
| 8,527,892 B2 | 9/2013 | Sirpal et al. |
| 8,539,384 B2 | 9/2013 | Hinckley et al. |
| 8,548,431 B2 | 10/2013 | Teng et al. |
| 8,549,430 B2 | 10/2013 | Russell et al. |
| 8,549,432 B2 | 10/2013 | Warner |
| 8,560,959 B2 | 10/2013 | Zaman et al. |
| 8,566,100 B2 | 10/2013 | Verna et al. |
| 8,584,150 B2 | 11/2013 | Wallace |
| 8,589,815 B2 | 11/2013 | Fong et al. |
| 8,595,642 B1 | 11/2013 | Lagassey |
| 8,612,874 B2 | 12/2013 | Zaman et al. |
| 8,615,707 B2 | 12/2013 | Fortuna et al. |
| 8,615,713 B2 | 12/2013 | Sun et al. |
| 8,624,933 B2 | 1/2014 | Marr et al. |
| 8,627,227 B2 | 1/2014 | Matthews et al. |
| 8,627,228 B2 | 1/2014 | Yosef et al. |
| 8,639,819 B2 | 1/2014 | Pohja et al. |
| 8,665,272 B2 | 3/2014 | Fitzmaurice et al. |
| 8,669,950 B2 | 3/2014 | Forstall et al. |
| 8,687,023 B2 | 4/2014 | Markiewicz et al. |
| 8,689,123 B2 | 4/2014 | Zaman et al. |
| 8,698,845 B2 | 4/2014 | Lemay |
| 8,701,000 B2 | 4/2014 | Kroeger et al. |
| 8,706,515 B2 | 4/2014 | Cobbs et al. |
| 8,713,463 B2 | 4/2014 | Kim et al. |
| 8,769,427 B2 | 7/2014 | Raman et al. |
| 8,769,431 B1 | 7/2014 | Prasad |
| 8,826,181 B2 | 9/2014 | Mouilleseaux et al. |
| 8,830,270 B2 | 9/2014 | Zaman et al. |
| 8,836,648 B2 | 9/2014 | Wilairat |
| 8,893,033 B2 | 11/2014 | Donahue et al. |
| 8,922,575 B2 | 12/2014 | Garside et al. |
| 8,933,952 B2 | 1/2015 | Zaman et al. |
| 8,935,631 B2 | 1/2015 | Leonard et al. |
| 8,990,733 B2 | 3/2015 | Deutsch et al. |
| 8,994,697 B2 | 3/2015 | Lin et al. |
| 9,015,606 B2 | 4/2015 | Zaman et al. |
| 9,052,820 B2 | 6/2015 | Jarrett et al. |
| 9,092,132 B2 | 7/2015 | Migos et al. |
| 9,098,186 B1 | 8/2015 | Worley et al. |
| 9,104,307 B2 | 8/2015 | Jarrett et al. |
| 9,104,440 B2 | 8/2015 | Jarrett et al. |
| 9,141,262 B2 | 9/2015 | Nan et al. |
| 9,146,670 B2 | 9/2015 | Zaman et al. |
| 9,158,445 B2 | 10/2015 | Wong et al. |
| 2001/0012000 A1 | 8/2001 | Eberhard |
| 2001/0022621 A1 | 9/2001 | Squibbs |
| 2001/0047263 A1 | 11/2001 | Smith et al. |
| 2002/0000963 A1 | 1/2002 | Yoshida et al. |
| 2002/0018051 A1 | 2/2002 | Singh |
| 2002/0026524 A1 | 2/2002 | Dharap |
| 2002/0035607 A1 | 3/2002 | Checkoway |
| 2002/0054117 A1 | 5/2002 | van Dantzich et al. |
| 2002/0060701 A1 | 5/2002 | Naughton et al. |
| 2002/0070961 A1 | 6/2002 | Xu et al. |
| 2002/0077156 A1 | 6/2002 | Smethers |
| 2002/0083025 A1 | 6/2002 | Robarts et al. |
| 2002/0091755 A1 | 7/2002 | Narin |
| 2002/0097229 A1 | 7/2002 | Rose et al. |
| 2002/0097264 A1 | 7/2002 | Dutta et al. |
| 2002/0101457 A1 | 8/2002 | Lang |
| 2002/0105531 A1 | 8/2002 | Niemi |
| 2002/0105553 A1 | 8/2002 | Segre |
| 2002/0115476 A1 | 8/2002 | Padawer et al. |
| 2002/0116421 A1 | 8/2002 | Fox et al. |
| 2002/0128036 A1 | 9/2002 | Yach et al. |
| 2002/0129061 A1 | 9/2002 | Swart et al. |
| 2002/0138248 A1 | 9/2002 | Corston-Oliver et al. |
| 2002/0142762 A1 | 10/2002 | Chmaytelli et al. |
| 2002/0145631 A1 | 10/2002 | Arbab et al. |
| 2002/0149622 A1 | 10/2002 | Uesaki et al. |
| 2002/0152305 A1 | 10/2002 | Jackson et al. |
| 2002/0154176 A1 | 10/2002 | Barksdale et al. |
| 2002/0158838 A1 | 10/2002 | Smith et al. |
| 2002/0161634 A1 | 10/2002 | Kaars |
| 2002/0165923 A1 | 11/2002 | Prince |
| 2002/0186251 A1 | 12/2002 | Himmel et al. |
| 2002/0191028 A1 | 12/2002 | Senechalle et al. |
| 2002/0194385 A1 | 12/2002 | Linder et al. |
| 2003/0003899 A1 | 1/2003 | Tashiro et al. |
| 2003/0008686 A1 | 1/2003 | Park et al. |
| 2003/0011643 A1 | 1/2003 | Nishihata |
| 2003/0020671 A1 | 1/2003 | Santoro et al. |
| 2003/0040300 A1 | 2/2003 | Bodic |
| 2003/0046396 A1 | 3/2003 | Richter et al. |
| 2003/0052900 A1 | 3/2003 | Card et al. |
| 2003/0073414 A1 | 4/2003 | Capps |
| 2003/0096604 A1 | 5/2003 | Vollandt |
| 2003/0098858 A1 | 5/2003 | Perski et al. |
| 2003/0105827 A1 | 6/2003 | Tan et al. |
| 2003/0107604 A1 | 6/2003 | Ording |
| 2003/0135582 A1 | 7/2003 | Allen et al. |
| 2003/0179541 A1 | 9/2003 | Sullivan |
| 2003/0187996 A1 | 10/2003 | Cardina et al. |
| 2003/0222907 A1 | 12/2003 | Heikes et al. |
| 2003/0225846 A1 | 12/2003 | Heikes et al. |
| 2003/0231219 A1 | 12/2003 | Leung |
| 2003/0234799 A1 | 12/2003 | Lee |
| 2004/0015553 A1 | 1/2004 | Griffin et al. |
| 2004/0066414 A1 | 4/2004 | Czerwinski et al. |
| 2004/0066418 A1 | 4/2004 | Tosey |
| 2004/0068543 A1 | 4/2004 | Seifert |
| 2004/0078299 A1 | 4/2004 | Down-Logan |

(56) References Cited

U.S. PATENT DOCUMENTS

| | | |
|---|---|---|
| 2004/0111673 A1 | 6/2004 | Bowman et al. |
| 2004/0155908 A1 | 8/2004 | Wagner |
| 2004/0165010 A1 | 8/2004 | Robertson et al. |
| 2004/0174396 A1 | 9/2004 | Jobs et al. |
| 2004/0185883 A1 | 9/2004 | Rukman |
| 2004/0212586 A1 | 10/2004 | Denny |
| 2004/0212605 A1 | 10/2004 | Fitzmaurice et al. |
| 2004/0212617 A1 | 10/2004 | Fitzmaurice et al. |
| 2004/0217954 A1 | 11/2004 | O'Gorman et al. |
| 2004/0217980 A1 | 11/2004 | Radburn et al. |
| 2004/0236774 A1 | 11/2004 | Baird et al. |
| 2004/0237048 A1 | 11/2004 | Tojo et al. |
| 2004/0250217 A1 | 12/2004 | Tojo et al. |
| 2004/0255254 A1 | 12/2004 | Weingart et al. |
| 2004/0266491 A1 | 12/2004 | Howard et al. |
| 2005/0005241 A1 | 1/2005 | Hunleth et al. |
| 2005/0012723 A1 | 1/2005 | Pallakoff |
| 2005/0028208 A1 | 2/2005 | Ellis |
| 2005/0044058 A1 | 2/2005 | Matthews et al. |
| 2005/0050462 A1 | 3/2005 | Whittle et al. |
| 2005/0054384 A1 | 3/2005 | Pasquale et al. |
| 2005/0058353 A1 | 3/2005 | Matsubara |
| 2005/0060647 A1 | 3/2005 | Doan et al. |
| 2005/0060658 A1 | 3/2005 | Tsukiori |
| 2005/0060663 A1 | 3/2005 | Arkeketa et al. |
| 2005/0060665 A1 | 3/2005 | Rekimoto |
| 2005/0079896 A1 | 4/2005 | Kokko et al. |
| 2005/0081155 A1 | 4/2005 | Martin et al. |
| 2005/0085215 A1 | 4/2005 | Kokko |
| 2005/0085272 A1 | 4/2005 | Anderson et al. |
| 2005/0091612 A1 | 4/2005 | Stabb et al. |
| 2005/0101864 A1 | 5/2005 | Zheng et al. |
| 2005/0108655 A1 | 5/2005 | Andrea et al. |
| 2005/0114778 A1 | 5/2005 | Branson et al. |
| 2005/0114788 A1 | 5/2005 | Fabritius |
| 2005/0120306 A1 | 6/2005 | Klassen et al. |
| 2005/0125736 A1 | 6/2005 | Ferri et al. |
| 2005/0125739 A1 | 6/2005 | Thompson et al. |
| 2005/0129314 A1 | 6/2005 | Chen |
| 2005/0136953 A1 | 6/2005 | Jo |
| 2005/0143138 A1 | 6/2005 | Lee et al. |
| 2005/0149879 A1 | 7/2005 | Jobs et al. |
| 2005/0156947 A1 | 7/2005 | Sakai et al. |
| 2005/0182798 A1 | 8/2005 | Todd et al. |
| 2005/0183021 A1 | 8/2005 | Allen et al. |
| 2005/0184973 A1 | 8/2005 | Lum et al. |
| 2005/0184999 A1 | 8/2005 | Daioku |
| 2005/0198159 A1 | 9/2005 | Kirsch |
| 2005/0198584 A1 | 9/2005 | Matthews et al. |
| 2005/0198592 A1 | 9/2005 | Keely, Jr. et al. |
| 2005/0200762 A1 | 9/2005 | Barletta et al. |
| 2005/0207734 A1 | 9/2005 | Howell et al. |
| 2005/0216300 A1 | 9/2005 | Appelman et al. |
| 2005/0223057 A1 | 10/2005 | Buchheit et al. |
| 2005/0223069 A1 | 10/2005 | Cooperman et al. |
| 2005/0232166 A1 | 10/2005 | Nierhaus |
| 2005/0250547 A1 | 11/2005 | Salman et al. |
| 2005/0268237 A1 | 12/2005 | Crane et al. |
| 2005/0273614 A1 | 12/2005 | Ahuja |
| 2005/0280719 A1 | 12/2005 | Kim |
| 2006/0001650 A1 | 1/2006 | Robbins et al. |
| 2006/0004685 A1 | 1/2006 | Pyhalammi et al. |
| 2006/0005207 A1 | 1/2006 | Louch et al. |
| 2006/0010371 A1 | 1/2006 | Shur et al. |
| 2006/0010394 A1 | 1/2006 | Chaudhri et al. |
| 2006/0012580 A1 | 1/2006 | Perski et al. |
| 2006/0015562 A1 | 1/2006 | Kilian-Kehr et al. |
| 2006/0015736 A1 | 1/2006 | Callas et al. |
| 2006/0015812 A1 | 1/2006 | Cunningham |
| 2006/0015820 A1 | 1/2006 | Wood |
| 2006/0022955 A1 | 2/2006 | Kennedy |
| 2006/0026013 A1 | 2/2006 | Kraft |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0031786 A1 | 2/2006 | Hillis et al. |
| 2006/0036425 A1 | 2/2006 | Le Cocq et al. |
| 2006/0048073 A1 | 3/2006 | Jarrett et al. |
| 2006/0048101 A1 | 3/2006 | Krassovsky et al. |
| 2006/0055670 A1 | 3/2006 | Castrucci |
| 2006/0059430 A1 | 3/2006 | Bells et al. |
| 2006/0061597 A1 | 3/2006 | Hui |
| 2006/0070005 A1 | 3/2006 | Gilbert et al. |
| 2006/0074735 A1 | 4/2006 | Shukla et al. |
| 2006/0074771 A1 | 4/2006 | Kim |
| 2006/0075360 A1 | 4/2006 | Bixler |
| 2006/0092177 A1 | 5/2006 | Blasko |
| 2006/0093219 A1 | 5/2006 | Gounares et al. |
| 2006/0101354 A1 | 5/2006 | Hashimoto et al. |
| 2006/0103623 A1 | 5/2006 | Davis |
| 2006/0107231 A1 | 5/2006 | Matthews et al. |
| 2006/0112354 A1 | 5/2006 | Park et al. |
| 2006/0114239 A1 | 6/2006 | Nakajima |
| 2006/0129543 A1 | 6/2006 | Bates et al. |
| 2006/0135220 A1 | 6/2006 | Kim et al. |
| 2006/0136773 A1 | 6/2006 | Kespohl et al. |
| 2006/0152803 A1 | 7/2006 | Provitola |
| 2006/0155728 A1 | 7/2006 | Bosarge |
| 2006/0156228 A1 | 7/2006 | Gallo et al. |
| 2006/0156247 A1 | 7/2006 | McCormack et al. |
| 2006/0161863 A1 | 7/2006 | Gallo |
| 2006/0161870 A1 | 7/2006 | Hotelling et al. |
| 2006/0172724 A1 | 8/2006 | Linkert et al. |
| 2006/0173911 A1 | 8/2006 | Levin et al. |
| 2006/0184901 A1 | 8/2006 | Dietz |
| 2006/0190833 A1 | 8/2006 | SanGiovanni et al. |
| 2006/0197750 A1 | 9/2006 | Kerr et al. |
| 2006/0199598 A1 | 9/2006 | Lee et al. |
| 2006/0212806 A1 | 9/2006 | Griffin et al. |
| 2006/0218234 A1 | 9/2006 | Deng et al. |
| 2006/0218500 A1 | 9/2006 | Sauve et al. |
| 2006/0218501 A1 | 9/2006 | Wilson et al. |
| 2006/0224993 A1 | 10/2006 | Wong et al. |
| 2006/0227153 A1 | 10/2006 | Anwar et al. |
| 2006/0232551 A1 | 10/2006 | Matta |
| 2006/0236264 A1 | 10/2006 | Cain et al. |
| 2006/0238517 A1 | 10/2006 | King et al. |
| 2006/0238520 A1 | 10/2006 | Westerman et al. |
| 2006/0246955 A1 | 11/2006 | Nirhamo |
| 2006/0248471 A1 | 11/2006 | Lindsay et al. |
| 2006/0253685 A1 | 11/2006 | Wong et al. |
| 2006/0253801 A1 | 11/2006 | Okaro et al. |
| 2006/0259870 A1 | 11/2006 | Hewitt et al. |
| 2006/0259873 A1 | 11/2006 | Mister |
| 2006/0262134 A1 | 11/2006 | Hamiter et al. |
| 2006/0262188 A1 | 11/2006 | Elyada et al. |
| 2006/0268013 A1 | 11/2006 | Miles |
| 2006/0268100 A1 | 11/2006 | Karukka et al. |
| 2006/0271520 A1 | 11/2006 | Ragan |
| 2006/0281448 A1 | 12/2006 | Plestid et al. |
| 2006/0284852 A1 | 12/2006 | Hofmeister et al. |
| 2006/0293088 A1 | 12/2006 | Kokubo |
| 2006/0294063 A1 | 12/2006 | Ali et al. |
| 2006/0294396 A1 | 12/2006 | Witman |
| 2007/0005716 A1 | 1/2007 | LeVasseur et al. |
| 2007/0006094 A1 | 1/2007 | Canfield et al. |
| 2007/0011610 A1 | 1/2007 | Sethi et al. |
| 2007/0015532 A1 | 1/2007 | Deelman |
| 2007/0024646 A1 | 2/2007 | Saarinen |
| 2007/0028267 A1 | 2/2007 | Ostojic et al. |
| 2007/0035513 A1 | 2/2007 | Sherrard et al. |
| 2007/0038567 A1 | 2/2007 | Allaire |
| 2007/0050724 A1 | 3/2007 | Lee et al. |
| 2007/0054679 A1 | 3/2007 | Cho et al. |
| 2007/0055770 A1 | 3/2007 | Karmakar et al. |
| 2007/0061306 A1 | 3/2007 | Pell et al. |
| 2007/0061488 A1 | 3/2007 | Alagappan et al. |
| 2007/0061714 A1 | 3/2007 | Stuple et al. |
| 2007/0063995 A1 | 3/2007 | Bailey et al. |
| 2007/0067272 A1 | 3/2007 | Flynt |
| 2007/0067737 A1 | 3/2007 | Zielinski et al. |
| 2007/0067798 A1 | 3/2007 | Wroblewski |
| 2007/0073718 A1 | 3/2007 | Ramer et al. |
| 2007/0075976 A1 | 4/2007 | Kun et al. |

(56) References Cited

U.S. PATENT DOCUMENTS

| | | |
|---|---|---|
| 2007/0076013 A1 | 4/2007 | Campbell |
| 2007/0080954 A1 | 4/2007 | Griffin |
| 2007/0082707 A1 | 4/2007 | Flynt et al. |
| 2007/0082708 A1 | 4/2007 | Griffin |
| 2007/0083746 A1 | 4/2007 | Fallon et al. |
| 2007/0083821 A1 | 4/2007 | Garbow et al. |
| 2007/0094045 A1 | 4/2007 | Cobbs et al. |
| 2007/0094597 A1 | 4/2007 | Rostom |
| 2007/0097096 A1 | 5/2007 | Rosenberg |
| 2007/0106635 A1 | 5/2007 | Frieden et al. |
| 2007/0106939 A1 | 5/2007 | Qassoudi |
| 2007/0120762 A1 | 5/2007 | O'Gorman |
| 2007/0120835 A1 | 5/2007 | Sato |
| 2007/0127638 A1 | 6/2007 | Doulton |
| 2007/0136677 A1 | 6/2007 | Agarwal |
| 2007/0140566 A1 | 6/2007 | Lin et al. |
| 2007/0143705 A1 | 6/2007 | Peters |
| 2007/0150826 A1 | 6/2007 | Anzures et al. |
| 2007/0150842 A1 | 6/2007 | Chaudhri et al. |
| 2007/0157089 A1 | 7/2007 | Van Os et al. |
| 2007/0157099 A1 | 7/2007 | Haug |
| 2007/0157105 A1 | 7/2007 | Owens et al. |
| 2007/0168890 A1 | 7/2007 | Zhao et al. |
| 2007/0171192 A1 | 7/2007 | Seo et al. |
| 2007/0171238 A1 | 7/2007 | Ubillos et al. |
| 2007/0180381 A1 | 8/2007 | Rice |
| 2007/0180401 A1 | 8/2007 | Singh et al. |
| 2007/0182595 A1 | 8/2007 | Ghasabian |
| 2007/0182999 A1 | 8/2007 | Anthony et al. |
| 2007/0185847 A1 | 8/2007 | Budzik et al. |
| 2007/0192707 A1 | 8/2007 | Maeda et al. |
| 2007/0192726 A1 | 8/2007 | Kim et al. |
| 2007/0192730 A1 | 8/2007 | Simila et al. |
| 2007/0192733 A1 | 8/2007 | Horiuchi |
| 2007/0192739 A1 | 8/2007 | Hunleth et al. |
| 2007/0197196 A1 | 8/2007 | Shenfield et al. |
| 2007/0198420 A1 | 8/2007 | Goldstein |
| 2007/0208840 A1 | 9/2007 | Mcconville et al. |
| 2007/0211034 A1 | 9/2007 | Griffin et al. |
| 2007/0214422 A1 | 9/2007 | Agarwal et al. |
| 2007/0214429 A1 | 9/2007 | Lyudovyk et al. |
| 2007/0214454 A1 | 9/2007 | Edwards et al. |
| 2007/0216651 A1 | 9/2007 | Patel |
| 2007/0216661 A1 | 9/2007 | Chen et al. |
| 2007/0220444 A1 | 9/2007 | Sunday et al. |
| 2007/0222769 A1 | 9/2007 | Otsuka et al. |
| 2007/0225022 A1 | 9/2007 | Satake |
| 2007/0233654 A1 | 10/2007 | Karlson |
| 2007/0236468 A1 | 10/2007 | Tuli |
| 2007/0238487 A1 | 10/2007 | Kuhl et al. |
| 2007/0238488 A1 | 10/2007 | Scott |
| 2007/0242056 A1 | 10/2007 | Engelhardt et al. |
| 2007/0247435 A1 | 10/2007 | Benko et al. |
| 2007/0250583 A1 | 10/2007 | Hardy et al. |
| 2007/0250787 A1 | 10/2007 | Kawahara et al. |
| 2007/0253758 A1 | 11/2007 | Suess |
| 2007/0255831 A1 | 11/2007 | Hayashi et al. |
| 2007/0256029 A1 | 11/2007 | Maxwell |
| 2007/0257891 A1 | 11/2007 | Esenther et al. |
| 2007/0257933 A1 | 11/2007 | Klassen |
| 2007/0260674 A1 | 11/2007 | Shenfield |
| 2007/0262964 A1 | 11/2007 | Zotov et al. |
| 2007/0263843 A1 | 11/2007 | Foxenland |
| 2007/0266342 A1 | 11/2007 | Chang et al. |
| 2007/0273663 A1 | 11/2007 | Park et al. |
| 2007/0273668 A1 | 11/2007 | Park et al. |
| 2007/0280457 A1 | 12/2007 | Aberethy |
| 2007/0281747 A1 | 12/2007 | Pletikosa |
| 2007/0291007 A1 | 12/2007 | Forlines et al. |
| 2008/0001924 A1 | 1/2008 | de los Reyes et al. |
| 2008/0005668 A1 | 1/2008 | Mavinkurve |
| 2008/0005703 A1 | 1/2008 | Radivojevic et al. |
| 2008/0028294 A1 | 1/2008 | Sell et al. |
| 2008/0032681 A1 | 2/2008 | West |
| 2008/0034318 A1 | 2/2008 | Louch et al. |
| 2008/0036743 A1 | 2/2008 | Westerman et al. |
| 2008/0040692 A1 | 2/2008 | Sunday et al. |
| 2008/0042978 A1 | 2/2008 | Perez-Noguera |
| 2008/0048986 A1 | 2/2008 | Khoo |
| 2008/0052370 A1 | 2/2008 | Snyder |
| 2008/0052637 A1 | 2/2008 | Ben-Yoseph et al. |
| 2008/0052945 A1 | 3/2008 | Matas et al. |
| 2008/0057910 A1 | 3/2008 | Thoresson et al. |
| 2008/0057926 A1 | 3/2008 | Forstall et al. |
| 2008/0059896 A1 | 3/2008 | Anderson et al. |
| 2008/0062141 A1 | 3/2008 | Chandhri |
| 2008/0065607 A1 | 3/2008 | Weber |
| 2008/0065720 A1 | 3/2008 | Brodersen et al. |
| 2008/0066010 A1 | 3/2008 | Brodersen et al. |
| 2008/0072173 A1 | 3/2008 | Brunner et al. |
| 2008/0076472 A1 | 3/2008 | Hyatt |
| 2008/0082903 A1 | 4/2008 | McCurdy et al. |
| 2008/0082911 A1 | 4/2008 | Sorotokin et al. |
| 2008/0082934 A1 | 4/2008 | Kocienda et al. |
| 2008/0084400 A1 | 4/2008 | Rosenberg |
| 2008/0084970 A1 | 4/2008 | Harper |
| 2008/0085700 A1 | 4/2008 | Arora |
| 2008/0092054 A1 | 4/2008 | Bhumkar et al. |
| 2008/0092057 A1 | 4/2008 | Monson et al. |
| 2008/0094368 A1 | 4/2008 | Ording et al. |
| 2008/0095100 A1 | 4/2008 | Cleveland et al. |
| 2008/0102863 A1 | 5/2008 | Hardy |
| 2008/0104544 A1 | 5/2008 | Collins et al. |
| 2008/0107057 A1 | 5/2008 | Kannan et al. |
| 2008/0109753 A1 | 5/2008 | Karstens |
| 2008/0113656 A1 | 5/2008 | Lee et al. |
| 2008/0114535 A1 | 5/2008 | Nesbitt |
| 2008/0120569 A1 | 5/2008 | Mann et al. |
| 2008/0120571 A1 | 5/2008 | Chang et al. |
| 2008/0122796 A1 | 5/2008 | Jobs |
| 2008/0132252 A1 | 6/2008 | Altman et al. |
| 2008/0138030 A1 | 6/2008 | Bryan et al. |
| 2008/0141153 A1 | 6/2008 | Samson et al. |
| 2008/0153551 A1 | 6/2008 | Baek et al. |
| 2008/0155425 A1 | 6/2008 | Murthy et al. |
| 2008/0158189 A1 | 7/2008 | Kim |
| 2008/0162651 A1 | 7/2008 | Madnani |
| 2008/0163104 A1 | 7/2008 | Haug |
| 2008/0164982 A1 | 7/2008 | Andrews et al. |
| 2008/0165132 A1 | 7/2008 | Weiss |
| 2008/0165136 A1 | 7/2008 | Christie et al. |
| 2008/0165141 A1 | 7/2008 | Christie |
| 2008/0165163 A1 | 7/2008 | Bathiche |
| 2008/0165210 A1 | 7/2008 | Platzer et al. |
| 2008/0165255 A1 | 7/2008 | Christie et al. |
| 2008/0167058 A1 | 7/2008 | Lee et al. |
| 2008/0168349 A1 | 7/2008 | Lamiraux et al. |
| 2008/0168379 A1 | 7/2008 | Forstall et al. |
| 2008/0168382 A1 | 7/2008 | Louch et al. |
| 2008/0168396 A1 | 7/2008 | Matas et al. |
| 2008/0168402 A1 | 7/2008 | Blumenberg |
| 2008/0168403 A1 | 7/2008 | Westerman et al. |
| 2008/0172609 A1 | 7/2008 | Rytivaara |
| 2008/0174570 A1 | 7/2008 | Jobs et al. |
| 2008/0180399 A1 | 7/2008 | Cheng |
| 2008/0182628 A1 | 7/2008 | Lee et al. |
| 2008/0184112 A1 | 7/2008 | Chiang et al. |
| 2008/0189653 A1 | 8/2008 | Taylor et al. |
| 2008/0189658 A1 | 8/2008 | Jeong et al. |
| 2008/0192056 A1 | 8/2008 | Robertson et al. |
| 2008/0198141 A1 | 8/2008 | Lee et al. |
| 2008/0200142 A1 | 8/2008 | Abdel-Kader et al. |
| 2008/0208973 A1 | 8/2008 | Hayashi |
| 2008/0211766 A1 | 9/2008 | Westerman et al. |
| 2008/0211778 A1 | 9/2008 | Ording et al. |
| 2008/0222273 A1 | 9/2008 | Lakshmanan |
| 2008/0222545 A1 | 9/2008 | Lemay et al. |
| 2008/0222547 A1 | 9/2008 | Wong et al. |
| 2008/0222560 A1 | 9/2008 | Harrison |
| 2008/0222569 A1 | 9/2008 | Champion |
| 2008/0225014 A1 | 9/2008 | Kim |
| 2008/0229192 A1 | 9/2008 | Gear et al. |
| 2008/0229217 A1 | 9/2008 | Kembel et al. |
| 2008/0242277 A1 | 10/2008 | Chen et al. |

(56) References Cited

U.S. PATENT DOCUMENTS

| | | |
|---|---|---|
| 2008/0242362 A1 | 10/2008 | Duarte |
| 2008/0249682 A1 | 10/2008 | Wisniewski et al. |
| 2008/0250354 A1 | 10/2008 | Park |
| 2008/0259042 A1 | 10/2008 | Thorn |
| 2008/0261513 A1 | 10/2008 | Shin et al. |
| 2008/0261660 A1 | 10/2008 | Huh et al. |
| 2008/0263457 A1 | 10/2008 | Kim et al. |
| 2008/0270558 A1 | 10/2008 | Ma |
| 2008/0278455 A1 | 11/2008 | Atkins et al. |
| 2008/0284798 A1 | 11/2008 | Weybrew et al. |
| 2008/0297475 A1 | 12/2008 | Woolf et al. |
| 2008/0299999 A1 | 12/2008 | Lockhart et al. |
| 2008/0301046 A1 | 12/2008 | Martinez et al. |
| 2008/0301575 A1 | 12/2008 | Fermon |
| 2008/0303798 A1 | 12/2008 | Matsudate et al. |
| 2008/0307351 A1 | 12/2008 | Louch et al. |
| 2008/0307364 A1 | 12/2008 | Chaudhri et al. |
| 2008/0309626 A1 | 12/2008 | Westerman et al. |
| 2008/0313538 A1 | 12/2008 | Hudson |
| 2008/0313540 A1 | 12/2008 | Dirks et al. |
| 2008/0316177 A1 | 12/2008 | Tseng |
| 2008/0317240 A1 | 12/2008 | Chang et al. |
| 2008/0320413 A1 | 12/2008 | Oshiro |
| 2009/0007004 A1 | 1/2009 | Holecek et al. |
| 2009/0007009 A1 | 1/2009 | Luneau et al. |
| 2009/0007017 A1 | 1/2009 | Anzures et al. |
| 2009/0012952 A1 | 1/2009 | Fredriksson |
| 2009/0029736 A1 | 1/2009 | Kim et al. |
| 2009/0031243 A1 | 1/2009 | Kano et al. |
| 2009/0031247 A1 | 1/2009 | Walter et al. |
| 2009/0033632 A1 | 2/2009 | Szolyga et al. |
| 2009/0037469 A1 | 2/2009 | Kirsch |
| 2009/0037846 A1 | 2/2009 | Spalink et al. |
| 2009/0051671 A1 | 2/2009 | Konstas |
| 2009/0054107 A1 | 2/2009 | Feland, III et al. |
| 2009/0058821 A1 | 3/2009 | Chaudhri |
| 2009/0058830 A1 | 3/2009 | Herz |
| 2009/0059730 A1 | 3/2009 | Lyons et al. |
| 2009/0061837 A1 | 3/2009 | Chaudhri et al. |
| 2009/0061948 A1 | 3/2009 | Lee et al. |
| 2009/0064055 A1 | 3/2009 | Chaudhri |
| 2009/0070673 A1 | 3/2009 | Barkan et al. |
| 2009/0077501 A1 | 3/2009 | Partridge et al. |
| 2009/0077649 A1 | 3/2009 | Lockhart |
| 2009/0079699 A1 | 3/2009 | Sun |
| 2009/0079740 A1 | 3/2009 | Fitzmaurice et al. |
| 2009/0083656 A1 | 3/2009 | Dukhon |
| 2009/0085851 A1 | 4/2009 | Lim |
| 2009/0085878 A1 | 4/2009 | Heubel |
| 2009/0085886 A1 | 4/2009 | Huang et al. |
| 2009/0089215 A1 | 4/2009 | Newton |
| 2009/0089459 A1 | 4/2009 | Jeyaseelan et al. |
| 2009/0089704 A1 | 4/2009 | Makela |
| 2009/0094562 A1 | 4/2009 | Jeong et al. |
| 2009/0096758 A1 | 4/2009 | Hotelling et al. |
| 2009/0103515 A1 | 4/2009 | Pointer |
| 2009/0106694 A1 | 4/2009 | Kraft et al. |
| 2009/0106696 A1 | 4/2009 | Duarte |
| 2009/0109243 A1 | 4/2009 | Kraft |
| 2009/0117942 A1 | 5/2009 | Boningue et al. |
| 2009/0117943 A1 | 5/2009 | Lee et al. |
| 2009/0125844 A1 | 5/2009 | Weir et al. |
| 2009/0128505 A1 | 5/2009 | Partridge et al. |
| 2009/0132942 A1 | 5/2009 | Santoro et al. |
| 2009/0138830 A1 | 5/2009 | Borgaonkar et al. |
| 2009/0140061 A1 | 6/2009 | Schultz et al. |
| 2009/0140986 A1 | 6/2009 | Karkkainen et al. |
| 2009/0143141 A1 | 6/2009 | Wells et al. |
| 2009/0144642 A1 | 6/2009 | Crystal |
| 2009/0144652 A1 | 6/2009 | Wiley |
| 2009/0144653 A1 | 6/2009 | Ubillos |
| 2009/0144753 A1 | 6/2009 | Morris |
| 2009/0146962 A1 | 6/2009 | Ahonen et al. |
| 2009/0150618 A1 | 6/2009 | Allen, Jr. et al. |
| 2009/0153438 A1 | 6/2009 | Miller et al. |
| 2009/0153492 A1 | 6/2009 | Popp |
| 2009/0158144 A1 | 6/2009 | Griffin |
| 2009/0160809 A1 | 6/2009 | Yang |
| 2009/0163182 A1 | 6/2009 | Gatti et al. |
| 2009/0164888 A1 | 6/2009 | Phan |
| 2009/0164928 A1 | 6/2009 | Brown et al. |
| 2009/0164936 A1 | 6/2009 | Kawaguchi |
| 2009/0167696 A1 | 7/2009 | Griffin |
| 2009/0171920 A1 | 7/2009 | Wade et al. |
| 2009/0174679 A1 | 7/2009 | Westerman |
| 2009/0178007 A1 | 7/2009 | Matas et al. |
| 2009/0182788 A1 | 7/2009 | Chung et al. |
| 2009/0183077 A1 | 7/2009 | Hakim et al. |
| 2009/0183107 A1 | 7/2009 | Matthews et al. |
| 2009/0184939 A1 | 7/2009 | Wohlstadter et al. |
| 2009/0187860 A1 | 7/2009 | Fleck et al. |
| 2009/0189868 A1 | 7/2009 | Joo et al. |
| 2009/0192942 A1 | 7/2009 | Cottrille et al. |
| 2009/0193358 A1 | 7/2009 | Mernyk et al. |
| 2009/0193364 A1 | 7/2009 | Jarrett et al. |
| 2009/0193366 A1 | 7/2009 | Davidson |
| 2009/0199122 A1 | 8/2009 | Deutsch et al. |
| 2009/0199128 A1 | 8/2009 | Matthews et al. |
| 2009/0199130 A1 | 8/2009 | Tsern et al. |
| 2009/0205041 A1 | 8/2009 | Michalske |
| 2009/0215504 A1 | 8/2009 | Lando |
| 2009/0225038 A1 | 9/2009 | Bolsinga et al. |
| 2009/0228825 A1 | 9/2009 | Van Os et al. |
| 2009/0228841 A1 | 9/2009 | Hildreth |
| 2009/0235200 A1 | 9/2009 | Deutsch et al. |
| 2009/0235203 A1 | 9/2009 | Iizuka |
| 2009/0248421 A1 | 10/2009 | Michaelis et al. |
| 2009/0249236 A1 | 10/2009 | Westerman et al. |
| 2009/0249247 A1 | 10/2009 | Tseng et al. |
| 2009/0249257 A1 | 10/2009 | Bove et al. |
| 2009/0251432 A1 | 10/2009 | Wang et al. |
| 2009/0265662 A1 | 10/2009 | Bamford |
| 2009/0271735 A1 | 10/2009 | Anderson et al. |
| 2009/0271778 A1 | 10/2009 | Mandyam et al. |
| 2009/0276701 A1 | 11/2009 | Nurmi |
| 2009/0278812 A1 | 11/2009 | Yasutake |
| 2009/0282332 A1 | 11/2009 | Porat |
| 2009/0284478 A1 | 11/2009 | De La Torre Baltierra |
| 2009/0284482 A1 | 11/2009 | Chin |
| 2009/0284657 A1 | 11/2009 | Roberts et al. |
| 2009/0288044 A1 | 11/2009 | Matthews et al. |
| 2009/0292989 A1 | 11/2009 | Matthews et al. |
| 2009/0293007 A1 | 11/2009 | Duarte et al. |
| 2009/0293013 A1 | 11/2009 | O'Shaugnessy et al. |
| 2009/0293014 A1 | 11/2009 | Meuninck et al. |
| 2009/0295753 A1 | 12/2009 | King et al. |
| 2009/0298547 A1 | 12/2009 | Kim et al. |
| 2009/0303231 A1 | 12/2009 | Robinet et al. |
| 2009/0305732 A1 | 12/2009 | Marcellino et al. |
| 2009/0307105 A1 | 12/2009 | Lemay et al. |
| 2009/0307589 A1 | 12/2009 | Inose et al. |
| 2009/0307623 A1 | 12/2009 | Agarawala et al. |
| 2009/0309846 A1 | 12/2009 | Trachtenberg et al. |
| 2009/0313584 A1 | 12/2009 | Kerr et al. |
| 2009/0315839 A1 | 12/2009 | Wilson et al. |
| 2009/0315847 A1 | 12/2009 | Fujii |
| 2009/0318171 A1 | 12/2009 | Backholm et al. |
| 2009/0320070 A1 | 12/2009 | Inoguchi |
| 2009/0322760 A1 | 12/2009 | Kwiatkowski et al. |
| 2009/0327969 A1 | 12/2009 | Estrada |
| 2009/0327975 A1 | 12/2009 | Stedman |
| 2010/0008490 A1 | 1/2010 | Gharachorloo et al. |
| 2010/0010934 A1 | 1/2010 | Barry et al. |
| 2010/0013768 A1 | 1/2010 | Leung |
| 2010/0013782 A1 | 1/2010 | Liu et al. |
| 2010/0016049 A1 | 1/2010 | Shirakawa et al. |
| 2010/0020025 A1 | 1/2010 | Lemort et al. |
| 2010/0020091 A1 | 1/2010 | Rasmussen et al. |
| 2010/0031186 A1 | 2/2010 | Tseng et al. |
| 2010/0042911 A1 | 2/2010 | Wormald et al. |
| 2010/0045705 A1 | 2/2010 | Vertegaal et al. |
| 2010/0050076 A1 | 2/2010 | Roth |
| 2010/0053861 A1 | 3/2010 | Kim et al. |
| 2010/0057566 A1 | 3/2010 | Itzhak |

(56) References Cited

U.S. PATENT DOCUMENTS

| | | |
|---|---|---|
| 2010/0058248 A1 | 3/2010 | Park |
| 2010/0062811 A1 | 3/2010 | Park et al. |
| 2010/0064261 A1 | 3/2010 | Andrews et al. |
| 2010/0066667 A1 | 3/2010 | MacDougall et al. |
| 2010/0066698 A1 | 3/2010 | Seo |
| 2010/0066705 A1 | 3/2010 | Keely et al. |
| 2010/0070931 A1 | 3/2010 | Nichols |
| 2010/0073380 A1 | 3/2010 | Kaplan et al. |
| 2010/0075628 A1 | 3/2010 | Ye |
| 2010/0077058 A1 | 3/2010 | Messer |
| 2010/0077310 A1 | 3/2010 | Karachale et al. |
| 2010/0077330 A1 | 3/2010 | Kaplan et al. |
| 2010/0079392 A1 | 4/2010 | Chiang et al. |
| 2010/0079413 A1 | 4/2010 | Kawashima et al. |
| 2010/0081475 A1 | 4/2010 | Chiang et al. |
| 2010/0083190 A1 | 4/2010 | Roberts et al. |
| 2010/0086022 A1 | 4/2010 | Hunleth et al. |
| 2010/0087169 A1 | 4/2010 | Lin |
| 2010/0087173 A1 | 4/2010 | Lin |
| 2010/0088635 A1 | 4/2010 | Louch |
| 2010/0088641 A1 | 4/2010 | Choi |
| 2010/0090971 A1 | 4/2010 | Choi et al. |
| 2010/0097338 A1 | 4/2010 | Miyashita et al. |
| 2010/0100839 A1 | 4/2010 | Tseng et al. |
| 2010/0102998 A1 | 4/2010 | Fux |
| 2010/0103118 A1 | 4/2010 | Townsend et al. |
| 2010/0103124 A1 | 4/2010 | Kruzeniski |
| 2010/0105370 A1 | 4/2010 | Kruzeniski |
| 2010/0105424 A1 | 4/2010 | Smuga |
| 2010/0105438 A1 | 4/2010 | Wykes |
| 2010/0105439 A1 | 4/2010 | Friedman |
| 2010/0105440 A1 | 4/2010 | Kruzeniski |
| 2010/0105441 A1 | 4/2010 | Voss |
| 2010/0105443 A1 | 4/2010 | Vaisanen |
| 2010/0106607 A1 | 4/2010 | Riddiford et al. |
| 2010/0106915 A1 | 4/2010 | Krishnaprasad et al. |
| 2010/0107067 A1 | 4/2010 | Vaisanen |
| 2010/0107068 A1 | 4/2010 | Butcher |
| 2010/0107100 A1 | 4/2010 | Schneekloth |
| 2010/0115455 A1 | 5/2010 | Kim |
| 2010/0122110 A1 | 5/2010 | Ordogh |
| 2010/0123737 A1 | 5/2010 | Williamson et al. |
| 2010/0131901 A1 | 5/2010 | Takahashi et al. |
| 2010/0134415 A1 | 6/2010 | Iwase et al. |
| 2010/0137027 A1 | 6/2010 | Kim |
| 2010/0138767 A1 | 6/2010 | Wang et al. |
| 2010/0138782 A1 | 6/2010 | Rainisto |
| 2010/0138834 A1 | 6/2010 | Agarwal et al. |
| 2010/0145675 A1 | 6/2010 | Lloyd et al. |
| 2010/0146384 A1 | 6/2010 | Peev et al. |
| 2010/0146431 A1 | 6/2010 | Raji et al. |
| 2010/0146437 A1 | 6/2010 | Woodcock et al. |
| 2010/0157157 A1 | 6/2010 | Yi |
| 2010/0159966 A1 | 6/2010 | Friedman et al. |
| 2010/0159994 A1 | 6/2010 | Stallings et al. |
| 2010/0159995 A1 | 6/2010 | Stallings et al. |
| 2010/0162180 A1 | 6/2010 | Dunnam et al. |
| 2010/0164878 A1 | 7/2010 | Bestle et al. |
| 2010/0164959 A1 | 7/2010 | Brown et al. |
| 2010/0167699 A1 | 7/2010 | Sigmund et al. |
| 2010/0169766 A1 | 7/2010 | Duarte et al. |
| 2010/0169772 A1 | 7/2010 | Stallings et al. |
| 2010/0169819 A1 | 7/2010 | Bestle et al. |
| 2010/0175018 A1 | 7/2010 | Petschnigg et al. |
| 2010/0175029 A1 | 7/2010 | Williams |
| 2010/0180233 A1 | 7/2010 | Kruzeniski |
| 2010/0185932 A1 | 7/2010 | Coffman et al. |
| 2010/0185989 A1 | 7/2010 | Shiplacoff et al. |
| 2010/0188371 A1 | 7/2010 | Lowles et al. |
| 2010/0192102 A1 | 7/2010 | Chmielewski et al. |
| 2010/0201634 A1 | 8/2010 | Coddington |
| 2010/0213040 A1 | 8/2010 | Yeh et al. |
| 2010/0216491 A1 | 8/2010 | Winkler et al. |
| 2010/0217428 A1 | 8/2010 | Strong et al. |
| 2010/0223569 A1 | 9/2010 | Vuong et al. |
| 2010/0235736 A1 | 9/2010 | Fleisher et al. |
| 2010/0241973 A1 | 9/2010 | Whiddett |
| 2010/0245263 A1 | 9/2010 | Parada, Jr. et al. |
| 2010/0248688 A1 | 9/2010 | Teng et al. |
| 2010/0248689 A1 | 9/2010 | Teng et al. |
| 2010/0248741 A1 | 9/2010 | Setlur et al. |
| 2010/0248787 A1 | 9/2010 | Smuga |
| 2010/0248788 A1 | 9/2010 | Yook et al. |
| 2010/0251153 A1 | 9/2010 | Sangiovanni et al. |
| 2010/0251167 A1 | 9/2010 | Deluca et al. |
| 2010/0251189 A1 | 9/2010 | Jaeger |
| 2010/0259493 A1 | 10/2010 | Chang et al. |
| 2010/0262928 A1 | 10/2010 | Abbott |
| 2010/0265196 A1 | 10/2010 | Lee et al. |
| 2010/0281402 A1 | 11/2010 | Staikos et al. |
| 2010/0281409 A1 | 11/2010 | Rainisto et al. |
| 2010/0281481 A1 | 11/2010 | Rainisto et al. |
| 2010/0283743 A1 | 11/2010 | Coddington et al. |
| 2010/0283748 A1 | 11/2010 | Hsieh et al. |
| 2010/0289806 A1 | 11/2010 | Lao et al. |
| 2010/0293056 A1 | 11/2010 | Flynt et al. |
| 2010/0293501 A1 | 11/2010 | Russ et al. |
| 2010/0295789 A1 | 11/2010 | Shin et al. |
| 2010/0295795 A1 | 11/2010 | Wilairat |
| 2010/0298034 A1 | 11/2010 | Shin et al. |
| 2010/0302172 A1 | 12/2010 | Wilairat |
| 2010/0302176 A1 | 12/2010 | Nikula et al. |
| 2010/0302278 A1 | 12/2010 | Shaffer et al. |
| 2010/0302712 A1 | 12/2010 | Zednicek et al. |
| 2010/0309148 A1 | 12/2010 | Fleizach et al. |
| 2010/0311470 A1 | 12/2010 | Seo et al. |
| 2010/0313124 A1 | 12/2010 | Privault et al. |
| 2010/0313165 A1 | 12/2010 | Louch et al. |
| 2010/0321403 A1 | 12/2010 | Inadome |
| 2010/0325411 A1 | 12/2010 | Jung et al. |
| 2010/0328431 A1 | 12/2010 | Kim et al. |
| 2010/0329642 A1 | 12/2010 | Kam et al. |
| 2010/0333008 A1 | 12/2010 | Taylor |
| 2011/0004839 A1 | 1/2011 | Cha et al. |
| 2011/0004845 A1 | 1/2011 | Ciabarra |
| 2011/0018806 A1 | 1/2011 | Yano |
| 2011/0018821 A1 | 1/2011 | Kii |
| 2011/0029598 A1 | 2/2011 | Arnold et al. |
| 2011/0029904 A1 | 2/2011 | Smith et al. |
| 2011/0029927 A1 | 2/2011 | Lietzke et al. |
| 2011/0029934 A1 | 2/2011 | Locker et al. |
| 2011/0032365 A1 | 2/2011 | Yett |
| 2011/0035702 A1 | 2/2011 | Williams et al. |
| 2011/0043527 A1 | 2/2011 | Ording et al. |
| 2011/0050594 A1 | 3/2011 | Kim et al. |
| 2011/0055729 A1 | 3/2011 | Mason et al. |
| 2011/0055753 A1 | 3/2011 | Horodezky et al. |
| 2011/0055773 A1 | 3/2011 | Agarawala et al. |
| 2011/0057953 A1 | 3/2011 | Horodezky |
| 2011/0074699 A1 | 3/2011 | Marr et al. |
| 2011/0074710 A1 | 3/2011 | Weeldreyer et al. |
| 2011/0074719 A1 | 3/2011 | Yeh et al. |
| 2011/0078624 A1 | 3/2011 | Missig et al. |
| 2011/0087739 A1 | 4/2011 | Lin |
| 2011/0087988 A1 | 4/2011 | Ray et al. |
| 2011/0093778 A1 | 4/2011 | Kim et al. |
| 2011/0093815 A1 | 4/2011 | Gobeil |
| 2011/0093816 A1 | 4/2011 | Chang et al. |
| 2011/0093821 A1 | 4/2011 | Wigdor et al. |
| 2011/0102464 A1 | 5/2011 | Godavari |
| 2011/0107220 A1 | 5/2011 | Perlman |
| 2011/0107272 A1 | 5/2011 | Aguilar |
| 2011/0109563 A1 | 5/2011 | Liu |
| 2011/0113337 A1 | 5/2011 | Liu et al. |
| 2011/0113486 A1 | 5/2011 | Hunt et al. |
| 2011/0115735 A1 | 5/2011 | Lev et al. |
| 2011/0119586 A1 | 5/2011 | Blinnikka et al. |
| 2011/0119597 A1 | 5/2011 | Yellamraju et al. |
| 2011/0126094 A1 | 5/2011 | Horodezky et al. |
| 2011/0126156 A1 | 5/2011 | Krishnaraj et al. |
| 2011/0138313 A1 | 6/2011 | Decker et al. |
| 2011/0143769 A1 | 6/2011 | Jones et al. |
| 2011/0154235 A1 | 6/2011 | Min et al. |
| 2011/0157027 A1 | 6/2011 | Rissa |

(56) References Cited

U.S. PATENT DOCUMENTS

| | | |
|---|---|---|
| 2011/0161845 A1 | 6/2011 | Stallings et al. |
| 2011/0163968 A1 | 7/2011 | Hogan |
| 2011/0167336 A1 | 7/2011 | Aitken et al. |
| 2011/0167341 A1 | 7/2011 | Cranfill et al. |
| 2011/0167403 A1 | 7/2011 | French et al. |
| 2011/0170252 A1 | 7/2011 | Jones et al. |
| 2011/0173556 A1 | 7/2011 | Czerwinski et al. |
| 2011/0173568 A1 | 7/2011 | Royal, Jr. et al. |
| 2011/0173569 A1 | 7/2011 | Howes et al. |
| 2011/0175821 A1 | 7/2011 | King |
| 2011/0175930 A1 | 7/2011 | Hwang et al. |
| 2011/0179020 A1 | 7/2011 | Ozzie et al. |
| 2011/0179386 A1 | 7/2011 | Shaffer et al. |
| 2011/0179387 A1 | 7/2011 | Shaffer et al. |
| 2011/0181524 A1 | 7/2011 | Hinckley |
| 2011/0181617 A1 | 7/2011 | Tsuda et al. |
| 2011/0184960 A1 | 7/2011 | Delpha et al. |
| 2011/0185299 A1 | 7/2011 | Hinckley |
| 2011/0185300 A1 | 7/2011 | Hinckley |
| 2011/0185318 A1 | 7/2011 | Hinckley et al. |
| 2011/0185320 A1 | 7/2011 | Hinckley |
| 2011/0191675 A1 | 8/2011 | Kauranen |
| 2011/0191704 A1 | 8/2011 | Hinckley |
| 2011/0191718 A1 | 8/2011 | Hinckley |
| 2011/0191719 A1 | 8/2011 | Hinckley |
| 2011/0199386 A1 | 8/2011 | Dharwada et al. |
| 2011/0202834 A1 | 8/2011 | Mandryk et al. |
| 2011/0202837 A1 | 8/2011 | Fong |
| 2011/0202866 A1 | 8/2011 | Huang et al. |
| 2011/0202872 A1 | 8/2011 | Park |
| 2011/0205163 A1 | 8/2011 | Hinckley |
| 2011/0209039 A1 | 8/2011 | Hinckley et al. |
| 2011/0209057 A1 | 8/2011 | Hinckley |
| 2011/0209058 A1 | 8/2011 | Hinckley |
| 2011/0209088 A1 | 8/2011 | Hinckley |
| 2011/0209089 A1 | 8/2011 | Hinckley et al. |
| 2011/0209093 A1 | 8/2011 | Hinckley |
| 2011/0209097 A1 | 8/2011 | Hinckley |
| 2011/0209098 A1 | 8/2011 | Hinckley |
| 2011/0209099 A1 | 8/2011 | Hinckley |
| 2011/0209100 A1 | 8/2011 | Hinckley et al. |
| 2011/0209101 A1 | 8/2011 | Hinckley et al. |
| 2011/0209102 A1 | 8/2011 | Hinckley et al. |
| 2011/0209103 A1 | 8/2011 | Hinckley et al. |
| 2011/0209104 A1 | 8/2011 | Hinckley et al. |
| 2011/0216064 A1 | 9/2011 | Dahl et al. |
| 2011/0225547 A1 | 9/2011 | Fong et al. |
| 2011/0231796 A1 | 9/2011 | Vigil |
| 2011/0252346 A1 | 10/2011 | Chaudhri |
| 2011/0252380 A1 | 10/2011 | Chaudhri |
| 2011/0252381 A1 | 10/2011 | Chaudhri |
| 2011/0258563 A1 | 10/2011 | Lincke |
| 2011/0276864 A1 | 11/2011 | Oules |
| 2011/0279461 A1 | 11/2011 | Hamilton et al. |
| 2011/0283188 A1 | 11/2011 | Farrenkopf et al. |
| 2011/0291964 A1 | 12/2011 | Chambers et al. |
| 2011/0316884 A1 | 12/2011 | Giambalvo et al. |
| 2011/0320978 A1 | 12/2011 | Horodezky et al. |
| 2012/0005584 A1 | 1/2012 | Seago et al. |
| 2012/0009903 A1 | 1/2012 | Schultz et al. |
| 2012/0011437 A1 | 1/2012 | James et al. |
| 2012/0017162 A1 | 1/2012 | Khokhlov |
| 2012/0023101 A1 | 1/2012 | Heimendinger et al. |
| 2012/0028687 A1 | 2/2012 | Wykes et al. |
| 2012/0030616 A1 | 2/2012 | Howes et al. |
| 2012/0050185 A1 | 3/2012 | Davydov et al. |
| 2012/0050332 A1 | 3/2012 | Nikara et al. |
| 2012/0072853 A1 | 3/2012 | Krigstrom et al. |
| 2012/0072953 A1 | 3/2012 | James et al. |
| 2012/0079414 A1 | 3/2012 | Eischeid et al. |
| 2012/0081310 A1 | 4/2012 | Schrock et al. |
| 2012/0084704 A1 | 4/2012 | Lee et al. |
| 2012/0084705 A1 | 4/2012 | Lee et al. |
| 2012/0084710 A1 | 4/2012 | Sirpal et al. |
| 2012/0089950 A1 | 4/2012 | Tseng |
| 2012/0096411 A1 | 4/2012 | Nash |
| 2012/0102433 A1 | 4/2012 | Falkenburg |
| 2012/0131519 A1 | 5/2012 | Jitkoff |
| 2012/0151397 A1 | 6/2012 | Oberstein et al. |
| 2012/0159383 A1 | 6/2012 | Matthews et al. |
| 2012/0159386 A1 | 6/2012 | Kang et al. |
| 2012/0159395 A1 | 6/2012 | Deutsch et al. |
| 2012/0159402 A1 | 6/2012 | Nurmi et al. |
| 2012/0161791 A1 | 6/2012 | Shaw |
| 2012/0162266 A1 | 6/2012 | Douglas et al. |
| 2012/0166980 A1 | 6/2012 | Yosef et al. |
| 2012/0167005 A1 | 6/2012 | Matthews et al. |
| 2012/0167008 A1 | 6/2012 | Zaman |
| 2012/0167011 A1 | 6/2012 | Zaman |
| 2012/0169593 A1 | 7/2012 | Mak et al. |
| 2012/0174005 A1 | 7/2012 | Deutsch et al. |
| 2012/0174029 A1 | 7/2012 | Bastide et al. |
| 2012/0174034 A1 | 7/2012 | Chae et al. |
| 2012/0176322 A1 | 7/2012 | Karmi et al. |
| 2012/0176401 A1 | 7/2012 | Hayward et al. |
| 2012/0179992 A1 | 7/2012 | Smuga |
| 2012/0180001 A1 | 7/2012 | Griffin et al. |
| 2012/0194448 A1 | 8/2012 | Rothkopf |
| 2012/0208501 A1 | 8/2012 | Tsuda |
| 2012/0209907 A1 | 8/2012 | Andrews et al. |
| 2012/0210265 A1 | 8/2012 | Delia et al. |
| 2012/0212495 A1 | 8/2012 | Butcher |
| 2012/0216139 A1 | 8/2012 | Ording et al. |
| 2012/0218192 A1 | 8/2012 | Lazaridis et al. |
| 2012/0226971 A1 | 9/2012 | Tocchini et al. |
| 2012/0233571 A1 | 9/2012 | Wever et al. |
| 2012/0235930 A1 | 9/2012 | Lazaridis et al. |
| 2012/0236026 A1 | 9/2012 | Hinckley |
| 2012/0236035 A1 | 9/2012 | Kimura |
| 2012/0244841 A1 | 9/2012 | Teng |
| 2012/0254780 A1 | 10/2012 | Mouton et al. |
| 2012/0254808 A1 | 10/2012 | Gildfind |
| 2012/0265644 A1 | 10/2012 | Roa et al. |
| 2012/0272181 A1 | 10/2012 | Rogers et al. |
| 2012/0278727 A1 | 11/2012 | Ananthakrishnan et al. |
| 2012/0284673 A1 | 11/2012 | Lamb et al. |
| 2012/0290962 A1 | 11/2012 | Zielinski et al. |
| 2012/0299968 A1 | 11/2012 | Wong et al. |
| 2012/0304068 A1 | 11/2012 | Zaman et al. |
| 2012/0304092 A1 | 11/2012 | Jarrett et al. |
| 2012/0304102 A1 | 11/2012 | Levee et al. |
| 2012/0304106 A1 | 11/2012 | Levee et al. |
| 2012/0304107 A1 | 11/2012 | Nan et al. |
| 2012/0304108 A1 | 11/2012 | Jarrett et al. |
| 2012/0304113 A1 | 11/2012 | Patten et al. |
| 2012/0304114 A1 | 11/2012 | Wong et al. |
| 2012/0304116 A1 | 11/2012 | Donahue et al. |
| 2012/0304117 A1 | 11/2012 | Donahue et al. |
| 2012/0304118 A1 | 11/2012 | Donahue et al. |
| 2012/0304131 A1 | 11/2012 | Nan et al. |
| 2012/0304132 A1 | 11/2012 | Sareen et al. |
| 2012/0304133 A1 | 11/2012 | Nan et al. |
| 2012/0311485 A1 | 12/2012 | Caliendo, Jr. et al. |
| 2012/0314342 A1 | 12/2012 | Sheu et al. |
| 2012/0322527 A1 | 12/2012 | Aoki et al. |
| 2012/0323992 A1 | 12/2012 | Brobst et al. |
| 2013/0007665 A1 | 1/2013 | Chaudhri et al. |
| 2013/0031508 A1 | 1/2013 | Kodosky et al. |
| 2013/0033525 A1 | 2/2013 | Markiewicz |
| 2013/0042203 A1 | 2/2013 | Wong et al. |
| 2013/0042206 A1 | 2/2013 | Zaman et al. |
| 2013/0044136 A1 | 2/2013 | Matthews |
| 2013/0044141 A1 | 2/2013 | Markiewicz |
| 2013/0047079 A1 | 2/2013 | Kroeger et al. |
| 2013/0047105 A1 | 2/2013 | Jarrett |
| 2013/0047117 A1 | 2/2013 | Deutsch |
| 2013/0047126 A1 | 2/2013 | Sareen |
| 2013/0057587 A1 | 3/2013 | Leonard et al. |
| 2013/0057588 A1 | 3/2013 | Leonard |
| 2013/0063442 A1 | 3/2013 | Zaman |
| 2013/0063443 A1 | 3/2013 | Garside |
| 2013/0063465 A1 | 3/2013 | Zaman |
| 2013/0063490 A1 | 3/2013 | Zaman et al. |
| 2013/0067381 A1 | 3/2013 | Yalovsky |

(56) References Cited

U.S. PATENT DOCUMENTS

| | | | |
|---|---|---|---|
| 2013/0067390 A1 | 3/2013 | Kwiatkowski | |
| 2013/0067391 A1 | 3/2013 | Pittappilly | |
| 2013/0067398 A1 | 3/2013 | Pittappilly | |
| 2013/0067399 A1 | 3/2013 | Elliott | |
| 2013/0067412 A1 | 3/2013 | Leonard et al. | |
| 2013/0067420 A1 | 3/2013 | Pittappilly | |
| 2013/0093757 A1 | 4/2013 | Cornell | |
| 2013/0102366 A1 | 4/2013 | Teng | |
| 2013/0111396 A1 | 5/2013 | Brid | |
| 2013/0117715 A1 | 5/2013 | Williams et al. | |
| 2013/0145244 A1 | 6/2013 | Rothschiller et al. | |
| 2013/0167058 A1 | 6/2013 | LeVee | |
| 2013/0178155 A1 | 7/2013 | Shulenberger | |
| 2013/0179781 A1 | 7/2013 | Nan et al. | |
| 2013/0205210 A1 | 8/2013 | Jeon et al. | |
| 2013/0268422 A1 | 10/2013 | Ram et al. | |
| 2013/0277271 A1 | 10/2013 | Toulotte | |
| 2013/0297700 A1 | 11/2013 | Hayton et al. | |
| 2013/0300684 A1 | 11/2013 | Kim et al. | |
| 2013/0304822 A1 | 11/2013 | Tetreault | |
| 2013/0305184 A1 | 11/2013 | Kim et al. | |
| 2013/0321401 A1 | 12/2013 | Piemonte et al. | |
| 2014/0033099 A1 | 1/2014 | Treitman et al. | |
| 2014/0040819 A1 | 2/2014 | Duffy | |
| 2014/0067833 A1 | 3/2014 | Nandi | |
| 2014/0082552 A1 | 3/2014 | Zaman | |
| 2014/0089833 A1 | 3/2014 | Hwang et al. | |
| 2014/0089856 A1 | 3/2014 | Matthews | |
| 2014/0098108 A1 | 4/2014 | Fong et al. | |
| 2014/0109008 A1 | 4/2014 | Zaman | |
| 2014/0143708 A1 | 5/2014 | Yang et al. | |
| 2014/0176479 A1 | 6/2014 | Wardenaar | |
| 2014/0237357 A1 | 8/2014 | Meyer et al. | |
| 2014/0298245 A1 | 10/2014 | Tappen et al. | |
| 2014/0310646 A1 | 10/2014 | Vranjes et al. | |
| 2014/0359721 A1 | 12/2014 | Alphin et al. | |
| 2015/0046829 A1 | 2/2015 | Donahue et al. | |
| 2015/0058763 A1 | 2/2015 | Leonard et al. | |
| 2015/0113476 A1 | 4/2015 | Deutsch et al. | |
| 2015/0186376 A1 | 7/2015 | Garside et al. | |
| 2015/0317062 A1 | 11/2015 | Jarrett et al. | |

FOREIGN PATENT DOCUMENTS

| | | |
|---|---|---|
| CN | 1512301 | 7/2004 |
| CN | 1734440 | 2/2006 |
| CN | 1735856 | 2/2006 |
| CN | 1749936 | 3/2006 |
| CN | 1766824 | 5/2006 |
| CN | 1786906 | 6/2006 |
| CN | 1851641 | 10/2006 |
| CN | 1902575 | 1/2007 |
| CN | 1904823 | 1/2007 |
| CN | 1930568 | 3/2007 |
| CN | 1936797 | 3/2007 |
| CN | 101006425 | 7/2007 |
| CN | 101036104 | 9/2007 |
| CN | 101075174 | 11/2007 |
| CN | 101114303 | 1/2008 |
| CN | 101228570 | 7/2008 |
| CN | 101432677 | 5/2009 |
| CN | 201298220 | 8/2009 |
| CN | 101566865 | 10/2009 |
| CN | 101576789 | 11/2009 |
| CN | 101578577 | 11/2009 |
| CN | 101627361 | 1/2010 |
| CN | 101636711 | 1/2010 |
| CN | 101770332 | 7/2010 |
| CN | 101809531 | 8/2010 |
| CN | 101819498 | 9/2010 |
| CN | 102004603 | 4/2011 |
| CN | 102033710 | 4/2011 |
| CN | 102144213 | 8/2011 |
| CN | 102197702 | 9/2011 |
| CN | 102460370 | 5/2012 |
| CN | 102591571 | 7/2012 |
| CN | 102624970 | 8/2012 |
| CN | 202904485 | 4/2013 |
| CN | 103105995 | 5/2013 |
| CN | 203025612 | 6/2013 |
| CN | 103197837 | 7/2013 |
| CN | 103475784 | 12/2013 |
| CN | 103543904 | 1/2014 |
| CN | 103562858 | 2/2014 |
| CN | 103562917 | 2/2014 |
| EP | 0583060 | 2/1994 |
| EP | 0965932 | 12/1999 |
| EP | 1176520 | 1/2002 |
| EP | 1337093 | 8/2003 |
| EP | 1353505 | 10/2003 |
| EP | 1526463 | 4/2005 |
| EP | 1752868 | 2/2007 |
| EP | 1939718 | 7/2008 |
| EP | 1942401 | 7/2008 |
| EP | 1962480 | 8/2008 |
| EP | 2045700 | 4/2009 |
| EP | 2172836 | 4/2009 |
| EP | 2076000 | 7/2009 |
| EP | 2148268 | 1/2010 |
| EP | 2262193 | 12/2010 |
| EP | 2535809 | 12/2012 |
| EP | 2659347 | 11/2013 |
| GB | 2350991 | 12/2000 |
| JP | 6282368 | 10/1994 |
| JP | 7281810 | 10/1995 |
| JP | 2000347645 | 12/2000 |
| JP | 2001265523 | 9/2001 |
| JP | 2001290585 | 10/2001 |
| JP | 2002055753 | 2/2002 |
| JP | 2003513350 | 4/2003 |
| JP | 2003195998 | 7/2003 |
| JP | 2004227393 | 8/2004 |
| JP | 2004357257 | 12/2004 |
| JP | 2006139615 | 6/2006 |
| JP | 2006268849 | 10/2006 |
| JP | 2007058740 | 3/2007 |
| JP | 2007148783 | 6/2007 |
| JP | 2007195186 | 8/2007 |
| JP | 2008527540 | 7/2008 |
| JP | 2008305087 | 12/2008 |
| JP | 2009097724 | 4/2009 |
| JP | 2009266192 | 11/2009 |
| JP | 2010039761 | 2/2010 |
| JP | 2010049684 | 3/2010 |
| JP | 2010073099 | 4/2010 |
| JP | 2010108273 | 5/2010 |
| JP | 2010250465 | 11/2010 |
| JP | 2011048835 | 3/2011 |
| JP | 2011070525 | 4/2011 |
| JP | 2011516936 | 5/2011 |
| JP | 2011221821 | 11/2011 |
| JP | 2012514811 | 6/2012 |
| JP | 2012527684 | 11/2012 |
| JP | 2012256147 | 12/2012 |
| KR | 200303655 | 2/2003 |
| KR | 20060019198 | 3/2006 |
| KR | 1020070036114 | 4/2007 |
| KR | 20070093585 | 9/2007 |
| KR | 1020070098337 | 10/2007 |
| KR | 20070120368 | 12/2007 |
| KR | 1020080025951 | 3/2008 |
| KR | 1020080041809 | 5/2008 |
| KR | 1020080076390 | 8/2008 |
| KR | 100854333 | 9/2008 |
| KR | 20080084156 | 9/2008 |
| KR | 1020080084156 | 9/2008 |
| KR | 1020080113913 | 12/2008 |
| KR | 20090002951 | 1/2009 |
| KR | 20090013927 | 2/2009 |
| KR | 1020090041635 | 4/2009 |
| KR | 20090053143 | 5/2009 |
| KR | 1020090088501 | 8/2009 |
| KR | 20090106755 | 10/2009 |

(56) References Cited

FOREIGN PATENT DOCUMENTS

| | | |
|---|---|---|
| KR | 1020090123545 | 12/2009 |
| KR | 20100010072 | 2/2010 |
| KR | 20100048375 | 5/2010 |
| KR | 20100056369 | 5/2010 |
| KR | 1020100056369 | 5/2010 |
| KR | 1020100107377 | 10/2010 |
| KR | 1020100131724 | 12/2010 |
| NO | WO-2007134623 | 11/2007 |
| NO | WO-2010117643 | 10/2010 |
| TW | 200947297 | 11/2009 |
| TW | 201023026 | 6/2010 |
| TW | 201037592 | 10/2010 |
| TW | I333157 | 11/2010 |
| WO | WO-9928812 | 1/1999 |
| WO | WO-9926127 | 5/1999 |
| WO | WO-0129976 | 4/2001 |
| WO | WO-2005026931 | 3/2005 |
| WO | WO-2005027506 | 3/2005 |
| WO | WO-2006019639 | 2/2006 |
| WO | WO-2007019599 | 2/2007 |
| WO | WO-2007121557 | 11/2007 |
| WO | WO-2008030608 | 3/2008 |
| WO | WO-2008031871 | 3/2008 |
| WO | WO-2008035831 | 3/2008 |
| WO | WO-2008041318 | 4/2008 |
| WO | WO-2008084211 | 7/2008 |
| WO | WO-2008146784 | 12/2008 |
| WO | WO-2009000043 | 12/2008 |
| WO | WO-2009012398 | 1/2009 |
| WO | WO-2009049331 | 4/2009 |
| WO | WO-2009054809 | 4/2009 |
| WO | WO-2009086628 | 7/2009 |
| WO | WO-2010024969 | 3/2010 |
| WO | WO-2010036660 | 4/2010 |
| WO | WO-2010041826 | 4/2010 |
| WO | WO-2010048229 | 4/2010 |
| WO | WO-2010048448 | 4/2010 |
| WO | WO-2010048519 | 4/2010 |
| WO | WO-2010080258 | 7/2010 |
| WO | WO-2010089980 | 8/2010 |
| WO | WO-2010092993 | 8/2010 |
| WO | WO-2010117661 | 10/2010 |
| WO | WO-2010119356 | 10/2010 |
| WO | WO-2010125451 | 11/2010 |
| WO | WO-2010134718 | 11/2010 |
| WO | WO-2010135155 | 11/2010 |
| WO | WO-2011041885 | 4/2011 |
| WO | WO-2011106467 | 9/2011 |
| WO | WO-2011106468 | 9/2011 |
| WO | WO-2012087847 | 6/2012 |
| WO | WO-2013158110 | 10/2013 |
| WO | WO-2014051920 | 4/2014 |
| WO | WO-2014085502 | 6/2014 |

OTHER PUBLICATIONS

Corrected Notice of Allowance, U.S. Appl. No. 13/118,333, Jun. 1, 2015, 4 pages.
"Extended European Search Report", EP Application No. 11871863.4, May 11, 2015, 8 pages.
"Extended European Search Report", EP Application No. 11871917.8, May 11, 2015, 9 pages.
"Extended European Search Report", EP Application No. 11872137.2, Apr. 9, 2015, 12 pages.
Final Office Action, U.S. Appl. No. 13/228,707, Jun. 1, 2015, 20 pages.
Final Office Action, U.S. Appl. No. 13/228,876, Jun. 19, 2015, 20 pages.
Final Office Action, U.S. Appl. No. 13/229,155, Jun. 4, 2015, 16 pages.
"Foreign Office Action", CL Application No. 3368-2013, May 7, 2015, 7 pages.
"Foreign Office Action", CL Application No. 3369-2013, May 7, 2015, 6 pages.
"Foreign Office Action", CL Application No. 3370-2013, May 7, 2015, 6 pages.
"Foreign Office Action", CN Application No. 201180071186.4, Jun. 2, 2015, 7 pages.
"Foreign Office Action", CN Application No. 201210331158.8, May 11, 2015, 7 pages.
"Foreign Office Action", CN Application No. 201210331670.2, Mar. 25, 2015, 14 pages.
"Foreign Office Action", CO Application No. 13300256, Apr. 11, 2015, 8 Pages.
"Foreign Office Action", CO Application No. 13300265, Apr. 21, 2015, 11 Pages.
"Foreign Office Action", PH Application No. PH/1/2013/502367, Apr. 24, 2015, 3 pages.
Non-Final Office Action, U.S. Appl. No. 13/073,300, Apr. 30, 2015, 15 pages.
Non-Final Office Action, U.S. Appl. No. 13/118,314, Jun. 19, 2015, 23 pages.
Non-Final Office Action, U.S. Appl. No. 13/229,693, Apr. 23, 2015, 28 pages.
Non-Final Office Action, U.S. Appl. No. 13/550,432, Apr. 27, 2015, 15 pages.
Non-Final Office Action, U.S. Appl. No. 13/904,880, May 4, 2015, 22 pages.
Notice of Allowance, U.S. Appl. No. 13/118,333, May 4, 2015, 16 pages.
Notice of Allowance, U.S. Appl. No. 13/229,702, Apr. 29, 2015, 7 pages.
Notice of Allowance, U.S. Appl. No. 13/345,383, May 18, 2015, 5 pages.
Notice of Allowance, U.S. Appl. No. 14/109,779, Jun. 17, 2015, 4 pages.
"Rename a file", Retrieved from <http://windows.microsoft.com/en-us/windows7/rename-a-file> on Apr. 27, 2015, Aug. 24, 2009, 1 page.
Bederson,"Implementing a Zooming User Interface: Experience Building Pad++", Software Practice & Experience, Wiley & Sons, Aug. 1998, 34 pages.
Bederson,"Jazz: An Extensible Zoomable User Interface Graphics Toolkit in Java", Proceedings of the 2000 ACM SIGCPR Conference, Apr. 2000, 11 pages.
Jetter,"Materializing the Query with Facet-Streams—A Hybrid Surface for Collaborative Search on Tabletops", May 7, 2011, 10 pages.
"Adobe Acrobat 8 Standard User Guide", Adobe Systems Incorporated, 2007, pp. 34 & 36.
"Adobe Audition / Customizing Workspaces", Retrieved From: <http://help.adobe.com/en_US/audition/cs/using/WS9FA7B8D7-5991-4e05-B13C-4C85DAF1F051.html> Jul. 5, 2014, May 18, 2011, 6 Pages.
Advisory Action, U.S. Appl. No. 12/414,382, Jan. 20, 2012, 3 pages.
Advisory Action, U.S. Appl. No. 12/433,605, Apr. 5, 2012, 3 pages.
Advisory Action, U.S. Appl. No. 12/709,376, Dec. 19, 2013, 2 pages.
"Airbender 2.0", Retrieved From: <http://www.newtrent.com/airbender-2-0-nt30b.html> Mar. 31, 2014, 2013, 2 Pages.
"Alltel Adds Dedicated Search Key to Phones", Retrieved from: <http://www.phonescoop.com/news/item.php?n=2159> on Nov. 26, 2008., Apr. 12, 2007, 2 Pages.
"Android 2.3 User's Guide", AUG-2.3-103, Android mobile technology platform 2.3, Dec. 13, 2010, 380 pages.
"Apple Human Interface Guidelines: Windows", retrieved from <http://developer.apple.com/library/mac/#documentation/UserExperience/Conceptuai/AppleHIGuidelines/XHIGWindows/XHIGWindows.html> on Sep. 28, 2010, Aug. 20, 2009, 59 pages.
"Apple iPhone—8GB AT&T", Retrieved from: <http://nytimes.com/smartphones/apple-iphone-8gb-at/4515-6452_7-32309245.html> on Nov. 20, 2008, Jun. 29, 2007, 11 pages.
"Apple Unibody MacBook Pro #MB991LL/A 2.53 GHz Intel Core 2 Duo", Retrieved from: <http://www.themacstore.com/parts/show/c-nmb3-mb991ll_a> on Nov. 10, 2009, 12 pages.
"Application User Model IDs", Retrieved from: <http://msdn.microsoft.com/en-us/library/dd378459(VS.85).aspx> on Sep. 28, 2010, 6 pages.

(56) References Cited

OTHER PUBLICATIONS

"Ask Web Hosting", Retrieved from: <http://www.askwebhosting.com/story/18501/HTC_FUZE_From_ATandampT_Fuses_Fun_and_Function_With_the_One-Touch_Power_of_TouchFLO_3D.html> on May 5, 2009., Nov. 11, 2008, 3 pages.

"Basics of Your Device: Get Familiar with the Home Screen", Nokia USA—How to—retrieved from <http://www.nokia.ca/get-support-and-software/product-support/c6-01/how-to#> on May 11, 2011, 3 pages.

"Blackberry office tools: Qwerty Convert", Retrieved from: <http://blackberrysoftwarelist.net/blackberry/download-software/blackberry-office/qwerty_convert.aspx> on Nov. 20, 2008, 1 page.

"Bluetooth 360 Rotating Removable Keyboard Case Cover Stand for iPad 2 3 4", Retrieved From: <http://www.ebay.com/itm/Bluetooth-360-Rotating-Removable-Keyboard-Case-Cover-Stand-for-iPad-2-3-4-/200999748037> Mar. 31, 2014, Mar. 19, 2014, 3 Pages.

"Borderless Window Option", retrieved from <http://forums.lotro.com/show1hread.php?89700-Borderless-window-option> on Sep. 28, 2010, Sep. 9, 2007, 9 pages.

"Calc4M", Retrieved from: <http://www.hellebo.com/Calc4M.html> on Dec. 11, 2008, Sep. 10, 2008, 4 Pages.

"Class ScrollView", Retrieved from: <http://www.blackberry.com/developers/docs/6.0.0api/net/rim/device/api/ui/ScrollView.html> on Sep. 28, 2010, 13 pages.

"CloseAll Closes All Open Program Windows in One Click", Guiding Tech.com, Retrieved from <https://web.archive.org/web/20100424072622/http://www.guidingtech.com/2470/close-open-program-windows-in-one-click> on Apr. 1, 2015, Apr. 24, 2010, 6 pages.

"Content-Centric E-Mail Message Analysis in Litigation Document Reviews", Retrieved from: <http://www.busmanagement.com/article/Issue-14/Data-Management/Content-Centric-E-Mail-Message-Analysis-in-Litigation-Document-Reviews/> on May 6, 2009, 5 Pages.

Corrected Notice of Allowance, U.S. Appl. No. 13/656,574, Jan. 13, 2015, 4 pages.

Corrected Notice of Allowance, U.S. Appl. No. 13/656,574, Dec. 12, 2014, 4 pages.

Corrected Notice of Allowance, U.S. Appl. No. 13/656,639, Dec. 11, 2013, 3 pages.

Corrected Notice of Allowance, U.S. Appl. No. 14/089,149, Feb. 20, 2015, 2 pages.

"Daphne v1.47", retrieved from <http://www.drk.com.ar/daphne.php> on Nov. 18, 2011, 3 pages.

"Dell and Windows 7—The Wait Is Over", Retrieved from:.<http://content.dell.com/us/en/corp/d/press-releases/2009-10-22-Dell-and-Windows-7.aspx> on Nov. 10, 2009, Oct. 22, 2009, 2 pages.

"Dial a number", Retrieved from: <http://www.phonespell.org/ialhelp.html> on Nov. 20, 2008, 1 page.

"Display Control", Retrieved From: <http://www.portrait.com/technology/display-control.html> Jul. 4, 2014, Jun. 24, 2013, 5 Pages.

"DuoSense™ Multi-Touch Gestures", Retrieved from: <http://www.n-trig.com/Data/Uploads/Misc/DuoSenseMTG_final.pdf>, Jul. 2008, 4 pages.

"Elecont Quick Desktop 1.0.43", Retrieved from: <http://handheld.softpedia.com/get/System-Utilities/Launcher-Applications/Elecont-Quick-Desktop-72131.shtml> on May 5, 2009., Mar. 13, 2009, 2 pages.

"Email Notification for Microsoft Outlook and Outlook Express", Retrieved from: <http://www.contextmagic.com/express-notification/> on Sep. 29, 2010, Jul. 21, 2004, 3 pages.

"Enhanced IBM Power Systems Software and PowerVM Restructuring", IBM United States Announcement 208-082, dated Apr. 8, 2008, available at <http://www.ibm.com/common/ssi/rep_ca/2/897/ENUS208-082/ENUS208082.PDF>,Apr. 8, 2008, pp. 1-19.

"Ex Parte Mewherter, PTAB precedential decision", U.S. Appl. No. 10/685,192, May 8, 2013, 22 pages.

"Exclusive: Windows Mobile 7 to Focus on Touch and Motion Gestures", Retrieved from: <http://anti-linux.blogspot.com/2008/08/exclusive-windows-mobile-7-to-focus-on.html> on May 6, 2009, Aug. 1, 2008, 14 pages.

"Extended European Search Report", EP Application No. 09818253.8, Apr. 10, 2012, 7 pages.

"Extended European Search Report", EP Application No. 09822736.6, Dec. 18, 2012, 7 pages.

"Extended European Search Report", EP Application No. 10762112.0, Aug. 2, 2013, 7 Pages.

"Extended European Search Report", EP Application No. 11851985.9, Oct. 7, 2014, 6 pages.

"Extended European Search Report", EP Application No. 11866553.8, Dec. 9, 2014, 7 pages.

"Extended European Search Report", EP Application No. 11866579.3, Oct. 9, 2014, 7 pages.

"Extended European Search Report", EP Application No. 11866699.9, Jan. 15, 2015, 6 pages.

"Extended European Search Report", EP Application No. 11866745.0, Jan. 21, 2015, 10 pages.

"Extended European Search Report", EP Application No. 11866772.4, Jan. 15, 2015, 6 pages.

"Extended European Search Report", EP Application No. 11866939.9, Jan. 15, 2015, 8 pages.

"Extended European Search Report", EP Application No. 11867033.0, Nov. 27, 2014, 8 pages.

"Extended European Search Report", EP Application No. 11867076.9, Jan. 15, 2015, 8 pages.

"eXtreme Energy Conservation: Advanced Power-Saving Software for Wireless Devices", White Paper, Freescale Semiconductor, Inc., Document No. XTMENRGYCNSVWP, Rev #0, available at <http://www.freescale.com/files/32bit/doc/white_paper/XTMENRGYCNSVWP.pdf>,Feb. 2006, 15 pages.

Final Office Action, U.S. Appl. No. 11/305,789, Apr. 1, 2009, 10 pages.

Final Office Action, U.S. Appl. No. 11/502,264, Feb. 4, 2010, 15 pages.

Final Office Action, U.S. Appl. No. 11/502,264, Mar. 29, 2013, 16 pages.

Final Office Action, U.S. Appl. No. 11/502,264, Apr. 3, 2009, 9 pages.

Final Office Action, U.S. Appl. No. 12/244,545, Dec. 7, 2011, 16 pages.

Final Office Action, U.S. Appl. No. 12/244,545, Sep. 7, 2012, 23 pages.

Final Office Action, U.S. Appl. No. 12/413,977, Nov. 17, 2011, 16 pages.

Final Office Action, U.S. Appl. No. 12/414,382, Dec. 23, 2011, 7 pages.

Final Office Action, U.S. Appl. No. 12/414,476, Apr. 8, 2013, 25 pages.

Final Office Action, U.S. Appl. No. 12/414,476, Dec. 1, 2011, 20 pages.

Final Office Action, U.S. Appl. No. 12/433,605, Jul. 17, 2013, 13 pages.

Final Office Action, U.S. Appl. No. 12/433,605, Feb. 3, 2012, 11 pages.

Final Office Action, U.S. Appl. No. 12/433,667, Jan. 7, 2013, 17 pages.

Final Office Action, U.S. Appl. No. 12/433,667, Sep. 13, 2011, 17 pages.

Final Office Action, U.S. Appl. No. 12/469,458, Feb. 1, 2013, 19 pages.

Final Office Action, U.S. Appl. No. 12/469,458, Nov. 17, 2011, 15 pages.

Final Office Action, U.S. Appl. No. 12/469,480, Apr. 10, 2013, 21 pages.

Final Office Action, U.S. Appl. No. 12/469,480, Feb. 9, 2012, 17 pages.

Final Office Action, U.S. Appl. No. 12/472,699, Jul. 29, 2013, 12 pages.

Final Office Action, U.S. Appl. No. 12/472,699, Feb. 15, 2012, 12 pages.

(56) References Cited

OTHER PUBLICATIONS

Final Office Action, U.S. Appl. No. 12/480,969, Nov. 23, 2012, 18 pages.
Final Office Action, U.S. Appl. No. 12/480,969, Jul. 24, 2013, 19 pages.
Final Office Action, U.S. Appl. No. 12/484,799, Apr. 30, 2012, 13 pages.
Final Office Action, U.S. Appl. No. 12/560,081, Mar. 14, 2012, 16 pages.
Final Office Action, U.S. Appl. No. 12/577,400, Jan. 30, 2014, 36 pages.
Final Office Action, U.S. Appl. No. 12/577,400, Aug. 16, 2013, 25 pages.
Final Office Action, U.S. Appl. No. 12/577,400, Sep. 14, 2012, 26 pages.
Final Office Action, U.S. Appl. No. 12/695,842, Dec. 2, 2013, 17 pages.
Final Office Action, U.S. Appl. No. 12/695,937, Jul. 26, 2012, 13 pages.
Final Office Action, U.S. Appl. No. 12/695,976, Nov. 21, 2012, 10 pages.
Final Office Action, U.S. Appl. No. 12/700,357, Oct. 24, 2012, 13 pages.
Final Office Action, U.S. Appl. No. 12/700,460, Aug. 28, 2012, 26 pages.
Final Office Action, U.S. Appl. No. 12/700,510, Oct. 10, 2012, 23 pages.
Final Office Action, U.S. Appl. No. 12/709,204, Sep. 12, 2013, 24 pages.
Final Office Action, U.S. Appl. No. 12/709,204, Oct. 3, 2012, 24 pages.
Final Office Action, U.S. Appl. No. 12/709,245, Mar. 15, 2013, 16 pages.
Final Office Action, U.S. Appl. No. 12/709,245, Jan. 6, 2012, 13 pages.
Final Office Action, U.S. Appl. No. 12/709,282, 12/24/12, 11 pages.
Final Office Action, U.S. Appl. No. 12/709,282, Jul. 16, 2013, 11 pages.
Final Office Action, U.S. Appl. No. 12/709,301, Jan. 7, 2013, 14 pages.
Final Office Action, U.S. Appl. No. 12/709,301, Sep. 3, 2013, 12 pages.
Final Office Action, U.S. Appl. No. 12/709,301, Mar. 1, 2012, 11 pages.
Final Office Action, U.S. Appl. No. 12/709,348, Jan. 7, 2013, 15 pages.
Final Office Action, U.S. Appl. No. 12/709,348, Sep. 12, 2013, 12 pages.
Final Office Action, U.S. Appl. No. 12/709,348, Feb. 17, 2012, 13 pages.
Final Office Action, U.S. Appl. No. 12/709,376, Sep. 10, 2013, 12 pages.
Final Office Action, U.S. Appl. No. 12/709,376, Nov. 8, 2012, 20 pages.
Final Office Action, U.S. Appl. No. 12/709,376, Mar. 30, 2012, 16 pages.
Final Office Action, U.S. Appl. No. 12/713,053, Aug. 17, 2012, 10 pages.
Final Office Action, U.S. Appl. No. 12/713,081, May 9, 2012, 19 pages.
Final Office Action, U.S. Appl. No. 12/713,096, Feb. 15, 2013, 7 pages.
Final Office Action, U.S. Appl. No. 12/713,110, Jan. 17, 2013, 10 pages.
Final Office Action, U.S. Appl. No. 12/713,113, Oct. 8, 2013, 21 pages.
Final Office Action, U.S. Appl. No. 12/713,113, Jun. 4, 2012, 18 pages.
Final Office Action, U.S. Appl. No. 12/713,118, Oct. 26, 2012, 10 pages.
Final Office Action, U.S. Appl. No. 12/713,127, Jun. 6, 2012, 18 pages.
Final Office Action, U.S. Appl. No. 12/713,130, Jun. 29, 2012, 8 pages.
Final Office Action, U.S. Appl. No. 12/713,133, May 20, 2013, 10 pages.
Final Office Action, U.S. Appl. No. 12/713,133, Jul. 2, 2012, 8 pages.
Final Office Action, U.S. Appl. No. 12/721,422, Mar. 7, 2013, 10 pages.
Final Office Action, U.S. Appl. No. 12/972,967, Oct. 11, 2013, 21 pages.
Final Office Action, U.S. Appl. No. 12/983,106, Oct. 7, 2013, 19 pages.
Final Office Action, U.S. Appl. No. 13/073,300, Apr. 1, 2014, 14 pages.
Final Office Action, U.S. Appl. No. 13/118,181, Dec. 20, 2013, 18 pages.
Final Office Action, U.S. Appl. No. 13/118,204, Nov. 21, 2013, 24 pages.
Final Office Action, U.S. Appl. No. 13/118,221, Mar. 17, 2014, 21 pages.
Final Office Action, U.S. Appl. No. 13/118,265, Nov. 6, 2014, 19 pages.
Final Office Action, U.S. Appl. No. 13/118,288, Nov. 7, 2014, 14 pages.
Final Office Action, U.S. Appl. No. 13/118,292, Dec. 5, 2014, 30 pages.
Final Office Action, U.S. Appl. No. 13/118,302, Aug. 15, 2014, 17 pages.
Final Office Action, U.S. Appl. No. 13/118,314, Sep. 11, 2014, 18 pages.
Final Office Action, U.S. Appl. No. 13/118,321, Apr. 2, 2015, 30 pages.
Final Office Action, U.S. Appl. No. 13/118,321, Dec. 19, 2013, 30 pages.
Final Office Action, U.S. Appl. No. 13/118,333, Apr. 23, 2014, 22 pages.
Final Office Action, U.S. Appl. No. 13/118,339, Aug. 22, 2013, 21 pages.
Final Office Action, U.S. Appl. No. 13/118,347, Aug. 15, 2013, 25 pages.
Final Office Action, U.S. Appl. No. 13/224,258, Jul. 18, 2014, 39 pages.
Final Office Action, U.S. Appl. No. 13/224,258, Sep. 11, 2013, 37 pages.
Final Office Action, U.S. Appl. No. 13/228,707, May 21, 2014, 16 pages.
Final Office Action, U.S. Appl. No. 13/228,876, Jul. 18, 2014, 15 pages.
Final Office Action, U.S. Appl. No. 13/228,888, Oct. 24, 2014, 29 pages.
Final Office Action, U.S. Appl. No. 13/228,931, Dec. 19, 2014, 27 pages.
Final Office Action, U.S. Appl. No. 13/228,945, Oct. 23, 2014, 24 pages.
Final Office Action, U.S. Appl. No. 13/229,155, Jun. 12, 2014, 15 pages.
Final Office Action, U.S. Appl. No. 13/229,693, Jan. 6, 2015, 24 pages.
Final Office Action, U.S. Appl. No. 13/229,693, Sep. 4, 2013, 23 pages.
Final Office Action, U.S. Appl. No. 13/229,702, Jan. 15, 2015, 24 pages.
Final Office Action, U.S. Appl. No. 13/335,001, May 22, 2014, 19 pages.
Final Office Action, U.S. Appl. No. 13/335,001, Oct. 21, 2014, 34 pages.
Final Office Action, U.S. Appl. No. 13/335,001, Nov. 22, 2013, 18 pages.
Final Office Action, U.S. Appl. No. 13/345,383, Jul. 25, 2014, 26 pages.
Final Office Action, U.S. Appl. No. 13/345,383, Jul. 30, 2013, 27 pages.

(56) References Cited

OTHER PUBLICATIONS

Final Office Action, U.S. Appl. No. 13/484,075, May 21, 2013, 10 pages.
Final Office Action, U.S. Appl. No. 13/598,422, Aug. 6, 2014, 33 pages.
Final Office Action, U.S. Appl. No. 13/655,386, Jun. 6, 2013, 34 pages.
Final Office Action, U.S. Appl. No. 13/656,354, Jun. 17, 2013, 14 pages.
Final Office Action, U.S. Appl. No. 13/656,574, Aug. 23, 2013, 20 pages.
Final Office Action, U.S. Appl. No. 13/657,621, Jan. 15, 2015, 22 pages.
Final Office Action, U.S. Appl. No. 13/657,621, Sep. 10, 2013, 18 pages.
Final Office Action, U.S. Appl. No. 13/657,646, May 6, 2013, 12 pages.
Final Office Action, U.S. Appl. No. 13/657,789, Jun. 21, 2013, 35 pages.
Final Office Action, U.S. Appl. No. 13/658,694, Mar. 30, 2015, 30 pages.
Final Office Action, U.S. Appl. No. 13/658,694, Oct. 30, 2013, 17 pages.
"First Examination Report", NZ Application No. 618254, May 20, 2014, 3 Pages.
"First Examination Report", NZ Application No. 618264, May 20, 2014, 2 pages.
"First Examination Report", NZ Application No. 618269, May 20, 2014, 2 pages.
"First Examination Report", NZ Application No. 618284, May 20, 2014, 2 pages.
"Foreign Office Action", CN Application No. 200980142644.1, Aug. 20, 2013, 9 Pages.
"Foreign Office Action", CN Application No. 200980142661.5, Sep. 24, 2013, 8 Pages.
"Foreign Office Action", JP Application No. 2011-533353, Jul. 5, 2013, 9 Pages.
"Foreign Notice of Acceptance", NZ Application No. 618254, Jan. 20, 2015, 1 Page.
"Foreign Notice of Acceptance", NZ Application No. 618269, Oct. 31, 2014, 1 Page.
"Foreign Notice of Allowance", CN Application No. 201110429183.5, Mar. 9, 2015, 4 Pages.
"Foreign Notice of Allowance", CN Application No. 201110437572.2, Mar. 3, 2015, 3 Pages.
"Foreign Office Action", CL Application No. 2379-2011, Jul. 3, 2013, 8 pages.
"Foreign Office Action", CN Application No. 200980139831.4, Jul. 1, 2013, 12 pages.
"Foreign Office Action", CN Application No. 200980142632.9, Jun. 14, 2013, 6 pages.
"Foreign Office Action", CN Application No. 200980142632.9, Jan. 29, 2013, 11 pages.
"Foreign Office Action", CN Application No. 200980142644.1, Apr. 3, 2013, 10 pages.
"Foreign Office Action", CN Application No. 200980142661.5, Jan. 21, 2013, 12 pages.
"Foreign Office Action", CN Application No. 201080015728.1, May 16, 2013, 10 pages.
"Foreign Office Action", CN Application No. 201080015728.1, Dec. 26, 2012, 9 pages.
"Foreign Office Action", CN Application No. 201080015788.3, Jun. 5, 2013, 12 Pages.
"Foreign Office Action", CN Application No. 201080015788.3, Dec. 24, 2012, 10 pages.
"Foreign Office Action", CN Application No. 201080023212.1, Dec. 5, 2012, 10 pages.
"Foreign Office Action", CN Application No. 201080023212.1, Jun. 5, 2013, 8 pages.
"Foreign Office Action", CN Application No. 201080045865.X, Dec. 4, 2012, 10 pages.
"Foreign Office Action", CN Application No. 201080045865.X, Jun. 4, 2013, 10 pages.
"Foreign Office Action", CN Application No. 201110044285.5, Apr. 24, 2013, 8 pages.
"Foreign Office Action", CN Application No. 201110044285.5, Jun. 20, 2012, 12 pages.
"Foreign Office Action", CN Application No. 201110044285.5, Jan. 4, 2013, 13 pages.
"Foreign Office Action", CN Application No. 201110046510.9, May 31, 2013, 11 pages.
"Foreign Office Action", CN Application No. 201110046519.X, Mar. 19, 2013, 12 pages.
"Foreign Office Action", CN Application No. 201110046519.X, Aug. 2, 2012, 13 pages.
"Foreign Office Action", CN Application No. 201110046529.3, Feb. 4, 2013, 9 pages.
"Foreign Office Action", CN Application No. 201110046529.3, Aug. 16, 2012, 14 pages.
"Foreign Office Action", CN Application No. 201110050499.3, Nov. 27, 2012, 8 pages.
"Foreign Office Action", CN Application No. 201110050499.3, Aug. 3, 2012, 8 pages.
"Foreign Office Action", CN Application No. 201110050506.X, Apr. 2, 2013, 11 pages.
"Foreign Office Action", CN Application No. 201110050508.9, Mar. 7, 2013, 8 pages.
"Foreign Office Action", CN Application No. 201110050508.9, Aug. 3, 2012, 8 pages.
"Foreign Office Action", CN Application No. 201110050852.8, Mar. 26, 2013, 11 pages.
"Foreign Office Action", CN Application No. 201110429183.5, Jan. 6, 2014, 10 Pages.
"Foreign Office Action", CN Application No. 201110429183.5, Aug. 21, 2014, 13 Pages.
"Foreign Office Action", CN Application No. 201110437542.1, Jan. 6, 2014, 10 Pages.
"Foreign Office Action", CN Application No. 201110437542.1, Jan. 28, 2015, 7 pages.
"Foreign Office Action", CN Application No. 201110437542.1, Aug. 20, 2014, 8 pages.
"Foreign Office Action", CN Application No. 201110437572.2, Dec. 3, 2013, 7 pages.
"Foreign Office Action", CN Application No. 201110454251.3, Feb. 28, 2015, 9 Pages.
"Foreign Office Action", CN Application No. 201110454251.3, Oct. 21, 2014, 13 Pages.
"Foreign Office Action", CN Application No. 201110454251.3, Dec. 27, 2013, 12 Pages.
"Foreign Office Action", CN Application No. 201180071186.4, Jan. 20, 2015, 8 pages.
"Foreign Office Action", CN Application No. 201180071186.4, Jun. 13, 2014, 12 pages.
"Foreign Office Action", CN Application No. 201180071195.3, Mar. 18, 2015, 8 pages.
"Foreign Office Action", CN Application No. 201180071195.3, Aug. 25, 2014, 15 pages.
"Foreign Office Action", CN Application No. 201180071196.8, Sep. 11, 2014, 13 pages.
"Foreign Office Action", CN Application No. 201180071200.0, Feb. 17, 2015, 12 pages.
"Foreign Office Action", CN Application No. 201180071200.0, Aug. 19, 2014, 15 pages.
"Foreign Office Action", CN Application No. 201210317470.1, Feb. 11, 2015, 9 pages.
"Foreign Office Action", Cn Application No. 201210317470.1, Jun. 5, 2014, 12 pages.
"Foreign Office Action", CN Application No. 201210331158.8, Sep. 3, 2014, 16 Pages.
"Foreign Office Action", CN Application No. 201210331188.9, Oct. 10, 2014, 12 pages.

(56) References Cited

OTHER PUBLICATIONS

"Foreign Office Action", CN Application No. 201210331564.4, Dec. 3, 2014, 12 pages.
"Foreign Office Action", CN Application No. 201210331584.1, Nov. 3, 2014, 14 pages.
"Foreign Office Action", CN Application No. 201210331686.3, Mar. 3, 2015, 14 pages.
"Foreign Office Action", CN Application No. 201210331686.3, Jun. 13, 2014, 13 pages.
"Foreign Office Action", CO Application No. 13-298.756, Sep. 18, 2014, 13 Pages.
"Foreign Office Action", CO Application No. 13300256, Sep. 24, 2014, 8 Pages.
"Foreign Office Action", CO Application No. 13300259, Sep. 24, 2014, 15 Pages.
"Foreign Office Action", CO Application No. 13300265, Sep. 24, 2014, 10 Pages.
"Foreign Office Action", EP Application No. 10823883.3, Aug. 10, 2012, 5 pages.
"Foreign Office Action", EP Application No. 11747907.1, Jan. 28, 2013, 5 pages.
"Foreign Office Action", EP Application No. 11748026.9, Jan. 16, 2013, 5 pages.
"Foreign Office Action", EP Application No. 11748027.7, Jan. 18, 2013, 5 pages.
"Foreign Office Action", EP Application No. 11748028.5, Jan. 28, 2013, 5 pages.
"Foreign Office Action", EP Application No. 11748029.3, Jan. 16, 2013, 5 pages.
"Foreign Office Action", JP Application No. 2012-503523, Apr. 22, 2013, 5 Pages.
"Foreign Office Action", JP Application No. 2012-534255, Aug. 15, 2014, 6 Pages.
"Freeware.mobi", Retrieved from: <http://www.palmfreeware.mobi/download-palette.html> on Nov. 6, 2008, Oct. 9, 2001, 2 pages.
"Further Examination Report", NZ Application No. 618264, Dec. 3, 2014, 3 Pages.
"Gestures Programming", Retrieved from <http://doc.qt.digia.com/4.6/gestures-overview.html> on May 28, 2014, 2010, 3 pages.
"GnomeCanvas", Retrieved from: <http://library.gnome.org/devel/libgnomecanvas/unstable/GnomeCanvas.html> on Sep. 28, 2010, 11 pages.
"Google Apps versus Office 365: Audit Logs", Retrieved From: <http://www.linkgard.com/blog/google-apps/google-apps-vs-office-365-audit-logs.html> Mar. 29, 2014, Jul. 23, 2013, 8 pages.
"Guidelines for Panning", Retrieved From: <http://msdn.microsoft.com/en-in/library/windows/apps/hh465310.aspx> Aug. 19, 2014, Dec. 9, 2012, 5 Pages.
"Heatmap", Retrieved From: <https://support.google.com/drive/answer/91599?hl=en> Mar. 29, 2014, 2 Pages.
"How Do I Cancel a "Drag" Motion on an Android Seekbar?", retrieved from <http://stackoverflow.com/questions/2917969/how-do-i-cancel-a-drag-motion-on-an-android-seekbar> on Jun. 20, 2011, May 28, 2010, 1 page.
"How do I use Categories with my Weblog?", Retrieved from: <http://tpsupport.mtcs.sixapart.com/tp/us-tp1/how_do_i_use_categories_with_my_weblog.html> on Sep. 28, 2010, Sep. 16, 2009, 3 pages.
"How do you dial 1-800-FLOWERS", Retrieved from: <http://blogs.msdn.com/windowsmobile/archive/2007/02/06/how-do-you-dial-1-800-flowers.aspx> on Nov. 20, 2008, Feb. 6, 2007, 24 pages.
"How-to Close an Application in BlackBerry PlayBook?", retrieved from <http://stackoverflow.com/questions/5277027/how-to-close-an-application-in-blackberry-playbook> on Nov. 18, 2011, 2 pages.
"HTC Shows HTC Snap with Snappy Email Feature", Retrieved from: <http://www.wirelessandmobilenews.com/smartphones/ on 5/5/09>, May 4, 2009, 10 Pages.
"Image Gestures Example", Retrieved from <http://doc.qt.digia.com/4.6/gestures-imagegestures.html> on May 28, 2014, 2010, 3 pages.

"IntelliScreen—New iPhone App Shows Today Screen Type Info in Lock Screen", Retrieved from: <http://justanotheriphoneblog.com/wordpress//2008/05/13/intelliscreen-new-iphone-app-shows-today-screen-type-info-on-lock-screen/> on Nov. 12, 2008, May 13, 2008, 11 pages.
"International Search Report and Written Opinion", Application No. PCT/US2010/028555, Oct. 12, 2010, 10 pages.
"International Search Report and Written Opinion", Application No. PCT/US2011/025132, Oct. 26, 2011, 10 pages.
"International Search Report and Written Opinion", Application No. PCT/US2011/025131, Oct. 31, 2011, 10 pages.
"International Search Report and Written Opinion", Application No. PCT/US2010/028699, Oct. 4, 2010, 10 pages.
"International Search Report and Written Opinion", Application No. PCT/US2013/059563, Nov. 7, 2013, 10 pages.
"International Search Report and Written Opinion", Application No. PCT/US2013/060247, Dec. 10, 2013, 10 pages.
"International Search Report and Written Opinion", Application No. PCT/US2011/067075, Dec. 12, 2012, 10 pages.
"International Search Report and Written Opinion", Application No. PCT/US2009/061864, May 14, 2010, 10 pages.
"International Search Report and Written Opinion", Application No. PCT/US2009/061382, May 26, 2010, 10 pages.
"International Search Report and Written Opinion", Application No. PCT/US2011/067074, Aug. 27, 2012, 10 pages.
"International Search Report and Written Opinion", Application No. PCT/US2011/055725, Sep. 27, 2012, 10 pages.
"International Search Report and Written Opinion", Application No. PCT/US2009/061735, Jun. 7, 2010, 11 pages.
"International Search Report and Written Opinion", Application No. PCT/US2013/055507, Oct. 8, 2013, 12 pages.
"International Search Report and Written Opinion", Application No. PCT/US2010/034772, Dec. 29, 2010, 12 pages.
"International Search Report and Written Opinion", Application No. PCT/CN2014/074788, Dec. 30, 2014, 12 pages.
"International Search Report and Written Opinion", Application No. PCT/US2011/025973, Oct. 27, 2011, 13 pages.
"International Search Report and Written Opinion", Application No. PCT/US/2011025972, Sep. 30, 2011, 14 pages.
"International Search Report and Written Opinion", Application No. PCT/US2011/025575, Sep. 30, 2011, 14 pages.
"International Search Report and Written Opinion", Application No. PCT/CN2014/074825, Jan. 5, 2015, 15 pages.
"International Search Report and Written Opinion", Application No. PCT/CN2014/074793, Sep. 30, 2014, 15 pages.
"International Search Report and Written Opinion", Application No. PCT/US2011/025971, Oct. 31, 2011, 15 pages.
"International Search Report and Written Opinion", Application No. PCT/US2012/047091, Dec. 27, 2012, 15 pages.
"International Search Report and Written Opinion", Application No. PCT/CN2014/074783, Dec. 31, 2014, 15 pages.
"International Search Report and Written Opinion", Application No. PCT/CN2014/075046, Oct. 28, 2014, 16 pages.
"International Search Report and Written Opinion", Application No. PCT/US2013/061066, Feb. 4, 2014, 17 pages.
"International Search Report and Written Opinion", Application No. PCT/US2010/038730, Jan. 19, 2011, 8 pages.
"International Search Report and Written Opinion", Application No. PCT/US2011/020417, Oct. 20, 2011, 8 pages.
"International Search Report and Written Opinion", Application No. PCT/US2011/025974, Oct. 26, 2011, 8 pages.
"International Search Report and Written Opinion", Application No. PCT/US2011/055513, Mar. 27, 2012, 8 pages.
"International Search Report and Written Opinion", Application No. PCT/US2010/052119, May 2, 2011, 8 pages.
"International Search Report and Written Opinion", Application No. PCT/US2011/055514, May 22, 2012, 8 pages.
"International Search Report and Written Opinion", Application No. PCT/US2011/055512, May 24, 2012, 8 pages.
"International Search Report and Written Opinion", Application No. PCT/US2011/055520, May 9, 2012, 8 pages.
"International Search Report and Written Opinion", Application No. PCT/US2011/055524, Jun. 1, 2012, 8 pages.

(56) References Cited

OTHER PUBLICATIONS

"International Search Report and Written Opinion", Application No. PCT/US2011/065702, Aug. 29, 2012, 8 pages.
"International Search Report and Written Opinion", Application No. PCT/US2011/055736, Sep. 17, 2012, 8 pages.
"International Search Report and Written Opinion", Application No. PCT/US2011/067073, Sep. 17, 2012, 8 pages.
"International Search Report and Written Opinion", Application No. PCT/US2011/055511, Apr. 24, 2012, 9 pages.
"International Search Report and Written Opinion", Application No. PCT/US2011/055523, May 10, 2012, 9 pages.
"International Search Report and Written Opinion", Application No. PCT/US2011/055521, May 15, 2012, 9 pages.
"International Search Report and Written Opinion", Application No. PCT/US2011/055522, May 15, 2012, 9 pages.
"International Search Report and Written Opinion", Application No. PCT/US2011/020412, Aug. 31, 2011, 9 pages.
"International Search Report and Written Opinion", Application No. PCT/US2011/055496, Sep. 12, 2012, 9 pages.
"International Search Report and Written Opinion", Application No. PCT/US2011/055712, Sep. 21, 2012, 9 pages.
"International Search Report and Written Opinion", Application No. PCT/US2011/055493, Sep. 26, 212, 9 pages.
"International Search Report and Written Opinion", Application No. PCT/US2011/020410, Sep. 27, 2011, 9 pages.
"International Search Report and Written Opinion", Application No. PCT/US2011/055478, Sep. 27, 2012, 9 pages.
"International Search Report and Written Opinion", Application No. PCT/US2011/055746, Jul. 27, 2012, 9 pages.
"International Search Report and Written Opinion", Application No. PCT/US2010/028553, Application Filing Date: Mar. 24, 2010,Nov. 9, 2010, 9 pages.
"Internet Explorer Window Restrictions", Retrieved from: http://technet.microsoft.com/en-us/library/cc759517(WS.10).aspx on Jun. 28, 2011, Microsoft TechNet, 5 pages.
"Introducing Application Styling for Windows Forms", Infragistics Software Manual, Version 7.3.20073.1043, Nov. 2007, 95 pages.
"Introduction to Windows Touch", Retrieved from: <http://download.microsoft.com/download/a/d/f/adf1347d-08dc-41a4-9084-623b1194d4b2/Win7_touch.docx>, Dec. 18, 2008, pp. 1-7.
"iPad User Guide", retrieved from <http://cyndidannerkuhn.info/CDK/iPads_Resources_files/iPad_User_Guide.pdf> on Jun. 17, 2011, 154 pages.
"iPod touch User Guide for iPhone OS 3.0 Software", Apple Inc., 2009, 153 pages.
"iQuery & Css Example—Dropdown Menu", DesignReviver, Retrieved from: <http://designreviver.com/tutorials/jquery-css-example-dropdown-menu/> on Nov. 22, 2011,Oct. 7, 2008, 30 pages.
"KDE 4.0 Visual Guide: Desktop", Retrieved From: http://kde.org/announcements/4.0/desktop/php, Nov. 23, 2011, 8 Pages.
"Keyboard (5)", Retrieved from: <http://landru.uwaterloo.ca/cgi-bin/man.cgi?section=5&topic=keyboard> on Dec. 11, 2008., Aug. 11,1997, 8 Pages.
"Keyboard Case Adjustable 10inch Rotating Stand Bluetooth USB Apple Ipad 2 3", Retrieved From:<http://shopping.rediff.com/product/keyboard-case-adjustable-10inch-rotating-stand-bluetooth-usb-apple-ipad-2-3/11935954> Mar. 31, 2014, 2 Pages.
"Keyboard Shortcuts", Retrieved from: <http://www.pctoday.com/editorial/article.asp?article=articles%2F2005%2Ft0311%2F26t11%2F26t11.asp> on Aug. 3, 2009., Nov. 2005, 5 pages.
"KeyFolio Pro™ for iPad Air", Retrieved From:<http://www.kensington.com/kensington/us/us/s/3478/keyfolio-pro%E2%84%A2-for-ipad-air.aspx#.UxYF5PIdV8F> Feb. 26, 2014, Dec. 15, 2013, 2 Pages.
"Kiosk Browser Chrome Customization Firefox 2.x", Retrieved from: <http://stlouis-shopper.com/cgi-bin/mozdev-wiki/,pl?ChromeCustomization> on Oct. 22, 2008 Making a new chrome for the kiosk browser, Kiosk Project Kiosk Browser Chrome Customization Firefox-2.x,Aug. 16, 2007, 2 pages.
"Live Photo Gallery—Getting Started—from Camera to Panorama", Retrieved from: <http://webdotwiz.spaces.live.com/blog/cns!2782760752B93233!1729.entry> on May 5, 2009., Sep. 2008, 7 Pages.
"Logitech Ultrathin Keyboard Folio for iPad Air", Retrieved From: <http://store.apple.com/us/product/HE900VC/A/logitech-ultrathin-keyboard-folio-for-ipad-air> Mar. 28, 2014, 2013, 4 Pages.
"Magic mouse", Retrieved from: <http://www.apple.com/magicmouse/> on May 10, 2011, 3 pages.
"Manage Multiple Windows", Retrieved From: <http://windows.microsoft.com/en-hk/windows/manage-multiple-windows#1TC=windows-7> Jul. 8, 2014, 4 Pages.
"Meet ClamCase Pro", Retrieved From: <http://clamcase.com/bluetooth-ipad-keyboard-case.html?PID=6146810> Mar. 28, 2014, 6 Pages.
"MIDTB Tip Sheet: Book Courier", Retrieved from: <http://www.midtb.org/tipsbookcourier.htm> on Dec. 11, 2008., Sep. 26, 2005, 6 Pages.
"Mobile/UI/Designs/TouchScreen/workingUI", Retrieved from: <https://wiki.mozilla.org/Mobile/UI/Designs/TouchScreen/workingUI> on Oct. 26, 2009, 30 pages.
"moGo beta v.0.4", Retrieved from: <http://forum.xda-developers.com/showthread.php?t=375196> on Sep. 27, 2010, Mar. 7, 2008, 10 pages.
"MS-Content-Zoom-Snap-Points Property", Retrieved From: <http://msdn.microsoft.com/en-us/library/windows/apps/hh441259.aspx> Aug. 22, 2014, 2 Pages.
"-MS-Scroll-Snap-Type Property", Retrieved From: <http://msdn.microsoft.com/en-in/library/windows/apps/hh466057.aspx> Aug. 19, 2014, 1 Page.
"Multi-touch", Retrieved from <http://en.wikipedia.org/wiki/Multi-touch#Microsoft_Surface> on Apr. 24, 2009, Apr. 17, 2009, 8 pages.
"My Favorite Gadgets, System Monitor II", Retrieved from <http://www.myfavoritegadgets.info/monitors/SystemMonitorII/system-monitorII.html> on Mar. 12, 2013, Jun. 8, 2010, 5 pages.
"New Features in WhatsUp Gold v12.0", retrieved from <http://www.netbright.co.th/?name=product&file=readproduct&id=12> on Jun. 10, 2011, 4 pages.
"New iOS 8 Concept Lets You Expand Icons Into Widget Blocks", Retrieved From: <http://www.iclarified.com/41188/new-ios-8-concept-lets-you-expand-icons-into-widget-blocks-video> Jul. 16, 2014, May 30, 2014, 4 Pages.
"New MS Courier Leak Details Multi-Touch Interface", Retrieved from: <http://www.electronista.com/articles/09/11/04/courier.gestures.ui.explained/> on Nov. 10, 2009, Nov. 4, 2009, 9 pages.
"Nokia E61 Tips and Tricks for Keyboard Shortcuts", Retrieved from: <http://www.mobiletopsoft.com/board/1810/nokia-e61-tips-and-tricks-for-keyboard-shortcuts.html> on Dec. 17, 2008., Jan. 27, 2006, 2 Pages.
Non-Final Office Action, U.S. Appl. No. 13/228,707, Oct. 25, 2013, 12 pages.
Non-Final Office Action, U.S. Appl. No. 13/228,888, Feb. 10, 2014, 21 pages.
Non-Final Office Action, U.S. Appl. No. 11/215,052, Jun. 23, 2011, 17 pages.
Non-Final Office Action, U.S. Appl. No. 11/305,789, Sep. 21, 2009, 5 pages.
Non-Final Office Action, U.S. Appl. No. 11/502,264, Sep. 30, 2009, 15 pages.
Non-Final Office Action, U.S. Appl. No. 11/502,264, Sep. 14, 2012, 14 pages.
Non-Final Office Action, U.S. Appl. No. 12/244,545, Mar. 27, 2012, 18 pages.
Non-Final Office Action, U.S. Appl. No. 12/244,545, Aug. 17, 2011, 15 pages.
Non-Final Office Action, U.S. Appl. No. 12/413,977, Jul. 19, 2011, 17 pages.
Non-Final Office Action, U.S. Appl. No. 12/413,977, Jul. 20, 2012, 18 pages.
Non-Final Office Action, U.S. Appl. No. 12/414,382, Jul. 26, 2011, 9 pages.
Non-Final Office Action, U.S. Appl. No. 12/414,434, Jan. 17, 2012, 7 pages.

(56) References Cited

OTHER PUBLICATIONS

Non-Final Office Action, U.S. Appl. No. 12/414,434, May 31, 2012, 7 pages.
Non-Final Office Action, U.S. Appl. No. 12/414,434, Aug. 2, 2011, 6 pages.
Non-Final Office Action, U.S. Appl. No. 12/414,455, Aug. 29, 2011, 8 pages.
Non-Final Office Action, U.S. Appl. No. 12/414,458, Jul. 6, 2011, 8 pages.
Non-Final Office Action, U.S. Appl. No. 12/414,476, Nov. 9, 2012, 22 pages.
Non-Final Office Action, U.S. Appl. No. 12/414,476, Aug. 3, 2011, 21 pages.
Non-Final Office Action, U.S. Appl. No. 12/433,605, Jan. 11, 2013, 7 pages.
Non-Final Office Action, U.S. Appl. No. 12/433,605, Jun. 24, 2011, 10 pages.
Non-Final Office Action, U.S. Appl. No. 12/433,667, Jun. 7, 2011, 15 pages.
Non-Final Office Action, U.S. Appl. No. 12/433,667, Feb. 3, 2012, 16 pages.
Non-Final Office Action, U.S. Appl. No. 12/469,419, Nov. 9, 2011, 15 pages.
Non-Final Office Action, U.S. Appl. No. 12/469,419, May 23, 2012, 13 pages.
Non-Final Office Action, U.S. Appl. No. 12/469,458, May 3, 2013, 21 pages.
Non-Final Office Action, U.S. Appl. No. 12/469,458, Jul. 1, 2011, 15 pages.
Non-Final Office Action, U.S. Appl. No. 12/469,458, Sep. 21, 2012, 14 pages.
Non-Final Office Action, U.S. Appl. No. 12/469,480, Aug. 27, 2013, 22 pages.
Non-Final Office Action, U.S. Appl. No. 12/469,480, Oct. 17, 2012, 16 pages.
Non-Final Office Action, U.S. Appl. No. 12/469,480, Sep. 22, 2011, 14 pages.
Non-Final Office Action, U.S. Appl. No. 12/470,558, Nov. 22, 2011, 9 pages.
Non-Final Office Action, U.S. Appl. No. 12/472,699, Mar. 28, 2013, 10 pages.
Non-Final Office Action, U.S. Appl. No. 12/472,699, Oct. 23, 2013, 14 pages.
Non-Final Office Action, U.S. Appl. No. 12/472,699, Sep. 12, 2011, 12 pages.
Non-Final Office Action, U.S. Appl. No. 12/480,969, Apr. 4, 2013, 22 pages.
Non-Final Office Action, U.S. Appl. No. 12/480,969, Aug. 7, 2012, 15 pages.
Non-Final Office Action, U.S. Appl. No. 12/484,799, Aug. 11, 2011, 12 pages.
Non-Final Office Action, U.S. Appl. No. 12/484,799, Aug. 7, 2012, 13 pages.
Non-Final Office Action, U.S. Appl. No. 12/484,845, Dec. 7, 2011, 16 pages.
Non-Final Office Action, U.S. Appl. No. 12/560,081, Dec. 7, 2011, 16 pages.
Non-Final Office Action, U.S. Appl. No. 12/577,400, Apr. 15, 2013, 25 pages.
Non-Final Office Action, U.S. Appl. No. 12/577,400, Oct. 8, 2013, 24 pages.
Non-Final Office Action, U.S. Appl. No. 12/577,400, Apr. 11, 2012, 22 pages.
Non-Final Office Action, U.S. Appl. No. 12/695,842, May 22, 2013, 16 pages.
Non-Final Office Action, U.S. Appl. No. 12/695,842, Oct. 3, 2012, 16 pages.
Non-Final Office Action, U.S. Appl. No. 12/695,937, Apr. 25, 2012, 14 pages.
Non-Final Office Action, U.S. Appl. No. 12/695,976, Sep. 11, 2012, 8 pages.
Non-Final Office Action, U.S. Appl. No. 12/700,357, Jul. 2, 2012, 10 pages.
Non-Final Office Action, U.S. Appl. No. 12/700,460, Jan. 13, 2012, 21 pages.
Non-Final Office Action, U.S. Appl. No. 12/700,510, Feb. 7, 2012, 20 pages.
Non-Final Office Action, U.S. Appl. No. 12/709,204, Jun. 6, 2013, 27 pages.
Non-Final Office Action, U.S. Appl. No. 12/709,204, Nov. 20, 2013, 31 pages.
Non-Final Office Action, U.S. Appl. No. 12/709,204, May 10, 2012, 20 pages.
Non-Final Office Action, U.S. Appl. No. 12/709,245, May 30, 2013, 15 pages.
Non-Final Office Action, U.S. Appl. No. 12/709,245, Nov. 30, 2011, 11 pages.
Non-Final Office Action, U.S. Appl. No. 12/709,245, Mar. 21, 2012, 14 pages.
Non-Final Office Action, U.S. Appl. No. 12/709,282, Feb. 28, 2013, 11 pages.
Non-Final Office Action, U.S. Appl. No. 12/709,282, Oct. 10, 2013, 12 pages.
Non-Final Office Action, U.S. Appl. No. 12/709,282, Apr. 12, 2012, 9 pages.
Non-Final Office Action, U.S. Appl. No. 12/709,301, May 14, 2013, 14 pages.
Non-Final Office Action, U.S. Appl. No. 12/709,301, Oct. 24, 2013, 11 pages.
Non-Final Office Action, U.S. Appl. No. 12/709,301, Nov. 28, 2011, 9 pages.
Non-Final Office Action, U.S. Appl. No. 12/709,301, Sep. 13, 2012, 13 pages.
Non-Final Office Action, U.S. Appl. No. 12/709,348, Apr. 25, 2013, 15 pages.
Non-Final Office Action, U.S. Appl. No. 12/709,348, Dec. 20, 2013, 9 pages.
Non-Final Office Action, U.S. Appl. No. 12/709,348, Dec. 7, 2011, 12 pages.
Non-Final Office Action, U.S. Appl. No. 12/709,348, Aug. 2, 2012, 14 pages.
Non-Final Office Action, U.S. Appl. No. 12/709,376, May 23, 2013, 17 pages.
Non-Final Office Action, U.S. Appl. No. 12/709,376, Jan. 23, 2012, 14 pages.
Non-Final Office Action, U.S. Appl. No. 12/709,376, Aug. 17, 2012, 17 pages.
Non-Final Office Action, U.S. Appl. No. 12/713,053, Nov. 23, 2012, 13 pages.
Non-Final Office Action, U.S. Appl. No. 12/713,053, Feb. 3, 2012, 8 pages.
Non-Final Office Action, U.S. Appl. No. 12/713,081, Nov. 29, 2012, 9 pages.
Non-Final Office Action, U.S. Appl. No. 12/713,081, Dec. 23, 2011, 18 pages.
Non-Final Office Action, U.S. Appl. No. 12/713,096, Jan. 30, 2014, 23 pages.
Non-Final Office Action, U.S. Appl. No. 12/713,096, Jun. 26, 2013, 8 pages.
Non-Final Office Action, U.S. Appl. No. 12/713,096, Jun. 6, 2012, 9 pages.
Non-Final Office Action, U.S. Appl. No. 12/713,110, May 3, 2013, 10 pages.
Non-Final Office Action, U.S. Appl. No. 12/713,110, Jun. 21, 2012, 21 pages.
Non-Final Office Action, U.S. Appl. No. 12/713,113, Apr. 23, 2013, 18 pages.
Non-Final Office Action, U.S. Appl. No. 12/713,113, Dec. 22, 2011, 20 pages.
Non-Final Office Action, U.S. Appl. No. 12/713,118, Jun. 8, 2012, 7 pages.

(56) References Cited

OTHER PUBLICATIONS

Non-Final Office Action, U.S. Appl. No. 12/713,127, Jan. 31, 2014, 21 pages.
Non-Final Office Action, U.S. Appl. No. 12/713,127, Dec. 27, 2011, 22 pages.
Non-Final Office Action, U.S. Appl. No. 12/713,130, Jan. 16, 2013, 5 pages.
Non-Final Office Action, U.S. Appl. No. 12/713,130, Jan. 23, 2012, 7 pages.
Non-Final Office Action, U.S. Appl. No. 12/713,133, Jan. 14, 2013, 8 pages.
Non-Final Office Action, U.S. Appl. No. 12/713,133, Jan. 31, 2012, 7 pages.
Non-Final Office Action, U.S. Appl. No. 12/713,133, Dec. 10, 2013, 8 pages.
Non-Final Office Action, U.S. Appl. No. 12/721,422, Oct. 1, 2012, 7 pages.
Non-Final Office Action, U.S. Appl. No. 12/972,967, Jan. 30, 2013, 19 pages.
Non-Final Office Action, U.S. Appl. No. 12/972,967, Nov. 6, 2014, 17 pages.
Non-Final Office Action, U.S. Appl. No. 12/977,235, Jun. 24, 2014, 15 pages.
Non-Final Office Action, U.S. Appl. No. 12/977,584, Dec. 7, 2012, 8 pages.
Non-Final Office Action, U.S. Appl. No. 12/978,184, Jan. 23, 2013, 7 pages.
Non-Final Office Action, U.S. Appl. No. 12/983,106, Sep. 10, 2014, 19 pages.
Non-Final Office Action, U.S. Appl. No. 12/983,106, Nov. 9, 2012, 17 pages.
Non-Final Office Action, U.S. Appl. No. 13/073,300, Jul. 25, 2013, 13 pages.
Non-Final Office Action, U.S. Appl. No. 13/118,181, Mar. 4, 2013, 22 pages.
Non-Final Office Action, U.S. Appl. No. 13/118,204, Feb. 28, 2013, 13 pages.
Non-Final Office Action, U.S. Appl. No. 13/118,221, Mar. 1, 2013, 22 pages.
Non-Final Office Action, U.S. Appl. No. 13/118,257, Mar. 5, 2013, 19 pages.
Non-Final Office Action, U.S. Appl. No. 13/118,265, Jun. 10, 2014, 13 pages.
Non-Final Office Action, U.S. Appl. No. 13/118,288, Jul. 2, 2014, 17 pages.
Non-Final Office Action, U.S. Appl. No. 13/118,292, Jun. 6, 2014, 25 pages.
Non-Final Office Action, U.S. Appl. No. 13/118,302, Mar. 4, 2014, 10 pages.
Non-Final Office Action, U.S. Appl. No. 13/118,314, Feb. 27, 2014, 13 pages.
Non-Final Office Action, U.S. Appl. No. 13/118,321, Jun. 10, 2013, 32 pages.
Non-Final Office Action, U.S. Appl. No. 13/118,321, Nov. 12, 2014, 33 pages.
Non-Final Office Action, U.S. Appl. No. 13/118,333, Jul. 5, 2013, 18 pages.
Non-Final Office Action, U.S. Appl. No. 13/118,339, Feb. 11, 2013, 15 pages.
Non-Final Office Action, U.S. Appl. No. 13/118,339, Dec. 10, 2014, 16 pages.
Non-Final Office Action, U.S. Appl. No. 13/118,347, Feb. 12, 2013, 14 pages.
Non-Final Office Action, U.S. Appl. No. 13/118,347, Dec. 3, 2014, 28 pages.
Non-Final Office Action, U.S. Appl. No. 13/196,272, Feb. 6, 2013, 10 pages.
Non-Final Office Action, U.S. Appl. No. 13/196,272, Sep. 3, 2013, 5 pages.
Non-Final Office Action, U.S. Appl. No. 13/224,258, Jan. 8, 2013, 35 pages.
Non-Final Office Action, U.S. Appl. No. 13/228,707, Nov. 13, 2014, 20 pages.
Non-Final Office Action, U.S. Appl. No. 13/228,876, Jan. 29, 2015, 18 pages.
Non-Final Office Action, U.S. Appl. No. 13/228,876, Nov. 22, 2013, 14 pages.
Non-Final Office Action, U.S. Appl. No. 13/228,931, Apr. 7, 2014, 21 pages.
Non-Final Office Action, U.S. Appl. No. 13/228,945, Apr. 14, 2014, 22 pages.
Non-Final Office Action, U.S. Appl. No. 13/229,155, Jan. 7, 2015, 14 pages.
Non-Final Office Action, U.S. Appl. No. 13/229,155, Nov. 18, 2013, 14 pages.
Non-Final Office Action, U.S. Appl. No. 13/229,556, Mar. 28, 2014, 12 pages.
Non-Final Office Action, U.S. Appl. No. 13/229,693, Mar. 12, 2013, 21 pages.
Non-Final Office Action, U.S. Appl. No. 13/229,693, Jun. 20, 2014, 25 pages.
Non-Final Office Action, U.S. Appl. No. 13/229,702, Jul. 3, 2014, 28 pages.
Non-Final Office Action, U.S. Appl. No. 13/229,709, Apr. 7, 2014, 12 pages.
Non-Final Office Action, U.S. Appl. No. 13/335,001, Apr. 1, 2015, 25 pages.
Non-Final Office Action, U.S. Appl. No. 13/335,001, Aug. 7, 2014, 20 pages.
Non-Final Office Action, U.S. Appl. No. 13/335,001, Sep. 13, 2013, 15 pages.
Non-Final Office Action, U.S. Appl. No. 13/335,001, Jan. 8, 2014, 17 pages.
Non-Final Office Action, U.S. Appl. No. 13/345,263, Oct. 24, 2013, 19 Pages.
Non-Final Office Action, U.S. Appl. No. 13/345,383, Feb. 14, 2014, 26 pages.
Non-Final Office Action, U.S. Appl. No. 13/345,383, Jan. 29, 2015, 5 pages.
Non-Final Office Action, U.S. Appl. No. 13/345,383, Feb. 28, 2013, 25 pages.
Non-Final Office Action, U.S. Appl. No. 13/484,075, Jan. 15, 2013, 9 pages.
Non-Final Office Action, U.S. Appl. No. 13/492,495, Dec. 19, 2012, 6 pages.
Non-Final Office Action, U.S. Appl. No. 13/492,495, Sep. 17, 2012, 8 pages.
Non-Final Office Action, U.S. Appl. No. 13/598,422, Feb. 21, 2014, 31 pages.
Non-Final Office Action, U.S. Appl. No. 13/655,386, Dec. 26, 2012, 23 pages.
Non-Final Office Action, U.S. Appl. No. 13/655,390, Dec. 17, 2012, 12 pages.
Non-Final Office Action, U.S. Appl. No. 13/656,354, Feb. 6, 2013, 10 pages.
Non-Final Office Action, U.S. Appl. No. 13/656,574, Jan. 31, 2013, 21 pages.
Non-Final Office Action, U.S. Appl. No. 13/656,639, Feb. 7, 2013, 29 pages.
Non-Final Office Action, U.S. Appl. No. 13/657,621, Feb. 7, 2013, 19 pages.
Non-Final Office Action, U.S. Appl. No. 13/657,621, Jul. 28, 2014, 22 pages.
Non-Final Office Action, U.S. Appl. No. 13/657,646, Aug. 12, 2014, 14 pages.
Non-Final Office Action, U.S. Appl. No. 13/657,646, Jan. 3, 2013, 13 pages.
Non-Final Office Action, U.S. Appl. No. 13/657,789, Jan. 9, 2013, 38 pages.
Non-Final Office Action, U.S. Appl. No. 13/658,694, Feb. 13, 2014, 19 pages.

(56) References Cited

OTHER PUBLICATIONS

Non-Final Office Action, U.S. Appl. No. 13/658,694, Apr. 26, 2013, 13 pages.
Non-Final Office Action, U.S. Appl. No. 13/658,694, Aug. 14, 2014, 26 pages.
Non-Final Office Action, U.S. Appl. No. 14/089,149, Nov. 3, 2014, 8 pages.
Non-Final Office Action, U.S. Appl. No. 14/109,779, Nov. 21, 2014, 9 pages.
"Normalizing Text: A Java Tutorial by Oracle", Retrieved from: <http://docs.oracle.com/javase/tutorial/i18n/text/normalizerapi.html> on Apr. 8, 2014, Nov. 11, 2006, 3 pages.
Notice of Allowance, U.S. Appl. No. 11/215,052, Mar. 14, 2012, 5 pages.
Notice of Allowance, U.S. Appl. No. 11/305,789, Nov. 23, 2009, 8 pages.
Notice of Allowance, U.S. Appl. No. 12/414,382, Apr. 4, 2012, 4 pages.
Notice of Allowance, U.S. Appl. No. 12/414,434, Aug. 17, 2012, 4 pages.
Notice of Allowance, U.S. Appl. No. 12/414,455, Jan. 4, 2012, 4 pages.
Notice of Allowance, U.S. Appl. No. 12/414,458, Oct. 31, 2011, 2 pages.
Notice of Allowance, U.S. Appl. No. 12/414,458, Nov. 29, 2011, 2 pages.
Notice of Allowance, U.S. Appl. No. 12/414,458, Aug. 10, 2011, 6 pages.
Notice of Allowance, U.S. Appl. No. 12/433,667, Jun. 25, 2013, 14 pages.
Notice of Allowance, U.S. Appl. No. 12/469,419, Nov. 27, 2012, 13 pages.
Notice of Allowance, U.S. Appl. No. 12/470,558, Apr. 2, 2012, 7 pages.
Notice of Allowance, U.S. Appl. No. 12/470,558, Aug. 23, 2012, 2 pages.
Notice of Allowance, U.S. Appl. No. 12/472,699, May 2, 2014, 6 pages.
Notice of Allowance, U.S. Appl. No. 12/484,799, Oct. 22, 2012, 10 pages.
Notice of Allowance, U.S. Appl. No. 12/484,845, Mar. 16, 2012, 5 pages.
Notice of Allowance, U.S. Appl. No. 12/695,064, Mar. 28, 2012, 12 pages.
Notice of Allowance, U.S. Appl. No. 12/695,959, Apr. 17, 2012, 13 pages.
Notice of Allowance, U.S. Appl. No. 12/713,053, Jun. 7, 2013, 7 pages.
Notice of Allowance, U.S. Appl. No. 12/713,110, Dec. 4, 2013, 13 pages.
Notice of Allowance, U.S. Appl. No. 12/713,130, Feb. 19, 2013, 5 pages.
Notice of Allowance, U.S. Appl. No. 12/713,133, Jan. 17, 2014, 4 pages.
Notice of Allowance, U.S. Appl. No. 12/721,422, Jul. 11, 2013, 9 pages.
Notice of Allowance, U.S. Appl. No. 12/977,584, Jun. 19, 2013, 5 pages.
Notice of Allowance, U.S. Appl. No. 12/978,184, Nov. 6, 2013, 5 pages.
Notice of Allowance, U.S. Appl. No. 12/978,184, Aug. 2, 2013, 5 pages.
Notice of Allowance, U.S. Appl. No. 13/118,204, Jul. 8, 2014, 8 pages.
Notice of Allowance, U.S. Appl. No. 13/118,339, Mar. 31, 2015, 7 pages.
Notice of Allowance, U.S. Appl. No. 13/118,347, Apr. 1, 2015, 7 pages.
Notice of Allowance, U.S. Appl. No. 13/196,272, Nov. 8, 2013, 8 pages.
Notice of Allowance, U.S. Appl. No. 13/229,556, Sep. 2, 2014, 12 pages.
Notice of Allowance, U.S. Appl. No. 13/229,709, Sep. 2, 2014, 4 pages.
Notice of Allowance, U.S. Appl. No. 13/492,495, Apr. 26, 2013, 5 pages.
Notice of Allowance, U.S. Appl. No. 13/655,386, Apr. 25, 2014, 6 pages.
Notice of Allowance, U.S. Appl. No. 13/655,390, May 24, 2013, 5 pages.
Notice of Allowance, U.S. Appl. No. 13/656,574, Sep. 23, 2014, 7 pages.
Notice of Allowance, U.S. Appl. No. 13/656,639, Aug. 19, 2013, 14 pages.
Notice of Allowance, U.S. Appl. No. 13/657,646, Feb. 6, 2015, 15 pages.
Notice of Allowance, U.S. Appl. No. 13/657,789, Aug. 4, 2014, 16 pages.
Notice of Allowance, U.S. Appl. No. 14/089,149, Dec. 5, 2014, 4 pages.
"Notifications", retrieved from <http://msdn.microsoft.com/en-us/library/aa511497.aspx> on May 10, 2011, 16 pages.
"OmneMon™ System Resource Metrics", retrieved from <http://www.omnesys.com/documents/OmneMonSRM_Brochure.pdf> on Jun. 10, 2011, 3 pages.
"ONYX Graphics Announces New ONYX Prepedge Job Preparation Software", retrieved from <http://www.largeformatreview.com/rip-software/433-onyx-graphics-announces-new-onyx-> on May 10, 2011, 2 pages.
"Oracle Mobile Sales Assistant User Guide for BlackBerry", Retrieved from <http://download.oracle.com/docs/cd/E12547_01/books/PDF/MobileSalesAsstBB.pdf.>, Nov. 2008, 20 pages.
"Oracle8i Application Developer's Guide—Advanced Queuing Release 2 (8.1.6)", Retrieved from: http://www.cs.otago.ac.nz/oradocs/appdev.817/a76938/adq01in5.htm on May 6, 2009., Dec. 1999, 8 pages.
"Oracle8i Application Developer's Guide—Advanced Queuing", Retrieved from: http://www.cs.umbc.edu/help/oracle8/server.815/a68005/03_adq1i.htm on May 6, 2009., Feb. 1999, 29 Pages.
"Oracle8i Concepts Release 8.1.5", Retrieved from: http://www.cs.umbc.edu/help/oracle8/server.815/a67781/c16queue.htm on May 6, 2009., Feb. 1999, 10 Pages.
"Organize Your Desktop Workspace for More Comfort with WindowSpace", Retrieved From: <http://www.ntwind.com/software/windowspace.html> Jul. 4, 2014, Sep. 19, 2008, 5 Pages.
"Palette Extender 1.0.2", Retrieved from: <http://palette-extender.en.softonic.com/symbian> on Nov. 6, 2008, Jan. 21, 2003, 2 pages.
"Parallax Scrolling", Retrieved from: <http://en.wikipedia.org/wiki/Parallax_scrolling> on May 5, 2009., May 4, 2009, 3 Pages.
"Purple Swivel Rotating Stand Case Cover Wireless Bluetooth Keyboard for iPad Air", Retrieved From: <http://www.ebay.com/itm/Purple-Swivel-Rotating-Stand-Case-Cover-Wireless-Bluetooth-Keyboard-for-iPad-Air-/400686726944> Mar. 31, 2014, 9 Pages.
"Push Notifications Overview for Windows Phone", Retrieved from: <http://msdn.microsoft.com/en-us/library/ff402558%28VS.92%29.aspx> on Sep. 30, 2010, Sep. 3, 2010, 1 page.
"QNX Photon microGUI Windowing System", Retrieved from: <http://www.qnx.com/developers/docs/6.5.0/index.jsp?topic=%2Fcom.qnx.doc.photon_prog_guide%2Fdragndrop.html> on Apr. 6, 2014, 22 pages.
"QODE Ultimate Keyboard Case for iPad (4th & 3rd gen) and iPad 2", Available at: <http://www.belkin.com/us/p/P-F5L149/>, Mar. 28, 2013, 8 pages.
"QPinchGesture Class Reference", Retrieved from <http://doc.qt.digia.com/4.6/qpinchgesture.html> on May 28, 2014, 2010, 6 pages.
"Remapping the Keyboard", Retrieved from: <http://publib.boulder.ibm.com/infocenter/hodhelp/v9r0/index.jsp?topic=/com.ibm.hod9.doc/help/assignkey.html> on Dec. 11, 2008., Jul. 15, 2005, 5 Pages.
Restriction Requirement, U.S. Appl. No. 13/118,265, Feb. 27, 2014, 7 pages.
Restriction Requirement, U.S. Appl. No. 13/118,288, Mar. 4, 2014, 7 pages.

(56) References Cited

OTHER PUBLICATIONS

Restriction Requirement, U.S. Appl. No. 13/658,694, Feb. 6, 2013, 6 pages.
"Search Report", CN Application No. 201110437551.0, Dec. 23, 2013, 2 pages.
"SecureMe-Anti-Theft Security Application for S60 3rd", Retrieved from: <http://www.killermobile.com/newsite/mobile-software/s60-applications/secureme-%11-anti%11theft-security-application-for-s60-3rd.htm> on Jun. 28, 2011, Dec. 15, 2008, 3 pages.
"Shottrack for Windows VoD Software Analysis", Retrieved From: http://www.matrixconsult.com.au/ MATRIX_Web_Files/Shot-Track_Software_Manual.pdf, Nov. 23, 2011, 47 Pages.
"SizeUp the Missing Window Manager", Retrieved From: <https://www.irradiatedsoftware.com/sizeup/> Jul. 4, 2014, Jan. 17, 2013, 4 Pages.
"SmartView Tiling User Guide", Available at: <http://dealers.savantav.com/portal/SavantSandbox/Released%20User%20Guides/009-1108-00%20SmartView%20Tiling%20User%20Guide.pdf>, Jan. 2014, 25 Pages.
"Snap", Windows 7 Features—retrieved from <http://windows.microsoft.com/en-US/windows7/products/features/snap> on Sep. 23, 2011, 2 pages.
"Split the Windows® Desktop: How to Divide a Single Large Desktop into Multiple Smaller Ones", retrieved from <http://www.actualtools.com/multiplemonitors/split-windows-desktop-how-to-divide-single-large-desktop-into-smaller-ones.shtml> on Jul. 7, 2014, Apr. 10, 2014, 3 pages.
Supplemental Notice of Allowance, U.S. Appl. No. 12/433,667, Aug. 1, 2013, 2 pages.
Supplemental Notice of Allowance, U.S. Appl. No. 12/713,133, Feb. 3, 2014, 2 pages.
Supplemental Notice of Allowance, U.S. Appl. No. 12/977,584, Sep. 16, 2013, 2 pages.
Supplemental Notice of Allowance, U.S. Appl. No. 12/977,584, Oct. 11, 2013, 2 pages.
Supplemental Notice of Allowance, U.S. Appl. No. 12/978,184, Feb. 25, 2014, 2 pages.
Supplemental Notice of Allowance, U.S. Appl. No. 13/118,204, Sep. 10, 2014, 2 pages.
Supplemental Notice of Allowance, U.S. Appl. No. 13/118,204, Oct. 2, 2014, 2 pages.
Supplemental Notice of Allowance, U.S. Appl. No. 13/118,204, Oct. 23, 2014, 3 pages.
Supplemental Notice of Allowance, U.S. Appl. No. 13/655,390, Sep. 19, 2013, 2 pages.
Supplemental Notice of Allowance, U.S. Appl. No. 13/655,390, Jul. 25, 2013, 2 pages.
Supplemental Notice of Allowance, U.S. Appl. No. 13/656,574, Feb. 25, 2015, 4 pages.
Supplemental Notice of Allowance, U.S. Appl. No. 14/089,149, Mar. 20, 2015, 2 pages.
"Supplementary European Search Report", EP Application No. 11747907.1, Nov. 7, 2012, 3 pages.
"Supplementary European Search Report", EP Application No. 11748027.7, Nov. 29, 2012, 3 pages.
"Supplementary European Search Report", EP Application No. 11748028.5, Nov. 7, 2012, 3 pages.
"Supplementary European Search Report", European Patent Application No. 10823883.3, Jul. 31, 2012, 3 pages.
"Switch between Windows of the Same App", Retrieved from <http://www.ntwind.com/software/vistaswitcher/instance-switcher.html> on Feb. 20, 2013, May 12, 2012, 2 pages.
"Symbian Applications", Retrieved from: <http://symbianfullversion.blogspot.com/2008_12_01_archive.html> on May 5, 2009., Jan. 2009, 51 Pages.
"TaskOS", AppBrain retrieved from <http://www.appbrain.com/app/taskos/com.profete162.TaskOS> on Nov. 11, 211, 2 pages.
"The Map Screen", retrieved from <http://www.symbianos.org/whereamiusersguide> on Jun. 17, 2011, 3 pages.
"The Start Menu (overview)", retrieved from <http://web.archive.org/web/20101219151141/http://www.windows.microsoft.com/en-US/windows-vista/The-Start-menu-overview> on Feb. 12, 2013, Dec. 19, 2010, 5 pages.
"ThumbJot", Retrieved form <http://thumbjot.com/wp/?page_id=8>, 2008, 2 pages.
"Tiles and Notifications for Windows Phone", Retrieved From: <http://msdn.microsoft.com/en-us/library/windowsphone/develop/jj662933.aspx> Apr. 1, 2014, Mar. 11, 2014, 2 Pages.
"Top 3 Task Switchers for Android", TechCredo—retrieved from <http://www.techcredo.com/android/top-3-task-switchers-for-android> on May 11, 2011, Mar. 9, 2011, 5 pages.
"Top Android App: Swipepad", Best Android Apps Review—retrieved from <http://www.bestandroidappsreview.com/2011/01/top-android-app-swipepad-launcher.html> on May 11, 2011, 4 pages.
"Touch Shell Free", Retrieved from: <http://www.pocketpcfreeware.mobi/download-touch-shell-free.html> on May 5, 2009., Feb. 23, 2009, 2 Pages.
"UI Guidelines Version 2.1", Retrieved from: http://na.blackberry.com/eng/deliverables/6622/BlackBerry_Smartphones-US.pdf., 76 Pages.
"User Guide", retrieved from <http://wireframesketcher.com/help/help.html> on Jun. 17, 2011, 19 pages.
"Vista—User Experiences: Site-Centric Browsing on Windows", retrieved from <http://www.vistax64.com/vista-news/283040-user-experiences-site-centric-browsing-windows.html> on Sep. 28, 2010, 6 pages.
"What You Should Expect from the Windows 7 Beta", Retrieved From: http://www.howtogeek.com/howto/the-geek-blog/what-you-should-expect-from-the-windows-7-beta/, Nov. 23, 2011, 17 Pages.
"What's new in Excel 2013", Retrieved From: <http://office.microsoft.com/en-in/excel-help/what-s-new-in-excel-2013-HA102809308.aspx> Mar. 28, 2014, Oct. 30, 2012, 5 Pages.
"Window Desktop", Retrieved From: http://pjnicholson.com/windowsdesktop.htm, Nov. 23, 2011, 4 Pages.
"Window Frames", MSDN, retrieved from <http://msdn.microsoft.com/en-us/library/aa974173.aspx> on Sep. 28, 2010, 7 pages.
"Window Magnet", Retrieved From: <http://magnet.crowdcafe.com/> Jul. 4, 2014, Jun. 23, 2011, 2 Pages.
"Windows 8 Is Gorgeous, But Is It More Than Just a Shell? (Video)", retrieved from <http://techcrunch.com/2011/06/02/windows-8-gorgeous-shell-video/> on Jun. 20, 2011, Jun. 2, 2011, 6 pages.
"Windows Phone 7 (Push Notification)", retrieved from <http://unknownerror.net/2011-06/windows-phone-7-push-notification-36520> on Jul. 6, 2011, 4 pages.
"Windows Phone 7 Live Tiles", Retrieved from: <http://www.knowyourmobile.com/microsoft/windowsphone7/startscreen/640737/windows_phone_7_live_tiles.html> on May 11, 2011, Oct. 20, 2010, 3 pages.
"Winterface Review", Retrieved from: <http://www.mytodayscreen.com/winterface-review/> on Nov. 12, 2008, Jul. 9, 2008, 42 pages.
"Womma", Retrieved from: <http://www.womma.org/blog/links/wom-trends/> on May 5, 2009., 2007, 70 Pages.
"Working with Multiple Windows", MSOFFICE tutorial!—retrieved from <http://www.msoffice-tutorial.com/working-with-multiple-windows.php> on Sep. 23, 2011, 3 pages.
"Working with Windows", Retrieved From: http://h30097.www3hp.com/docs/base_doc/documentation/F40F html/AQ917BTE/docu_004.htm,, Nov. 23, 2011, 14 pages.
"Working with Windows", Retrieved From: <http://windows.microsoft.com/en-us/windows/working-with-windows#1TC=windows-7> Jul. 4, 2014, 10 Pages.
"You've Got Mail 1.4 Build", retrieved from <http://www.fileshome.com/Shows_Animation_Plays_Sound_Automatic_N . . . > on Jan. 6, 2010, Jun. 18, 2007, 2 pages.
"YUI 3: ScrollView [beta]", Retrieved From: <http://developer.yahoo.com/yui/3/scrollview/> on Sep. 28, 2010, 5 pages.

(56) References Cited

OTHER PUBLICATIONS

"ZAGGkeys PROfolio+ Keyboard", Retrieved From: <http://www.zagg.com/accessories/zaggkeys-ipad-profolio-plus-keyboard-case/7063?cj__aid=10539646&cj__pid=6146810&cj__sid=fwn62ieocicw#7063?cj__aid=10539646&cj__pid=6146810&cj__sid=fwn62ieocicw&__suid=13959948728450884140834287934 2> Mar. 31, 2014, 2013, 9 pages.
Aguilar, "How to Run Multiple Instances of the Same App in Mac OS X", Retrieved from <http://operating-systems.wonderhowto.com/how-to/run-multiple-instances-same-app-mac-os-x-0140144/> on Feb. 20, 2013, Jan. 1, 2013, 4 Pages.
Al "Droptiles—Metro Style Live Tiles Enabled Web 2.0 Dashboard", Retrieved from <http://oazabir.github.com/Droptiles/> on Mar. 5, 2013, Jul. 18, 2012, 7 pages.
Alexander, "MeeGo Basics", retrieved from <http://meego.com/developers/ui-design-guidelines/handset/meego-basics> on Sep. 28, 2010, Jun. 29, 2010, 8 pages.
Anson, "Pining for Windows Phone 7 controls? We got ya covered! [Announcing the first release of the Silverlight for Windows Phone Toolkit!]", Retrieved from <http://blogs.msdn.com/b/delay/archive/2010/09/16/pining-for-windows-phone-7-controls-we-got-ya-covered-announcing-the-first-release-of-the-silverlight-for-windows-phone-toolkit.aspx> on May 30, 2014, Sep. 16, 2010, 17 pages.
Appleinsider, "Special Report: Apple's Touch-Sensitive iPod Ambitions Disclosed in Filing", Retrieved from: <http://www.appleinsider.com/articles/06/10/26/special_report_apples_touch_sensitive_ipod_ambitions_disclosed_in_filing.html> on Nov. 11, 2009, Oct. 26, 2006, 10 pages.
Ashraf, "Winsplit Revolution: Tile, Resize, and Position Windows for Efficient Use of Your Screen", Retrieved From: <http://dottech.org/11240/winsplit-revolution-tile-resize-and-position-windows-for-efficient-use-of-your-screen/> Jul. 8, 2014, Dec. 18, 2011, 4 Pages.
Banerjee, "Using Facebook, Twitter and Google Plus from a Single Browser Tab—A Complete Guide", Retrieved from: <http://www.ampercent.com/post-to-google-plus-facebook-twitter-one-location/9597/> on Feb. 15, 2012, Aug. 3, 2011, 11 pages.
Bates, "A Framework to Support Large-Scale Active Applications", University of Cambridge Computer Laboratory—Available at <http://citeseerx.ist.psu.edu/viewdoc/download?doi=10.1.1.48.1690&rep=rep1&type=pdf>, 1996, 8 pages.
Baweja, "OpenHeatMap: Create Heat Maps for Excel Spreadsheets With Geo Data", Retrieved From: <http://www.makeuseof.com/tag/openheatmap-create-heat-maps/> Mar. 29, 2014, Jul. 24, 2010, 4 Pages.
Beiber, et al., "Screen Coverage: A Pen-Interaction Problem for PDA's and Touch Screen Computers", In Proceedings of ICWMC 2007, Mar. 2007, 6 pages.
Bhatnagar, "Locate and Kill Annoying Processes in Windows", Trouble Fixers: All About Fixing Computer Troubles—retrieved from <http://www.troublefixers.com/locate-and-kill-annoying-processes-in-windows/> on Nov. 18, 2011, Apr. 19, 2010, 4 pages.
Bisson, "Windows 8 Developer Preview", Retrieved From: <http://www.zdnet.com/windows-8-developer-preview-3040093921/> Jul. 10, 2014, Sep. 13, 2011, 9 pages.
Bjork, et al., "Redefining the Focus and Context of Focus+Context Visualizations", In Proceedings of INFOVIS 2000—Available at <http://www.johan.redstrom.se/papers/redefining.pdf>, Oct. 2000, 9 pages.
Blankenburg, "31 Days of Mango | Day #11: Live Tiles", Retrieved from <http://www.jeffblankenburg.com/2011/11/11/31-days-of-mango-day-11-live-tiles/> on Mar. 5, 2013, Nov. 11, 2011, 10 pages.
Bolton, "A Slide-out Keyboard on an Android tablet. Genius or total madness?", Retrieved From: <http://www.techradar.com/reviews/pc-mac/tablets/asus-eee-pad-slider-1036296/review> Mar. 31, 2014, Oct. 25, 2011, 8 pages.
Bowes, et al., "Transparency for Item Highlighting", Faculty of Computing Science, Dalhousie University—Available at <http://torch.cs.dal.ca/~dearman/pubs/GI2003-bowes,dearman,perkins-paper.pdf>, 2003, 2 pages.
Brandl, et al., "Combining and Measuring the Benefits of Bimanual Pen and Direct-Touch Interaction on Horizontal Interfaces", Retrieved from: <http://www.merl.com/papers/docs/TR2008-054.pdf> on Nov. 5, 2009, Mitsubishi Electric Research Laboratories, May 2008, 10 pages.
Bruzzese, "Using Windows 7, Managing and Monitoring Windows 7—Chapter 11", Que Publishing, May 5, 2010, 33 pages.
Buring, "User Interaction with Scatterplots on Small Screens—A Comparative Evaluation of Geometric-Semantic Zoom and Fisheye Distortion", IEEE Transactions on Visualization and Computer Graphics, vol. 12, Issue 5, Available at <http://citeseerx.ist.psu.edu/viewdoc/download?doi=10.1.1.134.4568%rep=rep1&type=pdf>, Sep. 2006, pp. 829-836.
Camick, "Wrap Layout", Java Tips Weblog, retrieved from <https://tips4java.wordpress.com/2008/11/06/wrap-layout/> on Jan. 11, 2015, Nov. 6, 2008, 28 pages.
Carrera, et al., "Conserving Disk Energy in Network Servers", available at <http://citeseerx.ist.psu.edu/viewdoc/download?doi=10.1.1.6.8301&rep=rep1&type=ps>, Nov. 2002, 15 pages.
Cawley, "How to Customize Your Windows Phone 7", Retrieved from: <http://www.brighthub.com/mobile/windows-mobile-platform/articles/95213.aspx> on May 10, 2011, Nov. 12, 2010, 3 pages.
Cawley, "Windows Phone 7 Customization Tips and Tricks", retrieved from <http://www.brighthub.com/mobile/windows-mobile-platform/articles/95213.aspx> on Jun. 20, 2011, May 16, 2011, 2 pages.
Cohen, et al., "Automatic Strategies in the Siemens RTL Tiled Window Manager", In Proceedings: The 2nd IEEE Conference on Computer Workstations, Mar. 7, 1988, pp. 111-119.
Cohen, et al., "Wang Tiles for Image and Texture Generation", In Proceedings of SIGGRAPH 2003—Available <http://research.microsoft.com/en-us/um/people/cohen/WangFinal.pdf>, 2003, 8 pages.
Crouch, "Smartphone Wars: Micron's Slide-to-Unlock Patent", Jan. 30, 2013, 2 pages.
Damien, "7 Ways to Supercharge Multitasking in Android", retrieved from <http://maketecheasier.com/7-ways-to-supercharge-multitasking-in-android/2011/01/22/> on May 11, 2011, Jan. 22, 2011, 5 pages.
Daniels, "Brave New World", Retrieved from: <http://bookseller-association.blogspot.com/2009_03_01_archive.html> on Nov. 10, 2009, Mar. 2009, 54 pages.
Danish, "Win7sé Brings Mac-Like Screen Corners to Windows 7 & Windows 8", retrieved from <http://technomondo.com/2011/11/13/win7se-brings-mac-like-screen-corners-to-windows-7-windows8/> on Nov. 23, 2011, Nov. 13, 2011, 4 pages.
Davis, "A WPF Custom Control for Zooming and Panning", Retrieved from: <http://www.codeproject.com/KB/WPF/zoomandpancontrol.aspx> on Sep. 28, 2010, Jun. 29, 2010, 21 pages.
Delimarsky, "Sending Tile Push Notifications on Windows Phone 7", retrieved from <http://mobile.dzone.com/articles/sending-tile-push> on May 10, 2011, Aug. 25, 2010, 2 pages.
Denoue, et al., "WebNC: Efficient Sharing of Web Applications", In Proceedings of WWW 2009—Available at <http://www.fxpal.com/publications/FXPAL-PR-09-495.pdf>, 2009, 2 pages.
Dixon, "Living in the Online Cloud: The T-Mobile G1 / Google Android Smartphone", Retrieved from <http://www.manifest-tech.com/media_pda/t-mobile_g1_android.htm>, Dec. 2008, 3 pages.
Dolcourt, "Webware", Retrieved from: <http://news.cnet.com/webware/?categoryId=2010> on May 5, 2009., 13 Pages.
Dunsmuir, "Selective Semantic Zoom of a Document Collection", Available at <http://www.cs.ubc.ca/~tmm/courses/533/projects/dustin/proposal.pdf>, Oct. 30, 2009, pp. 1-9.
Egan, "Modifying Live Tiles in a Background Process", Retrieved from <http://thesociablegeek.com/windows-8/livetiles/modifying-live-tiles-in-a-background-process/> on Mar. 5, 2013, Aug. 31, 2012, 24 pages.

(56) References Cited

OTHER PUBLICATIONS

Elliott, "First Dell, Then HP: What's Next for N-trig's Multitouch Screen Technology", Retrieved from: <http://news.cnet.com/8301-17938_105-10107886-1.html> on Nov. 11, 2009, Nov. 25, 2008, 5 pages.
Emigh, "Lenovo Launches Windows 7 ThinkPads with Multitouch and Outdoor Screens", Retrieved from: <http://www.betanews.com/article/Lenovo-launches-Window-7-ThinkPads-with-multitouch-and-outdoor-screens/1253017166> on Nov. 11, 2009, Sep. 15, 2009, 3 pages.
Farrugia, et al., "Cell Phone Mini Challenge: Node-Link Animation Award Animating Multivariate Dynamic Social Networks", IEEE Symposium on Visual Analytics Science and Technology, Columbus, OH, USA, Oct. 21-23, 2008, Oct. 21, 2008, 2 pages.
Fisher, "Cool Discussion of Push Notifications—Toast and Tile—on Windows Phone", Retrieved from: <http://www.windowsphoneexpert.com/Connection/forums/p/4153/18399.aspx> on Sep. 29, 2010, May 3, 2010, 3 pages.
Foley, "The JavaScript Behind Touch-Friendly Sliders", Retrieved From: <http://css-tricks.com/the-javascript-behind-touch-friendly-sliders/> Aug. 19, 2014, Jun. 13, 2013, 14 Pages.
Friedlaender, "Better Way to Delete and Close Apps from Task Manager", retrieved from <http://www.ideasproject.com/ideas/14475> on Nov. 21, 2011, Nov. 15, 2011, 2 pages.
Gade, "Samsung Alias u740", Retrieved from: <http://www.mobiletechreview.com/phones/Samsung-U740.htm> on Nov. 20, 2008, Mar. 14, 2007, 6 pages.
Gao, "A General Logging Service for Symbian based Mobile Phones", Retrieved from: <http://www.nada.kth.se/utbildning/grukth/exjobb/rapportlistor/2007/rapporter07/gao_rui_07132.pdf.> on Jul. 17, 2008, Feb. 2007, pp. 1-42.
Gralla, "Windows XP Hacks, Chapter 13—Hardware Hacks", O'Reilly Publishing, Feb. 23, 2005, 25 pages.
Greenberg, "Review: SHARKK Apple iPad Air Wireless Bluetooth Keyboard Case", Retrieved From: <http://www.runaroundtech.com/2014/01/25/review-sharkk-apple-ipad-air-wireless-bluetooth-keyboard-case/> Mar. 31, 2014, Jan. 25, 2014, 6 Pages.
Gross, "Stretch-A-Sketch: A Dynamic Diagrammer", IEEE Symposium on Visual Languages, Available at <http://depts.washington.edu/dmachine/PAPER/VL94/v1.html>,Oct. 1994, 11 pages.
Ha, et al., "SIMKEYS: An Efficient Keypad Configuration for Mobile Communications", Retrieved from: < http://ieeexplore.ieee.org/stamp/stamp.jsp?arnumber=01362557.> on Dec. 17, 2008, Nov. 2004, 7 Pages.
Hahn, "Freedom Case, the Adjustable Stand and Protective Case for Microsoft Surface Tablets with Patent-Pending Folding Design, Launches Pre-Orders on Kickstarter", Retrieved From: <http://www.prweb.com/releases/2014/02/prweb11583725.htm> Mar. 3, 2014, Feb. 8, 2014, 4 Pages.
Harrison, "Symbian OS C++ for Mobile Phones vol. 3", Retrieved from: <http://www.amazon.co.uk/Symbian-OS-Mobile-Phones-Press/dp/productdescription/0470066415> on Oct. 23, 2008, Symbian Press,Jun. 16, 2003, 4 pages.
Hickey, "Google Android has Landed; T-Mobile, HTC Unveil G1", Retrieved from: <http://www.crn.com/retail/210603348> on Nov. 26, 2008., Sep. 23, 2008, 4 pages.
Hinckley, et al., "Codex: A Dual Screen Tablet Computer", Conference on Human Factors in Computing Systems, Apr. 9, 2009, 10 pages.
Hinckley, et al., "Stitching: Pen Gestures that Span Multiple Displays", CHI 2004, Available at <http://www.cs.cornell.edu/~francois/Papers/2004-Hinckley-AVI04-Stitching.>,2004, pp. 1-8.
Hollister, "Windows 8 Primer: How to Navigate Microsoft's New Operating System", retrieved from <http://www.theverge.com/2012/10/28/3562172/windows-8-gestures-keyboard-shortcuts-tips-tricks-how-to-guide> on Aug. 7, 2014, Oct. 28, 2012, 30 pages.
Horowitz, "Installing and Tweaking Process Explorer part 2", Retrieved from <http://web.archive.org/web/20110510093838/http://blogs.computerworld.com/16165/installing_and_tweaking_process_explorer_part_2> on Mar. 12, 2013, May 23, 2010, 7 pages.
Janecek, et al., "An Evaluation of Semantic Fisheye Views for Opportunistic Search in an Annotated Image Collection", Available at <http://citeseerx.ist.psu.edu/viewdoc/download?doi=10.1.1.67.3084&rep=rep1&type=pdf>, Feb. 15, 2005, pp. 1-15.
Johnson, "Samsung Galaxy Tab Pro 10.1 Review", Retrieved From: <http://hothardware.com/Reviews/Samsung-Galaxy-Tab-Pro-101-Review/?page=3#!baG2DY > Jul. 9, 2014, Mar. 21, 2014, 10 Pages.
Kandogan, et al., "Elastic Windows: Improved Spatial Layout and Rapid Multiple Window Operations", In Proceedings of the Workshop on Advanced Visual Interfaces, May 27, 1996, 10 Pages.
Kcholi, "Windows CE .NET Interprocess Communication", Retrieved from http://msdn.microsoft.com/en-us/library/ms836784.aspx on Jul. 17, 2008., Jan. 2004, 15 Pages.
Keranen, "OpenGL-based User Interface Toolkit for Symbian Mobile Devices", Master of Science Thesis, Tamere University of Technology, Department of Information Technology, Apr. 6, 2005, 88 pages.
Kessler, "Microsoft Research Shows Off Awesome Interactive Live Tiles for Windows", Retrieved From: <http://www.wpcentral.com/microsoft-research-shows-interactive-live-tiles-windows> Jul. 10, 2014, Apr. 11, 2014, 29 Pages.
Kishore, "Split or Divide Your Desktop Screen into Multiple Parts", retrieved from <http://www.online-tech-tips.com/free-software-downloads/split-or-divide-your-desktop-screen-into-multiple-parts/> on Jul. 7, 2014, Oct. 18, 2008, 7 pages.
Krazit, "Has Apple Found the Magic Touch?", Retrieved from: <http://news.cnet.com/8301-13579_3-9879471-37.html> on Nov. 10, 2009, Feb. 26, 2008, 2 pages.
Kurdi, "Acer GridVista: snap your windows to pre-defined sections on your screen(s)", Retrieved from <http://www.freewaregenius.com/acer-gridvista-snap-your-windows-to-pre-defined-sections-of-your-screens/> on Jun. 30, 2013, Jan. 19, 2010, 6 pages.
Kurdi, "WinSplit Revolution", Retrieved from <http://www.freewaregenius.com/winsplit-revolution/> on Jun. 30, 2013, Aug. 22, 2007, 4 Pages.
La, "Parallax Gallery", Available at <http://webdesignerwall.comtutorials/parallax-gallery/comment-page-1>, Apr. 25, 2008, 16 pages.
Livingston, et al., "Windows 95 Secrets", 1995, I DG Books Worldwide, 3rd Edition, 1995, pp. 121-127.
Long, "Gmail Manager 0.6", Retrieved from: <https://addons.mozilla.org/en-US/firefox/addon/1320/> on Sep. 29, 2010, Jan. 27, 2010, 4 pages.
Mann, et al., "Spectrum Analysis of Motion Parallax in a 3D Cluttered Scene and Application to Egomotion", Journal of the Optical Society of America A, vol. 22, No. 9—Available at <http://www.cs.uwaterloo.ca/~mannr/snow/josa-mann-langer.pdf>, Sep. 2005, pp. 1717-1731.
Mantia, "Multitasking: What Does It Mean?", retrieved from <http://mantia.me/blog/multitasking/> on Sep. 23, 2011, 3 pages.
Mao, "Comments of Verizon Wireless Messaging Services, LLC", Retrieved from: http://www.ntia.doc.gov/osmhome/warnings/comments/verizon.htm on May 6, 2009., Aug. 18, 2000, 5 Pages.
Marie, "MacBook Trackpad Four Fingers Swipe Left/Right to Switch Applications" MacBook Junkie—retrieved from <http://www.macbookjunkie.com/macbook-trackpad-four-fingers-swipe-left-right-to-switch-applicaitons/> on May 11, 2011, Nov. 13, 2010, 4 pages.
Matejka, et al., "Patina: Dynamic Heatmaps for Visualizing Application Usage", In Proceedings: The SIGCHI Conference on Human Factors in Computing Systems, Autodesk Research, Toronto, Ontario, Canada,Apr. 27, 2013, pp. 3227-3236.
Mazo, "How to Switch Applications and Multitask on the Galaxy S3", Retrieved from <http://www.androidcentral.com/how-switch-applications-and-multitask-samsung-galaxy-s3> on Feb. 18, 2013, Jul. 17, 2012, 7 pages.
McGee, "Expandable Tiles with Pinch to Expand", Retrieved From: <http://wpdev.uservoice.com/forums/110705-dev-platform/suggestions/2283791-expandable-tiles-with-pinch-to-expand> Jul. 9, 2014, Sep. 29, 2011, 3 Pages.

(56) References Cited

OTHER PUBLICATIONS

Mei, et al., "Probabilistic Multimodality Fusion for Event Based Home Photo Clustering", Retrieved from: <http://ieeexplore.ieee.org//stamp/stamp.jsp?tp=&arnumber=04036960.>, Dec. 26, 2006, pp. 1757-1760.
Michaluk, "Using the Application Switcher and Closing Apps When Finished to Maximize your BlackBerry Efficiency", Retrieved from <http://crackberry.com/using-application-switcher-and-closing-apps-when-finished-maximize-your-blackberry-efficiency> on Feb. 19, 2013, Aug. 17, 2009, 14 pages.
Minsky, "Manipulating Simulated Objects with Real-world Gestures using a Force and Position Sensitive Screen", Computer Graphics, vol. 18, No. 3, Available at <http://delivery.acm.org/10.1145/810000/808598/p195-minsky.pdf?key1=808598&key2=2244955521&coll=GUIDE&dl=GUIDE&CFID=57828830 & CFTOKEN=43421964>,Jul. 1984, pp. 195-203.
Mpdooley, "SeaMonkey Hangs during Drag Operation", mozillaZine—retrieved from <http://forums.mozillazine.org/viewtopic.php?f=5&t=1783735> on Nov. 18, 2011, Mar. 5, 2010, 2 pages.
Mullender, "Digital Dashboards: Web Parts Integrate with Internet Explorer and Outlook to Build Personal Portals", Retrieved from: < http://technet.microsoft.com/en-us/query/bb985692> on,Jan. 2001, 5 pages.
Muller, "MultiSplitPane: Splitting without Nesting", Java.net, retrieved from <http://today.java.net/pub/a/today/2006/03/23/multi-split-pane.html> on Mar. 23, 2006, Mar. 23, 2006, 6 pages.
Nordgren, "Development of a Touch Screen Interface for Scania Interactor", Master's Thesis in C—Available at <http://www.cs.umu.se/education/examina/Rapporter/PederNordgren.pdf>omputing Science, UMEA University, Apr. 10, 2007, pp. 1-59.
Oliver, "Potential iPhone Usability and Interface Improvements", Retrieved from: <http://www.appleinsider.com/articles/08/09/18/potential_iphone_usability_and_interface_improvements.html> on Nov. 12, 2008, AppleInsider,Sep. 18, 2008, 4 pages.
Olwal, et al., "Rubbing and Tapping for Precise and Rapid Selection on Touch-Screen Displays", Conference on Human Factors in Computing Systems, Available at <http://www.csc.kth.se/~alx/projects/research/rubbing/olwal_rubbing_tapping_chi_2008.pdf>,Apr. 2008, 10 pages.
O'Reilly, "How to Use the Microsoft Surface Touch Screen and Keyboard", Retrieved From: <http://www.cnet.com/how-to/how-to-use-the-microsoft-surface-touch-screen-and-keyboard/> Jul. 5, 2014, Nov. 6, 2012, 5 Pages.
Oryl, "Review: Asus P527 Smartphone for North America", Retrieved from: <http://www.mobileburn.com/review.jsp?Id=4257> on Dec. 17, 2008., Mar. 5, 2008, 1 Page.
Padilla, "Palm Treo 750 Cell Phone Review—Hardware", Retrieved from: <http://www.wirelessinfo.com/content/palm-Treo-750-Cell-Phone-Review/Hardware.htm> on Dec. 11, 2008., Mar. 17, 2007, 4 Pages.
Paul, "Hands-on: KDE 4.5 Launches with Tiling, New Notifications", Retrieved from: <http://arstechnica.com/open-source/reviews/2010/08/hands-on-kde-45-launches-with-tiling-new-notifications.ars> on Sep. 29, 2010, Aug. 2010, 3 pages.
Paul, "Three Windows Multitasking Features That Help Maximize Your Screen Space", Retrieved From: <http://www.pcworld.com/article/2094124/three-windows-multitasking-features-that-help-maximize-your-screen-space.html> Jul. 4, 2014, Feb. 4, 2014, 4 Pages.
Pendharkar, "Fluid Home Screen for Mobile Phones", Helsinki Metropolia University of Applied Sciences, Master of Engineering, Information Technology, Thesis, Available at <http://theseus17-kk.lib.helsinki.fi/bitstream/handle/10024/46481/FinalThesis3.pdf?sequence=1/>,Apr. 12, 2012, 48 pages.
Perry, "Teach Yourself Windows 95 in 24 Hours", 1997, Sams Publishing, 2nd Edition, 1997, pp. 193-198.
Pierce, et al., "Toolspaces and Glances: Storing, Accessing, and Retrieving Objects in 3D Desktop Applications", 1999 Symposium on Interactive 3D Graphics, Available at <http://delivery.acm.org/10.1145/310000/300545/p163-pierce.pdf?key1=300545&key2=8792497521&coll=GUIDE&dl=GUIDE&CFID=61004073&CFTOKEN=28819248>,Apr. 1999, pp. 163-168.
Pointet, "Scrollsnap", Retrieved From: <http://benoit.pointet.info/stuff/jquery-scrollsnap-plugin/> Aug. 19, 2014, Jun. 29, 2013, 3 Pages.
Raghaven, et al., "Model Based Estimation and Verification of Mobile Device Performance", Available at http://alumni.cs.ucsb.edu/~raimisl/emsoft04_12.pdf., Sep. 27-29, 2004, 10 Pages.
Rakow, et al., "CSS Scroll Snap Points Module Level 1", Retrieved From: <http://dev.w3.org/csswg/css-snappoints/> Aug. 19, 2014, Mar. 5, 2014, 18 Pages.
Rathbone, "Windows Phone 7 Live Tile Schedules—How to Execute Instant Live Tile Updates", Retrieved from <http://www.diaryofaninja.com/blog/2011/04/03/windows-phone-7-live-tile-schedules-ndash-executing-instant-live-tile-updates> on Mar. 11, 2013, Apr. 3, 2011, 8 pages.
Ray, "Microsoft Re-Tiles Mobile Platform for Windows 7 Era", retrieved from <http://www.theregister.co.uk/2010/02/15/windows_phone_7_series/> on May 11, 2011, Feb. 15, 2010, 2 pages.
Reed, "Microsoft Demos Windows Mobile 6.1 at CTIA", Retrieved from: <http://www.networkworld.com/news/2008/040208-ctia-microsoft-windows-mobile.html> on Jul. 18, 2008, Apr. 2, 2008, 1 page.
Remond, "Mobile Marketing Solutions", Retrieved from: <http://www.mobilemarketingmagazine.co.uk/mobile_social_networking/> on May 5, 2009., Apr. 28, 2009, 16 Pages.
Rice, et al., "A System for Searching Sound Palettes", Proceedings of the Eleventh Biennial Symposium on Arts and Technology,, Available at <http://www.comparisonics.com/FindSoundsPalettePaper.pdf>,Feb. 2008, 6 pages.
Ritchie, "iOS 4 features: iPod touch Wi-Fi stays connected when asleep—iPhone too?", Retrieved from: <http://www.goip.com/2010/06/ios-4-features-ipod-touch-wi-fi-stays-connected-when-asleep-%E2%80%94-iphone-too/> on Sep. 30, 2010, Jun. 14, 2010, 2 pages.
Ritscher, "Using Surface APIs in your WPF application—Part 1", Retrieved from: <http://blog.wpfwonderland.com/2009/06/30/using-surface-apis-in-your-vpf-applicaiton/> on Sep. 28, 2010, Jun. 30, 2009, 7 pages.
Roberts, "Touching and Gesturing on the iPhone", Available at <http://www.sitepen.com/blog/2008/07/10/touching-and-gesturing-on-the-iphone/comments-pare-1>, Jul. 10, 2008, 16 pages.
Rossi, et al., "Enabling New Interoperable Panning Experiences Through the CSS Scrolling Snap Points Specification", Retrieved From:.<http://blogs.msdn.com/b/ie/archive/2013/10/22/enabling-new-interoperable-panning-experiences-through-the-css-scrolling-snap-points-specification.aspx> Aug. 22, 2014, Oct. 22, 2013, 4 Pages.
Roth, et al., "Bezel Swipe: Conflict-Free Scrolling and Multiple Selection on Mobile Touch Screen Devices", CHI 2009, Available at <http://www.volkerroth.com/download/Roth2009a.pdf>,Apr. 2009, 4 pages.
Sandoval, "A development platform and execution environment for mobile applications", Universidad Autónoma de Baja California, School of Chemical Sciences and Engineering, Available at <http://citeseerx.ist.psu.edu/viewdoc/download?doi=10.1.1.86.7989&rep=rep1&type=pdf>,2004, 18 pages.
Saugat, "Access Multiple Cloud Files from Single Application", Retrieved from: <http://freshtutorial.com/access-multiple-cloud-files-single-application/> on Feb. 15, 2012,Sep. 26, 2011, 7 pages.
Simeone, "A Cross-Device Drag-and-Drop Technique", In Proceedings of MUM 2013, Dec. 2013, 4 pages.
Singh, et al., "Cinema: Columbia InterNet Extensible Multimedia Architecture", Available at <http://www1.cs.columbia.edu/~library/TR-repository/reports/reports-2002/cucs-011-02.pdf>, Sep. 3, 2002, 83 Pages.
Smith, et al., "GroupBar: The TaskBar Evolved", Proceedings of OZCHI 2003—Available at <http://research.microsoft.com/pubs/64316/ozchi2003-groupbar.pdf>, Nov. 2003, pp. 1-10.
Spradlin, "Switcher Provides an Incredible Gesture-based App Switching Tool", Retrieved from <http://www.androidpolice.com/

(56) References Cited

OTHER PUBLICATIONS

2012/07/09/switcher-proof-of-concept-hits-the-play-store-providing-an-incredible-gesture-based-app-switching-tool/> on Feb. 18, 2013, Jul. 9, 2012, 7 pages.

Stark, "Review: Logitech Ultrathin Keyboard Cover for iPad", Retrieved From: <http://www.gadgetguy.com.au/product/logitech-ultrathin-keyboard-cover-for-ipad/> Feb. 26, 2014, Jun. 8, 2012, 4 Pages.

Stebih, "Windows 8 Mouse and Keyboard Commands", retrieved from <http://www.helpdesktv.ca/windows/windows-8-mouse-and-keyboard-commands.html> on Nov. 23, 2011, Sep. 21, 2011, 5 pages.

Steinicke, et al., "Multi-Touching 3D Data: Towards Direct Interaction in Stereoscopic Display Environments coupled with Mobile Devices", Advanced Visual Interfaces (AVI) Workshop on Designing Multi-Touch Interaction Techniques for Coupled Public, Available at <http://viscg.uni-muenster.de/publications/2008/SHSK08/ppd-workshop.-pdf.>,Jun. 15, 2008, 4 Pages.

Storey, "Setting Native-Like Scrolling Offsets in CSS with Scrolling Snap Points", Retrieved From: <http://generatedcontent.org/post/66817675443/setting-native-like-scrolling-offsets-in-css-with> Aug. 19, 2014, Nov. 18, 2013, 9 pages.

Sun, "Clamshell Keyboard Case transforms the iPad Mini into a Laptop and Gets Raving Review from RunAroundTech.com", Retrieved From: <http://www.prweb.com/releases/2014/01/prweb11456818.htm> Apr. 1, 2014, Jan. 6, 2014, 3 Pages.

Suror, "PocketShield—New Screenlock App for the HTC Diamond and Pro", Retrieved from: <http://wmpoweruser.com/?tag=htc-touch-diamond> on Jun. 28, 2011, Oct. 23, 2008, 2 pages.

Terpstra, "Beta Beat: Grape, a New Way to Manage Your Desktop Clutter", Retrieved from: http://www.tuaw.com/2009/04/14/beta-beat-grape-a-new-way-to-manage-your-desktop-clutter/, Apr. 14, 2009, 4 pages.

Ueland, "25 Apps for Dropbox", Retrieved from: <http://www.practicalecommerce.com/articles/3984-25-Apps-for-Dropbox> on Apr. 6, 2014, Apr. 15, 2013, 10 pages.

Vallerio, et al., "Energy-Efficient Graphical User Interface Design", Retrieved from: <http://www.cc.gatech.edu/classes/AY2007/cs7470_fall/zhong-energy-efficient-user-interface.pdf>, Jun. 10, 2004, pp. 1-13.

Vermeulen, "BlackBerry PlayBook Hands-on", retrieved from <http://mybroadband.co.za/news/gadgets/20104-BlackBerry-PlayBook-hands-.html> on May 11, 2011, May 8, 2011, 4 pages.

Vigil, "Methods for Controlling a Floating Cursor on a Multi-touch Mobile Phone or Tablet in Conjunction with Selection Gestures and Content Gestures", U.S. Appl. No. 61/304,972,Feb. 16, 2010, 54 pages.

Viticci, "Growl 1.3 to Be Released on Mac App Store, Introduce Lion Support and Drop GrowlMail Support", Retrieved from: <http://www.macstories.net/stories/growl-1-3-to-be-released-on-mac-app-store-introduce-lion-support-and-drop-growlmail-support/> on Jul. 22, 2011, Jul. 6, 2011, 6 pages.

Viticci, "Reeder Redefines Google Reader on the iPad. Reviewed", Retrieved From: <http://www.macstories.net/ipad/reeder-review/> Jul. 10, 2014, Jun. 4, 2010, 8 pages.

Vornberger, "Bluetile", Retrieved from: <http://www.bluetile.org> on Sep. 29, 2010, 5 pages.

Webmonkey "HTML Cheatsheet", Retrieved From: <http://www.webmonkey.com/2010/02/html_cheatsheet> on Nov. 7, 2014, Feb. 15, 2010, 5 pages.

Webster, "VsNotepad: An Improved Way to Jot Down on Windows Mobile", Retrieved from <http://pocketnow.com/index.php/index.php?a=portal_detail&t=news&id=7424>, May 19, 2009, 2 pages.

Wells, "Advanced Task Killer", Android Tapp: Android App Reviews—retrieved from <http://www.androidtapp.com/advanced-task-killer/> on Nov. 18, 2011, Aug. 28, 2009, 15 pages.

Wilson, "How the iPhone Works", Retrieved from: <http://electronics.howstuffworks.com/iphone2.htm> on Apr. 24, 2009, Jan. 2007, 9 pages.

Wilson, "Robust Computer Vision-Based Detection of Pinching for One and Two-Handed Gesture Input", In Proceedings of UIST 2006—Available at <http://research.microsoft.com/en-us/um/people/awilson/publications/wilsonuist2006/uist%202006%20taffi.pdf>, Oct. 2006, 4 pages.

Wobbrock, et al., "User-Defined Gestures for Surface Computing", CHI 2009, Apr. 4-9, 2009, Boston, MA—available at <http://faculty.washington.edu/wobbrock/pubs/chi-09.2.pdf>, Apr. 4, 2009, 10 pages.

Wollman, "Sony gives the slider another shot with the VAIO Duo 13", Retrieved From: <http://www.engadget.com/2013/06/04/sony-duo-13/> Mar. 31, 2014, Jun. 4, 2013, 7 Pages.

Wu, et al., "Achieving a Superior Ownership Experience in Manageability and Quality for Siebel CRM", available at <http://www.oracle.com/us/products/enterprise-manager/superior-exp-for-siebel-crm-068962.pdf>, Aug. 2008, 25 pages.

Wyatt, "/Flash/the art of parallax scrolling", .net Magazine, Aug. 1, 2007, pp. 74-76.

Yang, et al., "Dual-Surface Input: Augmenting One-Handed Interaction with Coordinated Front and Behind-the-Screen Input", Proceedings: MobileHCI '09, Sep. 15-18, 2009, Bonn, Germany—retrieved from <http://www.cs.ualberta.ca/~wfb/publications/C-2009-MobileHCI-Yang.pdf>, Sep. 18, 2009, 10 pages.

Yang, et al., "Semantic Photo Album Based on MPEG-4 Compatible Application Format", Retrieved from: <http://ieeexplore.ieee.org/stamp/stamp.jsp?arnumber=04146254.>, 2007, 2 Pages.

Yee, "Two-Handed Interaction on a Tablet Display", Retrieved from: <http://zesty.ca/tht/yee-tht-chi2004-short.pdf>, Conference on Human Factors in Computing Systems,Apr. 2004, 4 pages.

Corrected Notice of Allowance, U.S. Appl. No. 14/109,779, Jul. 21, 2015, 2 pages.

Final Office Action, U.S. Appl. No. 12/983,106, Jul. 16, 2015, 23 pages.

"Foreign Notice of Acceptance", NZ Application No. 618264, Jun. 27, 2015, 1 Page.

"Further Examination Report", NZ Application No. 618284, Jul. 13, 2015, 2 pages.

"Corrected Notice of Allowance", U.S. Appl. No. 13/118,333, Aug. 4, 2015, 4 pages.

"Corrected Notice of Allowance", U.S. Appl. No. 13/118,333, Sep. 14, 2015, 4 pages.

"Corrected Notice of Allowance", U.S. Appl. No. 14/109,779, Oct. 19, 2015, 2 pages.

"Extended European Search Report", EP Application No. 11872072.1, Jul. 28, 2015, 7 pages.

"Final Office Action", U.S. Appl. No. 13/073,300, Sep. 4, 2015, 17 pages.

"Final Office Action", U.S. Appl. No. 13/224,258, Aug. 13, 2015, 39 pages.

"Final Office Action", U.S. Appl. No. 13/550,432, Sep. 14, 2015, 18 pages.

"Final Office Action", U.S. Appl. No. 13/904,880, Oct. 23, 2015, 24 pages.

"Foreign Notice of Allowance", CN Application No. 201110437542.1, Aug. 3, 2015, 4 Pages.

"Foreign Notice of Allowance", CN Application No. 201210331158.8, Sep. 8, 2015, 3 Pages.

"Foreign Office Action", CN Application No. 201110454251.3, Sep. 30, 2015, 10 Pages.

"Foreign Office Action", CN Application No. 201210317470.1, Aug. 24, 2015, 9 pages.

"Foreign Office Action", CN Application No. 201210331564.4, Sep. 2, 2015, 14 pages.

"Foreign Office Action", CN Application No. 201210331584.1, Aug. 19, 2015, 7 pages.

"Foreign Office Action", CN Application No. 201210331686.3, Sep. 1, 2015, 11 pages.

"Foreign Office Action", EP Application No. 11866579.3, Sep. 3, 2015, 4 pages.

"Foreign Office Action", JP Application No. 2014-512819, Sep. 29, 2015, 4 pages.

"Foreign Office Action", JP Application No. 2014-529672, Oct. 6, 2015, 7 pages.

(56) References Cited

OTHER PUBLICATIONS

"Non-Final Office Action", U.S. Appl. No. 13/118,221, Oct. 7, 2015, 8 pages.
"Non-Final Office Action", U.S. Appl. No. 13/118,265, Aug. 20, 2015, 18 pages.
"Non-Final Office Action", U.S. Appl. No. 13/118,288, Aug. 24, 2015, 19 pages.
"Non-Final Office Action", U.S. Appl. No. 13/118,321, Sep. 8, 2015, 34 pages.
"Non-Final Office Action", U.S. Appl. No. 13/852,903, Oct. 1, 2015, 12 pages.
"Non-Final Office Action", U.S. Appl. No. 14/059,163, Aug. 10, 2015, 5 pages.
"Notice of Allowance", U.S. Appl. No. 13/229,693, Sep. 14, 2015, 13 pages.
"Notice of Allowance", U.S. Appl. No. 13/335,001, Aug. 26, 2015, 7 pages.
"Search Report", TW Application No. 100136568, Sep. 14, 2015, 2 pages.
Gladisch,"MultiStates: Monitoring Databases With Acoustic and Intuitive Perspective Wall Interaction", In Proceedings of 2nd International Workshop on Design & Evaluation of e-Government Applications and Services, Aug. 24, 2009, 7 pages.
Johnson,"Create an Awesome Zooming Web Page With jQuery", Retrieved from <http://designshack.net/articles/javascript/create-an-awesome-zooming-web-page-withjquery/> on Aug. 20, 2015, May 25, 2011, 11 pages.
"Extended European Search Report", Application No. 11871739.6, Oct. 5, 2015, 13 pages.
"Foreign Office Action", CL Application No. 3369-13, Oct. 29, 2015, 6 pages.
"Foreign Office Action", CO Application No. 13-298.756, Oct. 11, 2015, 11 pages.
"Foreign Office Action", JP Application No. 2014-512820, Sep. 29, 2015, 10 pages.
"Foreign Office Action", JP Application No. 2014-512821, Oct. 20, 2015, 5 pages.
"Foreign Office Action", JP Application No. 2014-528371, Sep. 29, 2015, 16 pages.
"Foreign Office Action", JP Application No. 2014-529671, Sep. 29, 2015, 16 pages.
"Foreign Office Action", RU Application No. 2014107906, Oct. 6, 2015, 6 pages.
"Foreign Office Action", RU Application No. 2014108874, Oct. 6, 2015, 6 pages.
"Introduction to Windows 7", https://www.google.com/url?q=http://www.wright.edu/sites/default/files/page/attachements/windows7.pdf, Jul. 1, 2010, 13 pages.
"Non-Final Office Action", U.S. Appl. No. 13/118,181, Oct. 23, 2015, 15 pages.
"Non-Final Office Action", U.S. Appl. No. 13/118,302, Nov. 6, 2015, 21 pages.
"Samsung Galaxy 2 TouchWiz 4.0 Tour (Homescreen, Settings, etc)", https://www.youtube.com/watch?v=oXBbiy0Adiw, May 9, 2011, 3 pages.
D,"Android Apps in Depth-02-Go Launcher EX", https://www.youtube.com/watch?v=u5LISE8BU_E, Mar. 6, 2011, 3 pages.
D,"Android HTC EVO 4G Tutorials 01—Getting Started, Home Screens", https://www.youtube.com/watch?v=fwvt-rsCMA8, Feb. 3, 2011, 3 pages.
Demers,"In Depth: GO Launcher EX—Droid Life", http://www.droid-life.com/2011/01/26/in-depth-go-launcher-ex/, Jan. 26, 2011, 8 pages.
Takahiro,"Let's Manage the Installed Applications", In Easy to Use Mini, Exhaustion Utilization of iPhone, vol. 1, p. 25 Memo, Mar. 10, 2011, 6 pages.

\* cited by examiner

PRESENTING AN APPLICATION CHANGE THROUGH A TILE

PRIORITY APPLICATION

This application is a continuation of and claims priority to U.S. patent application Ser. No. 14/089,149 filed Nov. 25, 2013, entitled "Presenting an Application Change through a Tile", which is a continuation of U.S. patent application Ser. No. 12/977,584 filed Dec. 23, 2010, entitled "Presenting an Application Change through a Tile", the disclosures of each are incorporated by reference herein in their entirety.

BACKGROUND

Conventional operating systems permit users to launch applications, often through a user interface having selectable icons for the applications. In some cases a user selects to launch an application from this user interface and does not care whether there is anything new for that application.

In many cases, however, users launch applications to find out what is new in those applications. A user wishing to find out what is new in her applications, for example, typically selects an icon for a desired application, in response to which the conventional operating system launches the application. This application then opens and, assuming it is one that presents content, presents that content. For some applications, such as news or social-networking websites, the application retrieves content from a remote source and then presents that content. It is at this point that the user sees the content, which may or may not be new since the last time the user viewed content for that application.

The user may continue this process of selecting applications, in response to which they are launched and present content, and then viewing the presented content to find out what, if anything, is new. Following this process will permit a user to see what is new in her applications, but doing so takes significant amounts of time and effort. This process also expends computing and bandwidth resources. Worse still, in some cases her applications may not have any new content, in which case all of this time, effort, and resources are wasted.

SUMMARY

This document describes techniques for presenting an application change through a tile. These techniques permit a user to view changes to an application through a tile of a user interface, including content associated with those changes. By so doing, the techniques enable a user to forgo visiting the application or quickly and easily determine if the change is of sufficient interest to visit the application.

This summary is provided to introduce simplified concepts for presenting an application change through a tile that is further described below in the Detailed Description. This summary is not intended to identify essential features of the claimed subject matter, nor is it intended for use in determining the scope of the claimed subject matter. Techniques and/or apparatuses for presenting an application change through a tile are also referred to herein separately or in conjunction as the "techniques" as permitted by the context.

BRIEF DESCRIPTION OF THE DRAWINGS

Embodiments for presenting an application change through a tile are described with reference to the following drawings. The same numbers are used throughout the drawings to reference like features and components.

DETAILED DESCRIPTION

Overview

This document describes techniques and apparatuses for presenting an application change through a tile. These techniques enable a user to see content associated with content changes to an application or other information about the application, such as a new article, new email, or a software update having become available since a user last visited the application. By so doing, the techniques enable a user to forgo visiting the application or permit the user to quickly and easily decide whether or not to visit the application.

Assume, for example, that a user wishes to see whether or not there is anything new for an application, such as a social networking application. The techniques enable the user to view changes associated with the social networking application without visiting the application. The techniques may do so through a tile that presents changes since the user last viewed the application, such as content associated with a friend tagging the user in a photo. This presented content can include an image of the user's friend, the photo in which the user is tagged, or a portion of the friend's message. On viewing this content, the user sees some or all of the content associated with the change, thereby permitting the user to avoid visiting the application or prompting the user to visit the application for additional content. Thus, in many cases the user decides to visit the application based on the content presented in the tile.

This is but one example of the many ways in which the techniques enable users to view changes to an application through a tile. Numerous other examples, as well as ways in which the techniques operate, are described below.

This discussion proceeds to describe an example environment in which the techniques may operate, methods performable by the techniques, and an example apparatus below.

Example Environment

Figure 1:
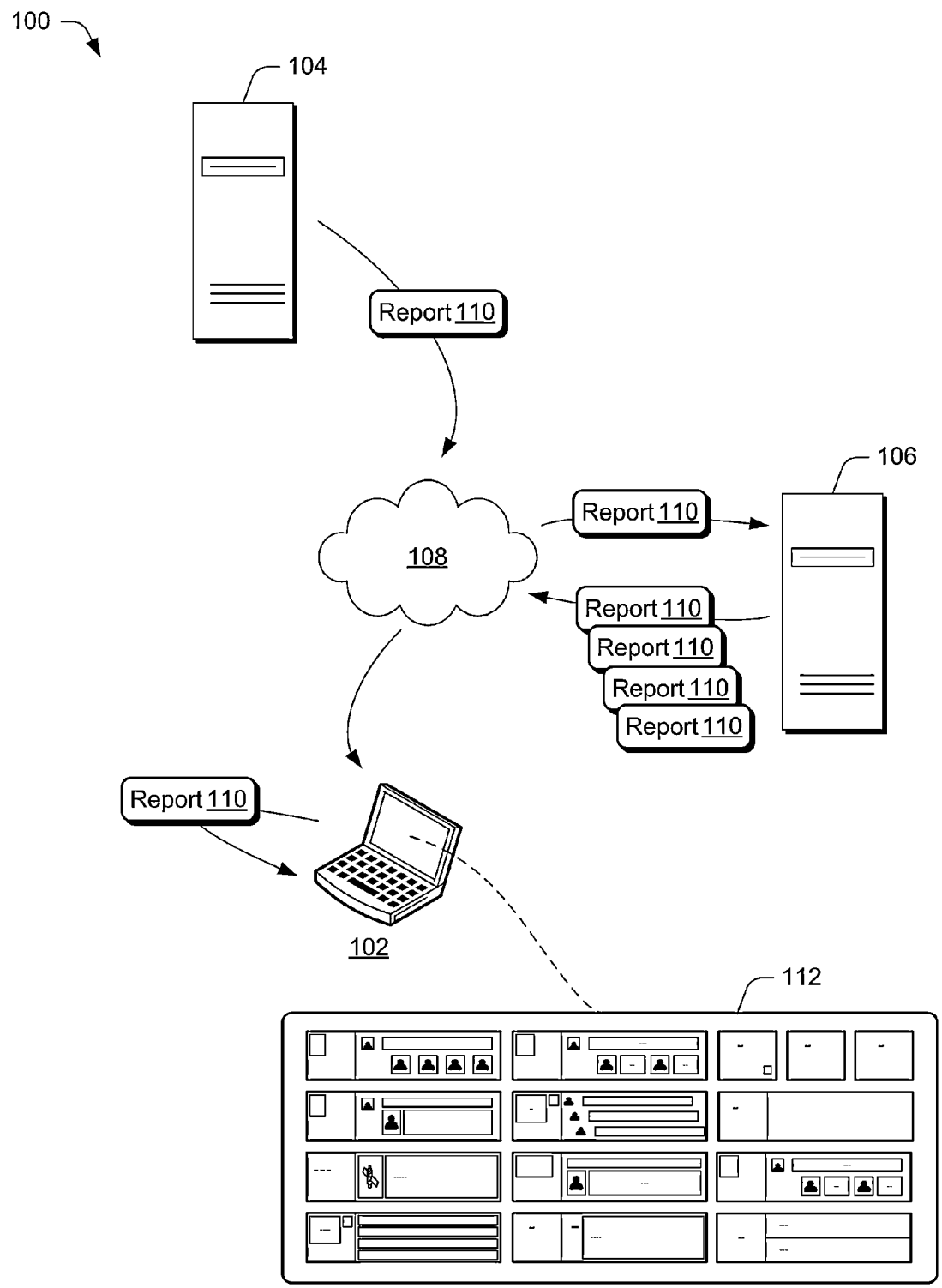
FIG. 1 illustrates an example system in which techniques for presenting an application change through a tile can be implemented.

FIG. 1 illustrates an example environment 100 in which techniques for presenting an application change through a tile can be embodied. Environment 100 includes a computing device 102, remote provider 104, optional report compiler 106, and communication network 108, which enables communication between these entities. In this illustration, computing device 102 receives reports 110 from three sources, remote provider 104, report compiler 106, and an application executing on computing device 102 (this application is shown in FIG. 2).

Each report 110 indicates a change to its associated application. This change to an application can be to the application's content or status, such as a new email, entry, or article, or that a software update or expiration is approaching, to name just a few. Computing device 102 presents user interface 112, which includes tiles for applications, many of which present these changes.

Figure 2:
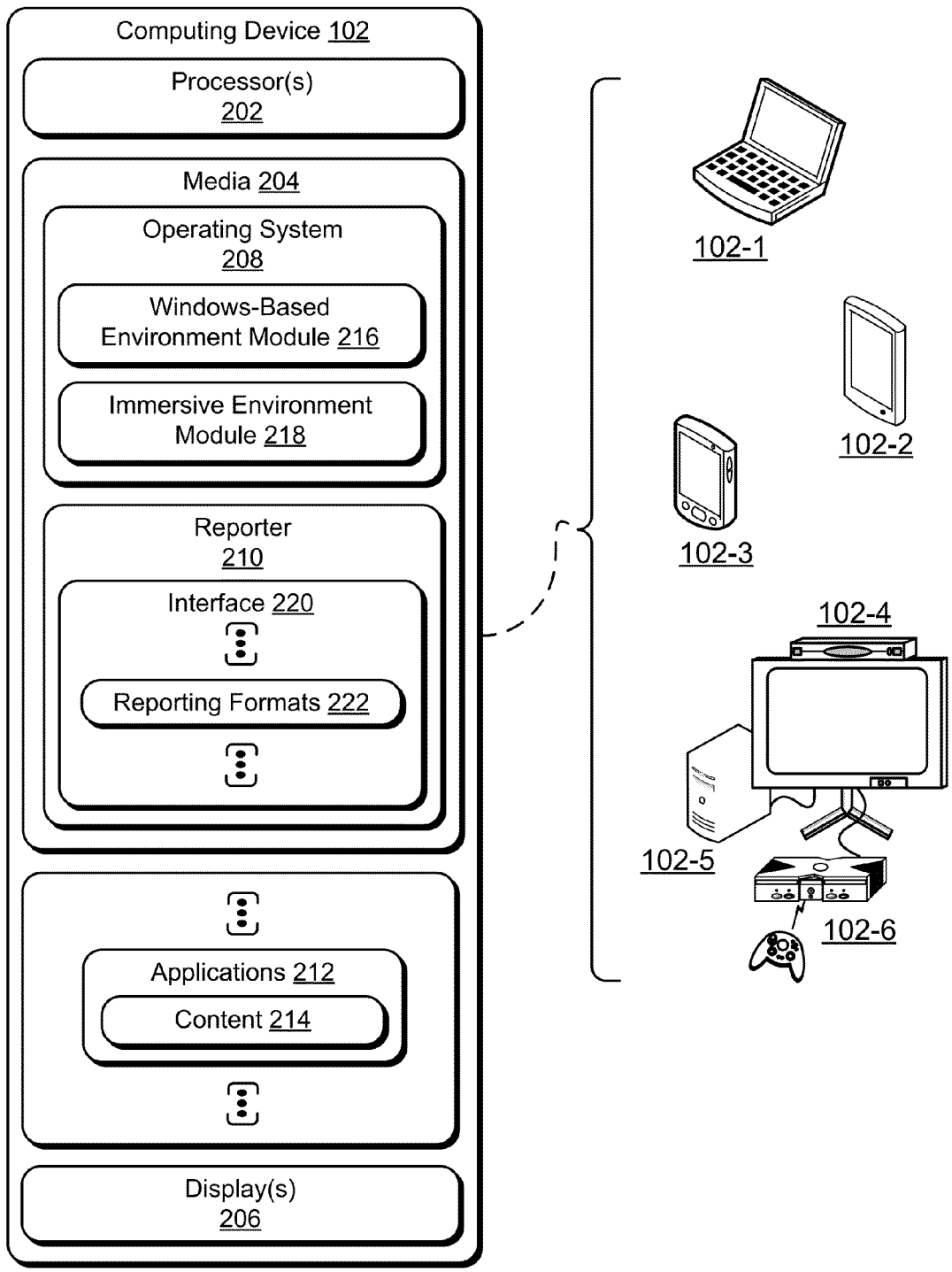
FIG. 2 illustrates an example embodiment of the computing device of FIG. 1.

FIG. 2 illustrates an example embodiment of computing device 102 of FIG. 1, which is illustrated with six examples devices: a laptop computer 102-1, a tablet computer 102-2, a smart phone 102-3, a set-top box 102-4, a desktop computer 102-5, and a gaming device 102-6, though other computing devices and systems, such as servers and netbooks, may also be used.

Computing device 102 includes or has access to computer processor(s) 202, computer-readable storage media 204 (media 204), and one or more displays 206, four examples of which are illustrated in FIG. 2. Media 204 includes an operating system 208, reporter 210, and applications 212, each of which may provide content 214.

Operating system 208 includes or has access to window-based environment module 216 and/or immersive environment module 218. Applications selected through the techniques can be presented through a windows-based or immersive environment, as well as others.

Windows-based environment module 216 presents applications and accompanying content through windows having frames. These frames provide controls through which to interact with an application as well as controls enabling a user to move and size the window.

Immersive environment module 218 provides an environment by which a user may view and interact with one or more of applications 212 and corresponding content 214. In some embodiments, this environment presents content of, and enables interaction with, applications with little or no window frame and/or without a need for a user to manually size or position content. This environment can be, but is not required to be, hosted and/or surfaced without use of a typical desktop environment. Thus, in some cases immersive environment module 218 presents an immersive environment that is not a window (even one without a substantial frame) and precludes usage of desktop-like displays (e.g., a taskbar). Further still, in some embodiments this immersive environment is similar to an operating system in that it is not closeable or capable of being un-installed. Examples of immersive environments are provided below as part of describing the techniques, though they are not exhaustive or intended to limit the techniques.

Reporter 210 includes, has access to, or generates an application-selectable user interface 220, an example of which is shown at 112 in FIG. 1. Interface 220 includes or has access to presentation formats 222. Reporter 210 reports changes associated with one or more of applications 212 through interface 220. As noted above, reports 110 may be received directly from one or more of applications 212, or another entity associated with one or more of applications 212, such as remote provider 104 or report compiler 106.

In some cases a report indicates which presentation format 222 is intended, in which case reporter 210 reports changes in the appropriate format through interface 220. Presentation formats 222 can be eXtensible Stylesheet Language Transformations (XSLT) in cases where reports 110 are received in eXtensible Markup Language (XML). In such a case, reporting in interface 220 is presenting using Hyper-Text Markup Language (HTML), though use of XSLT, XML, and HTML are optional, as are presentation formats 222 in general.

Figure 3:
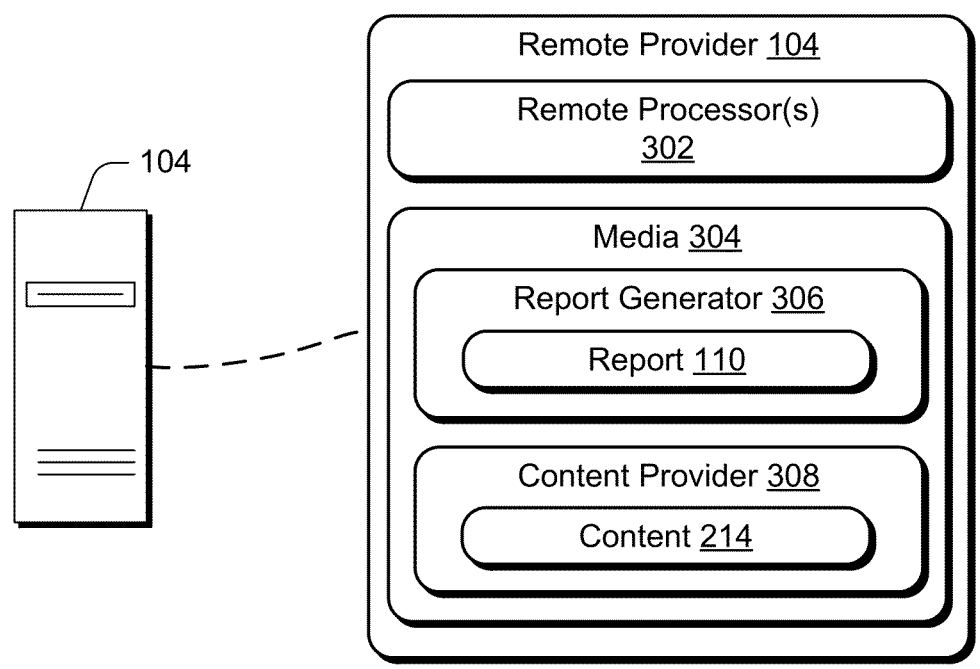
FIG. 3 illustrates an example embodiment of the remote provider of FIG. 1.

FIG. 3 illustrates example embodiments of remote provider 104. Remote provider 104 is shown as a singular entity for visual brevity, though multiple remote providers are also contemplated herein. Remote provider 104 includes or has to access to provider processor(s) 302 and provider computer-readable storage media 304 (media 304). Media 304 includes report generator 306 and content provider 308.

Report generator 306 is capable of providing one or more reports 110 to computing device 102, either directly or indirectly through report compiler 106. In some embodiments, reports 110 include information useful for indicating a change, presenting content associated with the change, or visiting the application (e.g., with a universal resource locators (URLs)).

Report generator 306 may act responsive to reporter 210, such as a request from reporter 210 for reports 110, though report generator 306 may also act to periodically send, or consistently make available, new and/or interesting content or data as it become available. Report generator 306 may indicate what is new since a user last selected a particular application, though it may also simply provide reports 110, with which reporter 210 may instead determine what is or is not new.

Content provider 308 provides content, such as content 214 associated with application 212. Content provider 308 may act in conjunction with report generator 306, such as to provide content 214 to report generator 306, which report generator 306 then provides a portion of (or sometimes all of) in report 110.

Figure 4:
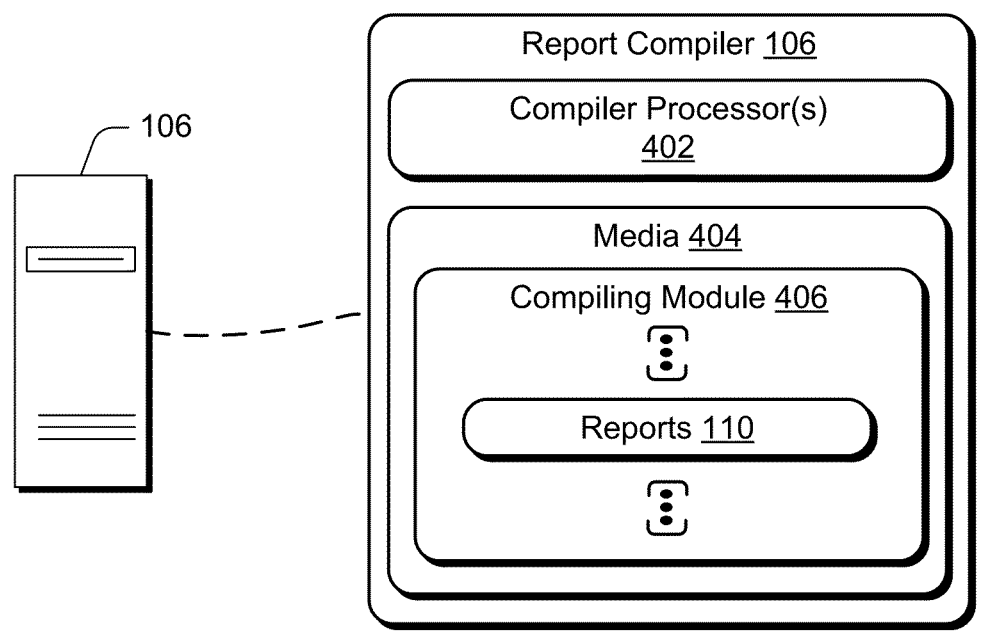
FIG. 4 illustrates an example embodiment of the report compiler of FIG. 1.

FIG. 4 illustrates an example embodiment of report compiler 106. Report compiler 106 is shown as a singular entity for visual brevity, though multiple compilers may also be used. Report compiler 106 includes or has to access to compiler processor(s) 402 and compiler computer-readable storage media 404 (media 404). Media 404 includes compiling module 406, which is capable of receiving and compiling reports 110 from one or more sources, such as report provider 104. Compiling module 406 may receive reports for later provision to computing device 102, such as periodically or when computing device 102 indicates that it is on. Compiling module 406 may determine which changes are new since a particular user last viewed content from an application and provide those of the reports 110 indicating these changes.

Ways in which entities of FIGS. 1-4 act and interact are set forth in greater detail below. The entities illustrated for computing device 102, remote provider 104, or report compiler 106, respectively, can be separate or integrated.

Example Methods

Figure 5:
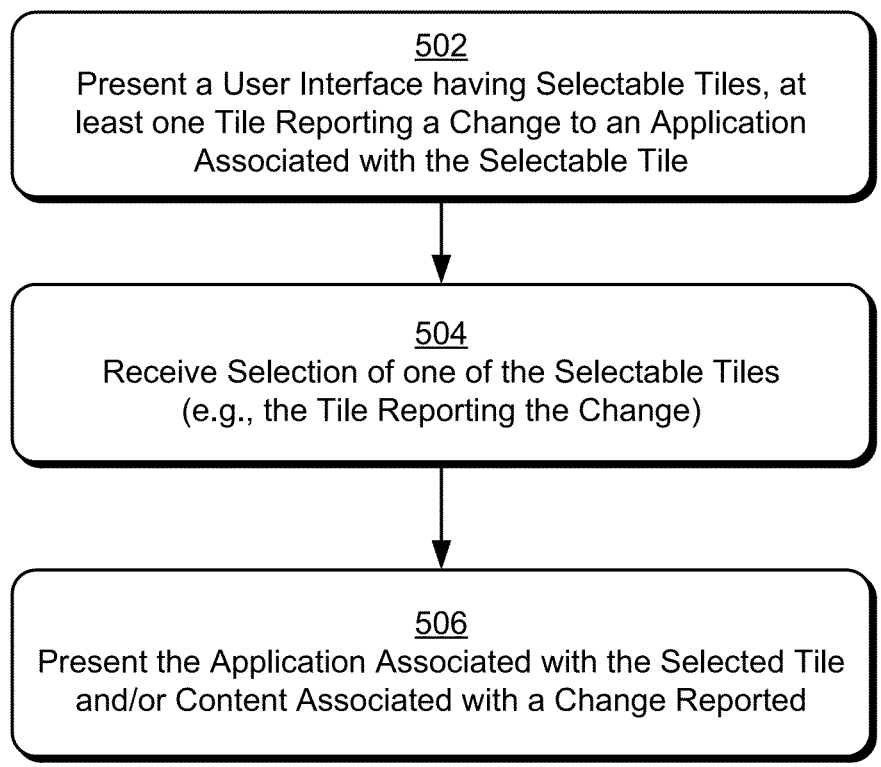
FIG. 5 illustrates an example method for presenting a user interface having selectable tiles at least one of which presents a change to an application.

FIG. 5 depicts a method 500 for presenting a user interface having selectable tiles at least one of which presents a change to an application. In portions of the following discussion reference may be made to environment 100 of FIG. 1 and as detailed in FIGS. 2-4, reference to which is made for example only.

Block 502 presents a user interface having multiple, selectable tiles associated with multiple applications, respectively. At least one of the multiple selectable tiles reports a change associated with the application to which the selectable tile is associated, though multiple changes for multiple applications or the same application may also be reported.

Figure 6:
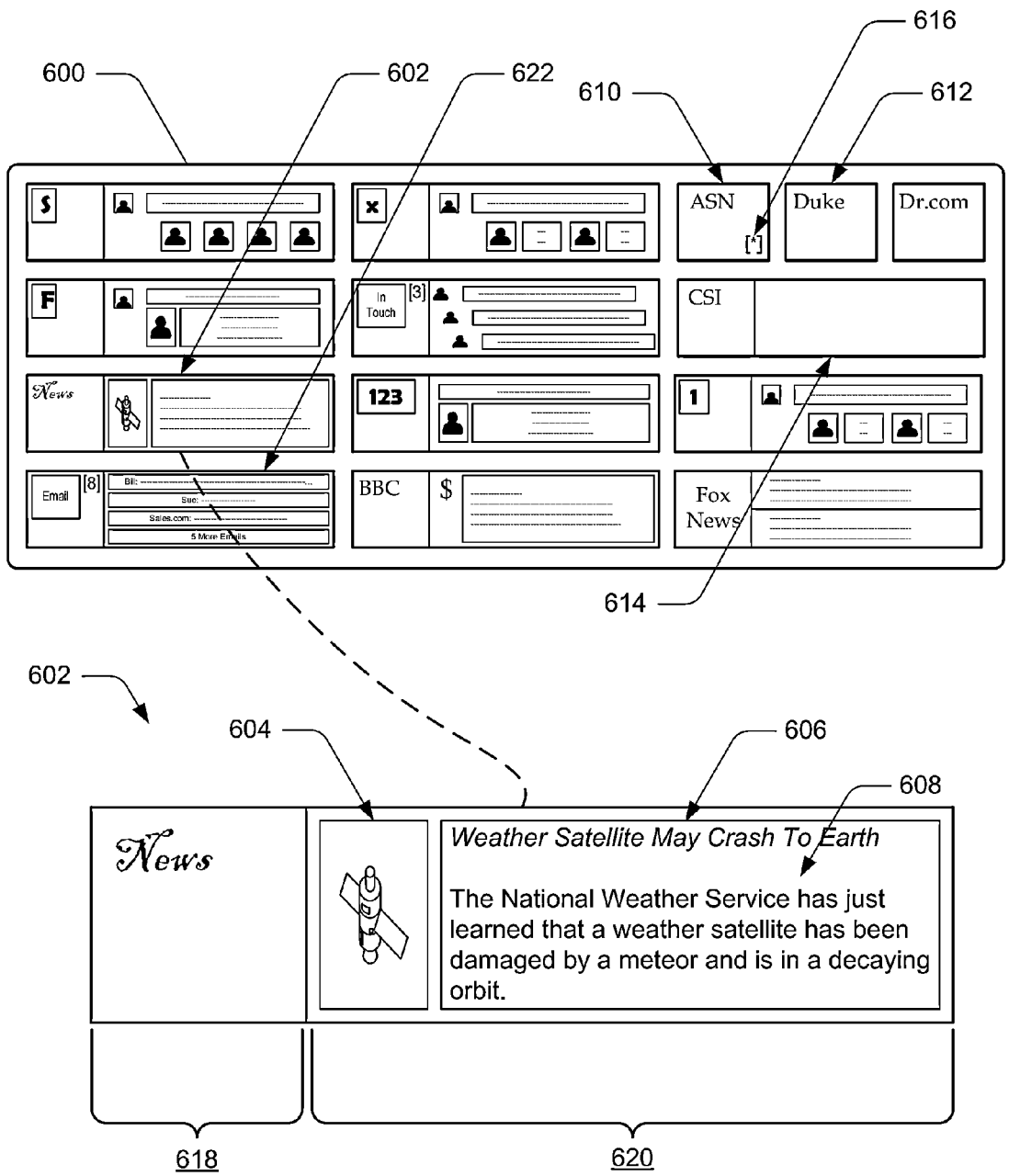
FIG. 6 illustrates an example user interface having fifteen selectable tiles.

By way of example, consider a case where reporter 210 of FIG. 2 presents a user interface 600 shown in FIG. 6. This user interface 600 is but one of many types of user interfaces contemplated by user interface 220 of FIG. 2, including a user interface having a single tile. User interface 600 includes fifteen selectable tiles, twelve of them relatively large and three relatively small.

This example user interface 600 reports changes to eleven of the twelve larger tiles and one of the three small tiles, though any variation of such a presentation is contemplated, such as changes to all or none of the selectable tiles. Note that these changes, even if all of these changes were already received at the time a user selects to view user interface 600, may be presented to each of the various tiles and portions of the tiles progressively. This progressive alteration of the tiles can make user interface 600 look animated. Thus, the changes to the tiles are not necessarily made all at once.

Further, in cases where multiple changes for an application are known, reporter 210 may present the newest of the changes or rotate through these changes. Reporter 210 may rotate through changes to maintain a "live" feel to user interface 600 or responsive to activity or inactivity with a tile. Inactively with a tile may indicate that the currently-indicated change is not of interest to a user. As another of the changes may be of more interest, the most-recent change may be rotated off of a tile and an older (but still new) change rotated on to the tile.

Consider first selectable tile 602, which is shown expanded in FIG. 6. This selectable tile 602 is associated with one of applications 212 of FIG. 2, namely a "News" application. As shown, selectable tile 602 reports a change associated with this application 212 within selectable tile 602, the change relative to a prior viewing, selection, or launching of this application 212 by a user associated with computing device 102.

Assume that a user viewed the News application at 9 am and, on viewing user interface 600, is presented with selectable tile 602 reporting a change to the News application since 9 am (at 3 pm the same day, for example). Here the change is a new article concerning a weather satellite that has been damaged by a meteor and may crash to earth. Portions of content associated with the change (the change being the new article) are shown in selectable tile 602. These portions each report the change by indicating that a new article is now available, here with an image 604 of a satellite, a title of the article at 606, and a first sentence of the article at 608.

Consider also three other example selectable tiles, small selectable tiles 610 and 612, and another of the large selectable tiles 614. Small selectable tile 610 reports a change to an application associated with this tile, namely the "ASN" application. Tile 610 reports a change with a change indicator 616 marked as "*", though this indicator 616 does not indicate how many changes or any content associated with that change. This abbreviated report on a change may be desirable when the application associated with the tile is not generally important to the user, or changes are often of a similar type and thus presenting content of the change is not meaningful, or simply because the user desires it.

Small selectable tile 612, on the other hand, does not report any changes. This non-reporting provides the user with valuable information, namely that the user need not select tile 612 to see something new for the "Duke" application, as no changes exist since the user last visited the application.

Large selectable tile 614 also does not report any changes, thus also providing the user with valuable information concerning changes (or lack thereof) for the "CSI" application.

As described, reporter 210 enables selection of applications and reports changes to those applications. Reporter 210 may also enable different selections through different areas of a tile. Consider again tile 602. Here reporter 210 enables selection through application-identifying area 618 and content presentation area 620. This application-identifying area 618 shows an application-selected identifier for the "News" application, namely "News" in a particular font and color (color not shown). Reporter 210 enables a selection made to this application-identifying area 618 to present the "News" application at a default or prior-viewed setting, such as a home page or a last-viewed page of content. Thus, on selection of application-identifying area 618, reporter 210 may refrain from presenting content associated with the reported change.

Reporter 210 enables a selection made to content presentation area 620 to present the "News" application with the change, such as presenting content associated with the change, here opening a webpage at a universal resource locator (URL) associated with the content change. In such a case, reporter 210 presents the News application having the article that was shown in part in content presentation area 620.

Some tiles may indicate multiple changes, such as reporting (with some associated content) the two newest entries to a social-networking website or emails received since the user last viewed an email application. In such a case, reporter 210 enables selection to each section reporting the change to present the associated application with content associated with that change, such as to open one of multiple emails reported.

By way of review, reporter 210 can report changes to various applications responsive to received reports, such as reports 110 of FIG. 1, which can be received one-at-a-time, after compiling into batches, and/or from various sources. These reports 110 can be received or retrieved periodically, on selecting to display user interface 220, and/or in real time. User interface 600, for example, may alter selectable tiles as a user views it due to reports coming in and being reported. Thus, reporter 210 may act to actively update reporting for applications in a user interface through which a user can select applications.

Reporter 210 may determine which reports 110 indicate changes to an application since the user last viewed or interacted with the application, though in some other cases an entity providing the report instead determines this (e.g., remote provider 104, report compiler 106, or application 212).

Further, in some embodiments reporter 210 receives reports along with an indication of a presentation format in which the reports are preferred to be presented. This presentation format preference may be selected by an entity associated with the respective application, such as a social-networking server associated with a social-networking application, or based on user preference. Various examples of presentation formats 222 are illustrated in FIG. 6. Large selectable tile 602, for example, presents only a most-recent change along with three portions of content for that change. Small selectable tile 610, conversely, presents only a change indicator 616 with no content.

Returning to method 500, block 504 receives selection of one of the multiple, selectable tiles, such as a tile reporting a change. The selection received can be to various areas (or sections of areas) of a selectable tile, responsive to which reporter 210 presents the application associated with the selectable tile, though how presented may vary based on which area is selected. As noted, the application associated with a selectable tile may or may not be executing. Consider, for example, large selectable tile 602 and another large selectable tile 622. Tile 602 is associated with a "News" application of applications 212 of FIG. 2. Tile 622 is associated with an email application of applications 212. For this example, assume that the News application is not executing and that reports are received from a remote entity associated with the News application, such as remote provider 104. Assume also that the email application is local to computing device 102 and is executing. Reports 110 for the email application are received by reporter 210 direct from the email application.

Continuing the ongoing embodiment, assume that reporter 210 receives a selection to application-identifying area 618, such as through a mouse selector or a gesture via a touchscreen displaying user interface 600, such as one of displays 206 shown in FIG. 2.

Block 506 presents the application associated with the selected tile and/or content associated with a change reported in the selected tile. When block 506 presents the application, it does so in a manner in which the application may be interacted with, e.g., in an immersive or windows-based environment. This presentation may also or instead present content associated with a reported change but not necessarily the application itself as described in further detail below.

This presentation may include launching the application and then presenting it, such as in a window via windows-based environment module 216 or in an immersive environment via immersive environment module 218, both of FIG. 2. If the application is already executing, a launch is not needed. Responsive to receiving a selection of a selected tile, the techniques may provide a visual indication of the selection, such as to animate the selected portion of the tile. By so doing, the techniques reinforce the type of selection. Furthermore, the techniques may present, in response to the selection, an interface or menu or selectable control associated with the application and through which a user may interact, such as to select to launch the application in a particular manner or environment, at a particular content, and the like.

Concluding the ongoing embodiment, reporter 210 presents the News application in response to selection of selectable tile 602, here to application-identifying area 618. This presentation includes launching the News application, as it was not executing at selection. As noted, reporter 210 may present and/or launch an application through an instruction to another entity, such as the above-mentioned modules 216 or 218.

Figure 7:
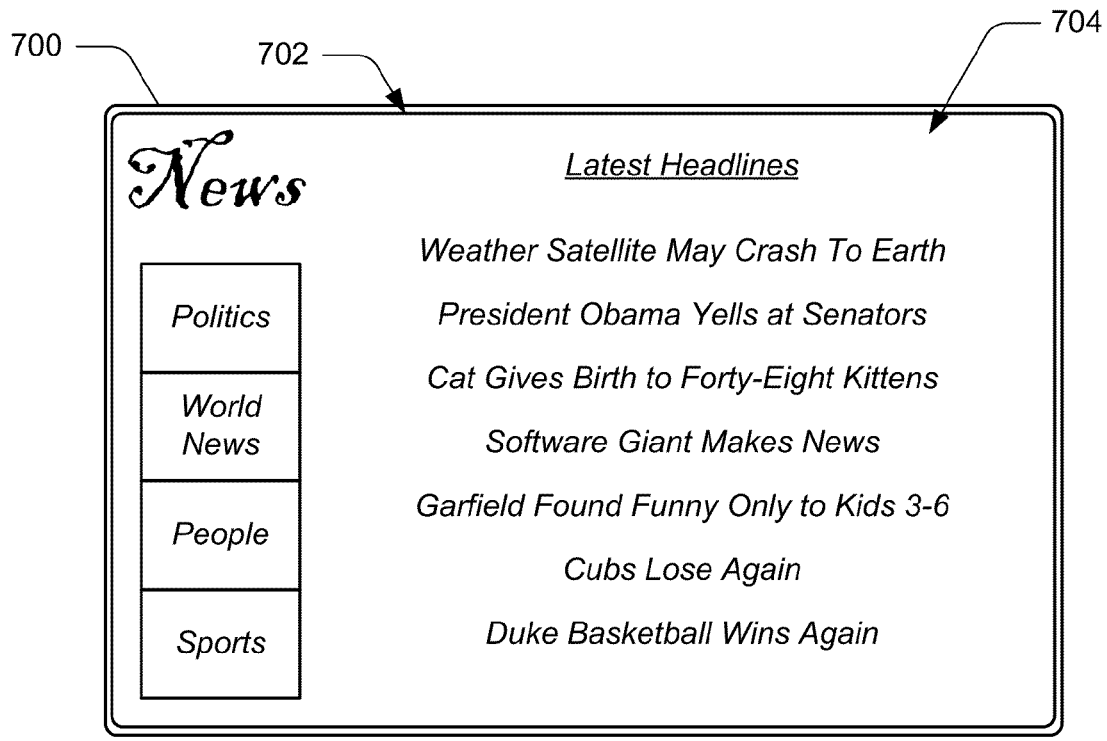
FIG. 7 illustrates an example presentation of a selected application in an immersive environment.

FIG. 7 illustrates an example presentation of the News application in an immersive environment 700. Because application-identifying area 618 was selected, a default presentation (here a home page) for the News application is shown. This home page is shown at 702 and includes various headlines 704 for selection, one of which is the most-recent article also shown at 606 in FIG. 6. While this title is shown, the home page is presented rather than a webpage having a full representation of the content or otherwise devoted to the article, which would otherwise be presented had the selection been made to content presentation area 620.

Figure 8:
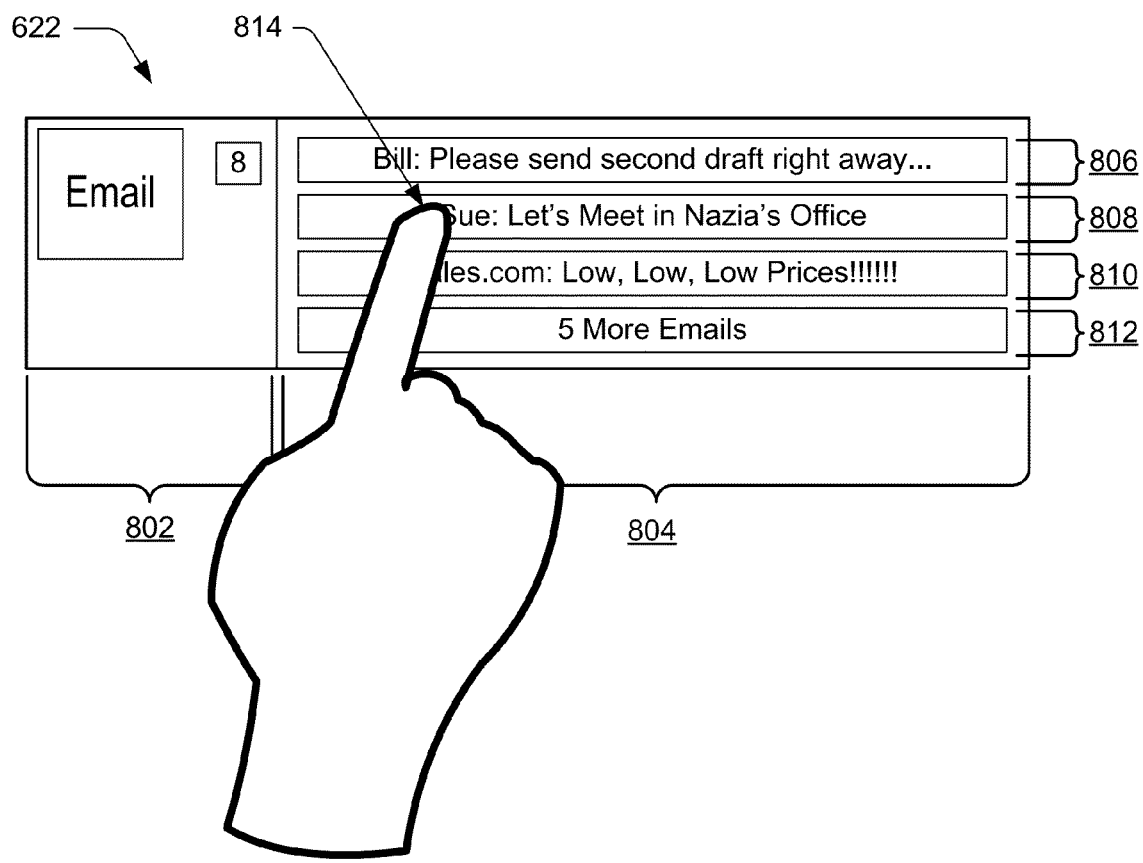
FIG. 8 illustrates a selectable tile of FIG. 6 along with selectable sections reporting changes.

By way of another example, consider a case where selection is received at block 504 through large selectable tile 622 of FIG. 6, which is expanded for clarity in FIG. 8. Tile 622 is shown having an application-identifying area 802 and a content presentation area 804. Content presentation area 804 includes four selectable sections reporting changes, sections 806, 808, 810, and 812. Each of selectable sections 806, 808, and 810 reports content associated with a change, here each a sender and a subject line of an email. Section 812 reports five changes, here that five other emails have also been received since the email application was last viewed by the user. In this example, selection is received to section 808 through a gesture 814 made to a touch screen.

Figure 9:
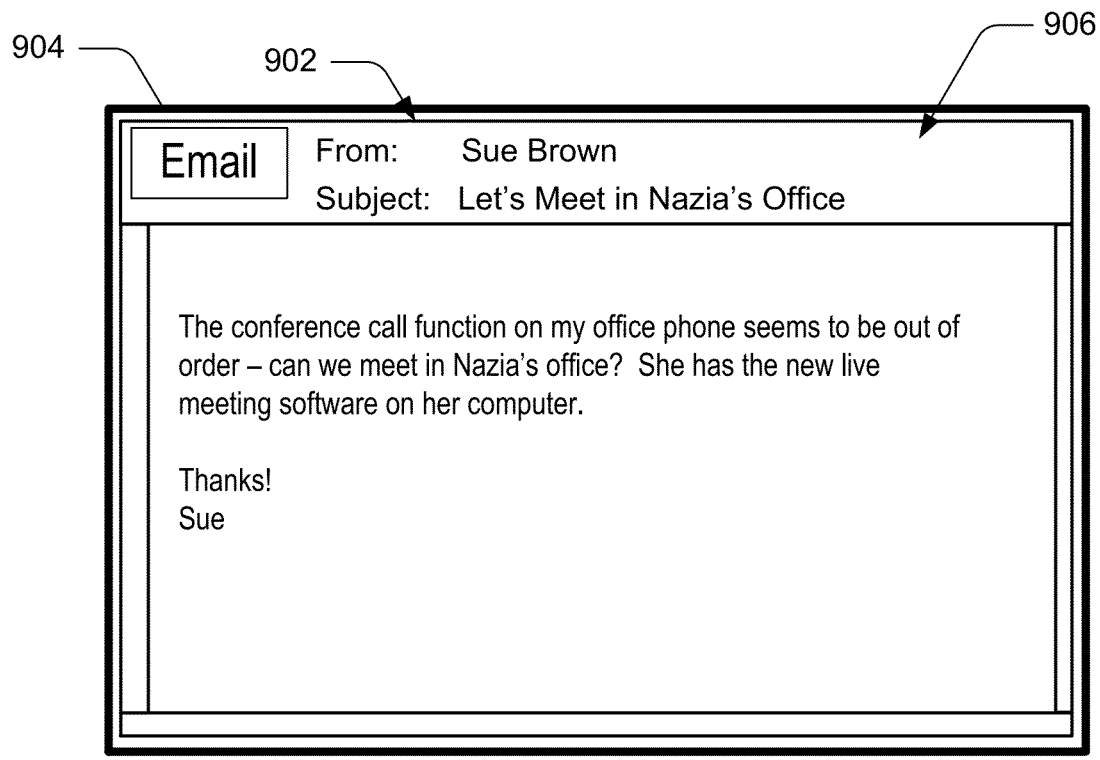
FIG. 9 illustrates an example presentation of a selected application in a windows-based environment.

Reporter 210, at block 506, presents the selected email application and content of the email associated with the selection. Here the application is currently executing, therefore reporter 210 does not launch the email application. Presentation of the email application and the change reported, rather than a home or default presentation, is shown in FIG. 9 at 902 in a window 904. Note that reporter 210 may cause this presentation in a window superimposed over the application-selectable user interface or hide the user interface and present the window in a different environment. Here reporter 210 hides the user interface and presents the email application at 902 showing content associated with the selection received at 906.

In still another example, consider again FIG. 8. In some cases selection made to a selectable tile indicating a change may present content associated with that change. This presentation may be commensurate with presentation of the application as described above. In some other cases, the content is shown without hiding the user interface and/or without presenting the application in a conventional manner. Assume, for the selection 814 of FIG. 8, that reporter 210, rather than presenting the email application and the content, instead presents content associated with the change on its own. In this case, more or all of the content associated with that change is shown. Assume, for example, that most or all of the content associated with a new email from Sue was received in one of the reports 110. Reporter 210 may present the rest of this content, such as within or superimposed over user interface 600.

Figure 10:
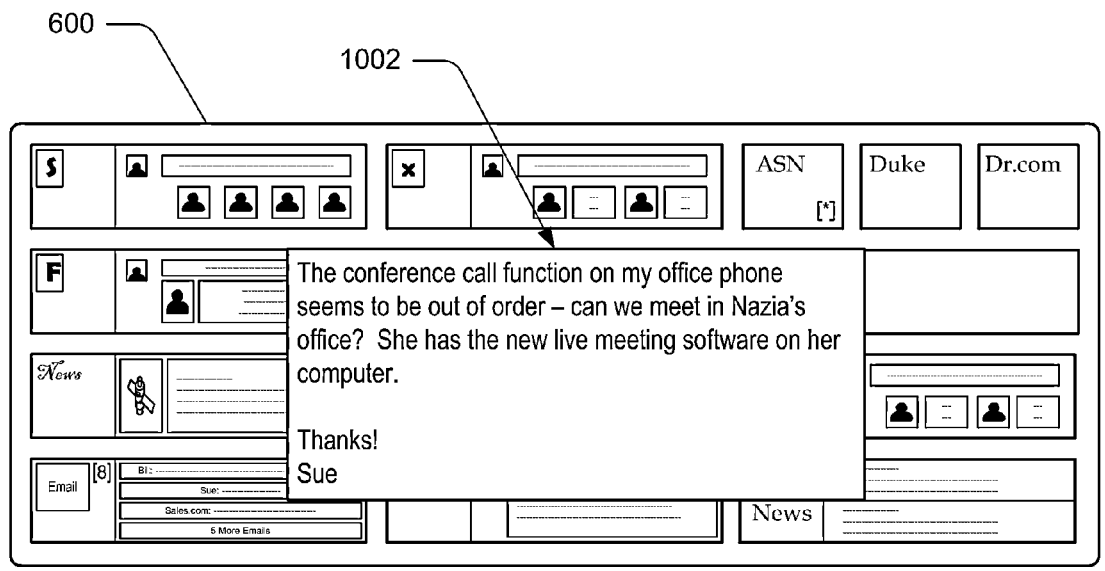
FIG. 10 illustrates a pop-up window having content associated with a change to an application.

An example of this is shown in FIG. 10, which shows a pop-up window 1002 having more content associated with a reported change. This may also be used to expand the "5 More Emails" shown at section 812 in FIG. 8 to show, for example, the sender and subject lines for those emails. This may be used to show some content associated with a change for which no content is currently shown, such as change indicator 616 of FIG. 6. This alternative operation of block 506 permits a user to select to see more content associated with a change, which in some cases is enough for the user to forgo selecting the application generally.

Figure 11:
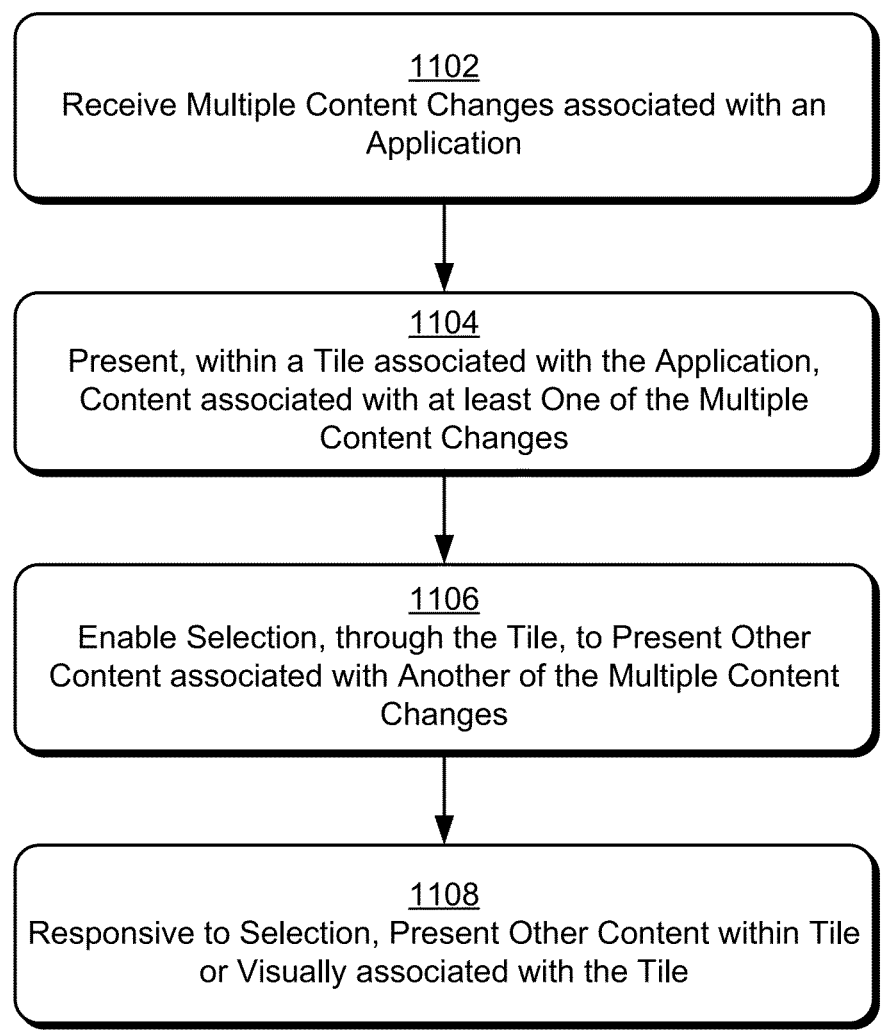
FIG. 11 illustrates an example method enabling presentation of, and browsing through, content changes of an application through a tile of a user interface.

FIG. 11 depicts a method 1100 enabling presentation of, and browsing through, content changes of an application through a tile of a user interface. In portions of the following discussion reference may be made to environment 100 of FIG. 1 and as detailed in FIGS. 2-4, reference to which is made for example only.

Block 1102 receives multiple content changes associated with an application. These content changes can be new content for the application since a most-recent visit to the application, such as by a user of computing device 102, for example. This most-recent visit may be tracked and content determined to be new in manners set forth elsewhere herein, such as based on a prior launch or tracking by a remote entity providing content during active use of the application by a user. Content changes can be received in various manners set forth elsewhere herein, such as through one or more reports 110 of FIG. 1 received by reporter 210 of FIG. 2.

Block 1104 presents, within a tile associated with but not generated by an application, content associated with at least one of the multiple content changes received for the application. By way of example, consider again tile 602 of FIG. 6. Note that tile 602 in the context of method 1100 is part of a user interface but not necessarily a user interface having limitations and functions of user interface 600 of FIG. 6. For example, while user interface 600 includes multiple tiles, the tile of method 1100 may be part of, or substantially all of the visual presentation of, a user interface not having other tiles. Further, while tiles of user interface 600 described above are selectable to present an application associated with each tile, the tile of method 1100 may be selectable for other uses that may or may not include presenting the application.

Tile 602 illustrates presentation of three portions of content at 604, 606, and 608 in content presentation area 620 for one of multiple content changes, here an article about a weather satellite. The content presented in this case includes three portions of the content change for the application, though more or less of the content change may instead be presented. Assume that another content change has also been reported, such as another article that the user of computing device 102 has not yet viewed. In this example, content for this other content change has not yet been presented.

Block 1106 enables selection, through the tile, to present other content associated with another of the multiple content changes. The content in this example concerns articles for a news application, though any other types of content described herein may also or instead be presented, such as entries to a user's social networking application, emails for an email application, notifications for various types of applications, and others.

Figure 12:
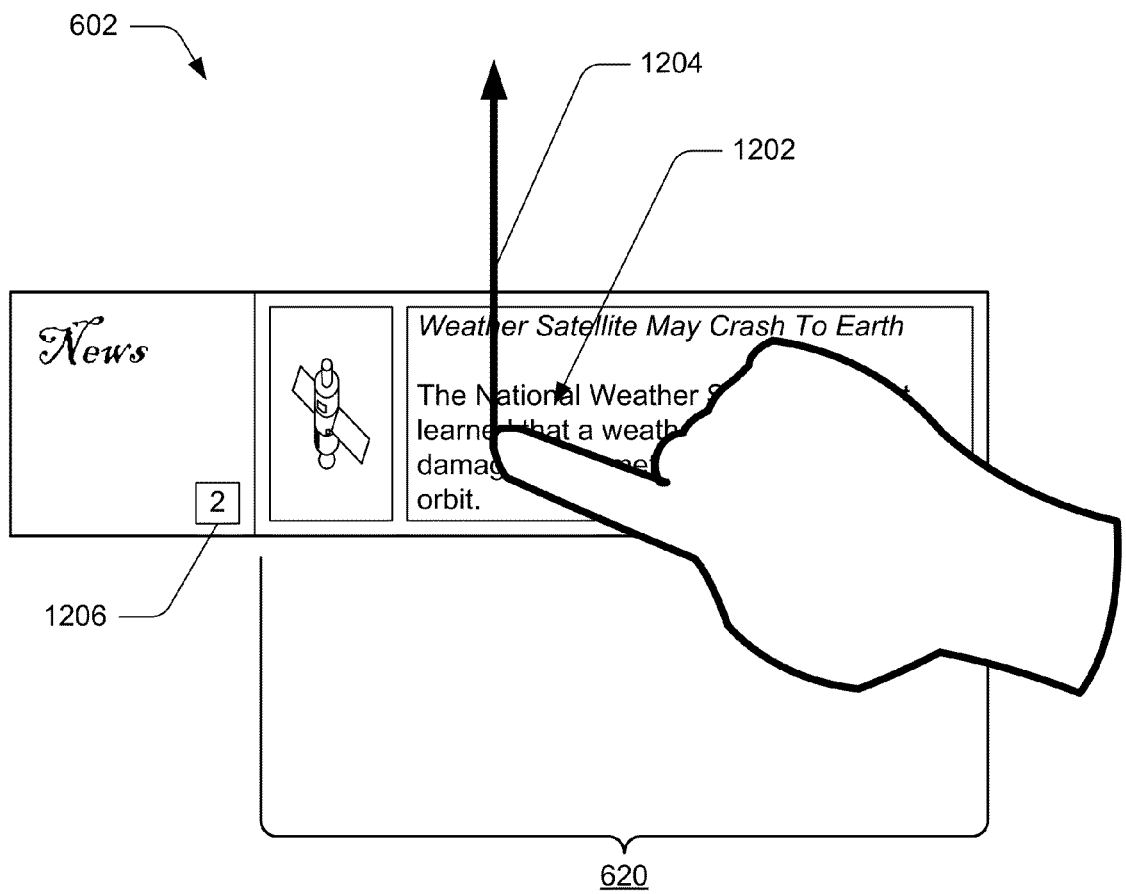
FIG. 12 illustrates an example selection to browse content through a tile.

Continuing the ongoing example, consider FIG. 12, which illustrates tile 602. Here we assume that reporter 210 of FIG. 2 enables selection through the tile to present other content. This can be described as a "browsing" function. This selection can be enabled through various selection manners described in other examples herein, such as a gesture to a touch screen or movement or clicking of a mouse selector on content presentation area 620, to name a few.

For this example, selection to present content for another content change is received through a gesture 1202 starting within content presentation area 620 and moving upward, shown with arrow 1204. While not required, tile 602 also includes additional content change indicator 1206, which indicates that other content changes are also available for presentation, here two other articles. By way of further example, selection can be enabled also or instead through selection of indicator 1206, such as with a press gesture or a mouse click on indicator 1206.

Figure 13:
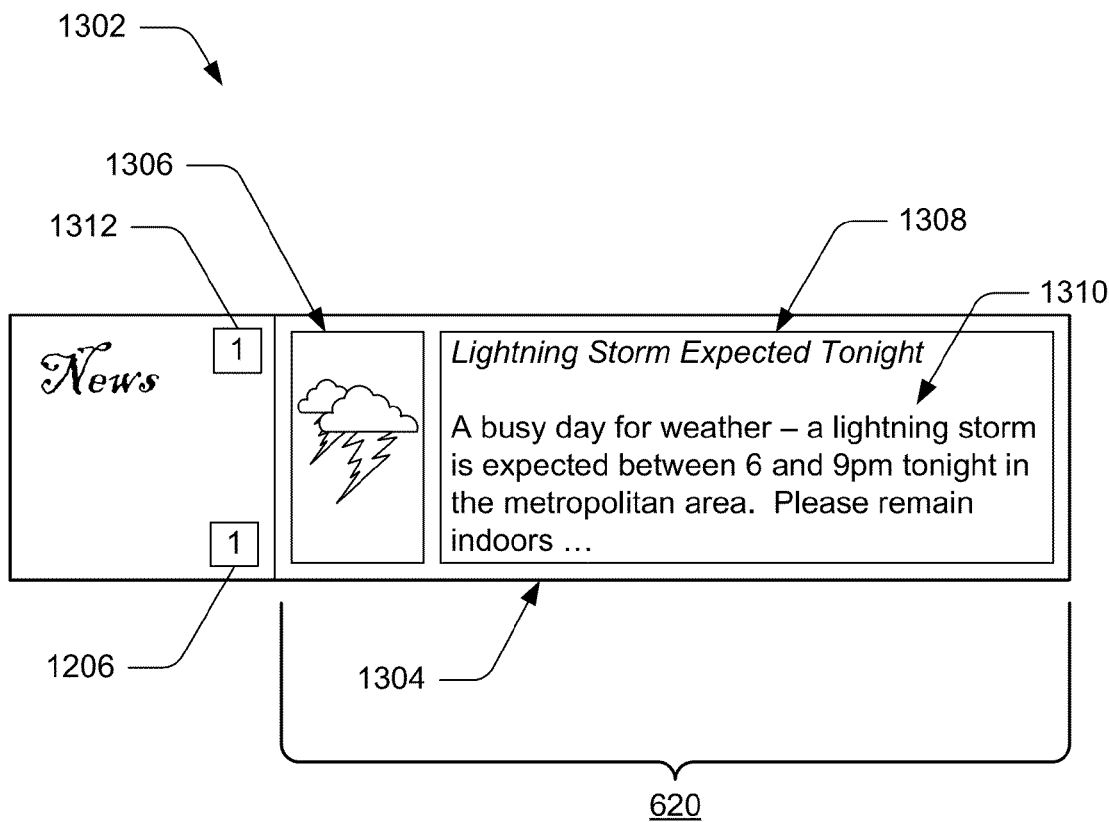
FIG. 13 illustrates an update to content of the tile of FIG. 12 presented responsive to the selection to browse content.

Block 1108 presents other content within the tile or visually associated with the tile responsive to the selection. Concluding the ongoing example, consider an updated version of tile 602 shown in FIG. 13 as updated tile 1302. Here content associated with another of the multiple content changes for the news application is shown generally at 1304 within the tile at content presentation area 620 and specifically with an image 1306, a title 1308, and a first portion of a body of the article at 1310. Note the change to indicator 1206 and addition of previous content indicator 1312. Indicator 1206 shows how many other content changes can be viewed (here one more article). Indicator 1312 indicates a number of content changes that have already been presented. Selection to return to the weather satellite article, for example, can be selected through a gesture opposite to that of gesture 1202 or by selecting indicator 1312, to name just a few.

Figure 14:
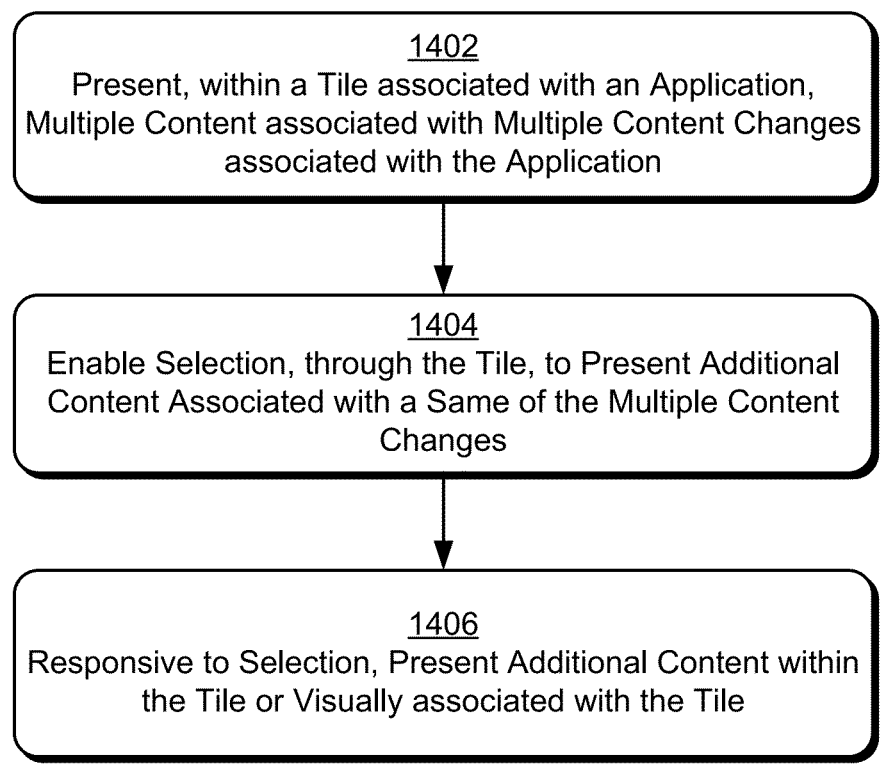
FIG. 14 illustrates an example method enabling presentation of multiple content changes associated with an application through a tile of a user interface.

FIG. 14 depicts a method 1400 enabling presentation of multiple content changes associated with an application through a tile of a user interface. This and the other methods described herein may operate separately or in conjunction with each other. In portions of the following discussion reference may be made to environment 100 of FIG. 1 and as detailed in FIGS. 2-4, reference to which is made for example only.

Block 1402 presents, within a tile associated with an application, multiple content associated with multiple content changes of the application. Numerous examples of this are shown in user interface 600, such as tile 622 of FIGS. 6 and 8.

Consider again tile 622 as illustrated in FIG. 8, which shows application-identifying area 802 and content presentation area 804. Content presentation area 804 includes four selectable sections reporting changes, sections 806, 808, 810, and 812. Each of selectable sections 806, 808, and 810 reports content associated with a content change, here each a sender and a subject line of an email. Section 812 reports five changes, here that five other emails have also been received since the email application was last viewed by the user.

Block 1404 enables selection, through the tile, to present additional content. This additional content is associated with one of the multiple content changes that is already shown in part in the tile. Reporter 210, for example, can enable selection to expand the content coverage of one of the multiple content changes partially presented in the tile.

Block 1406 presents additional content associated with one of the same content changes already shown in the tile responsive to selection. Continuing the ongoing example, consider again FIG. 8, which illustrates selection by gesture 814. This selection, similar to as described in the context of method 500 above, is for presentation of additional content for a content change associated with the email application, here through section 808 to present more of the content associated with the email from Sue.

Reporter 210 may present this additional content within or visually associated with the tile. Content shown visually associated with a tile is illustrated at 1002 as part of user interface 600 of FIG. 10. This selection can be enabled in one or more of the numerous example selections described above, some of which displace other content of the tile or are superimposed over the tile and/or other tiles if included in the user interface.

Figure 15:
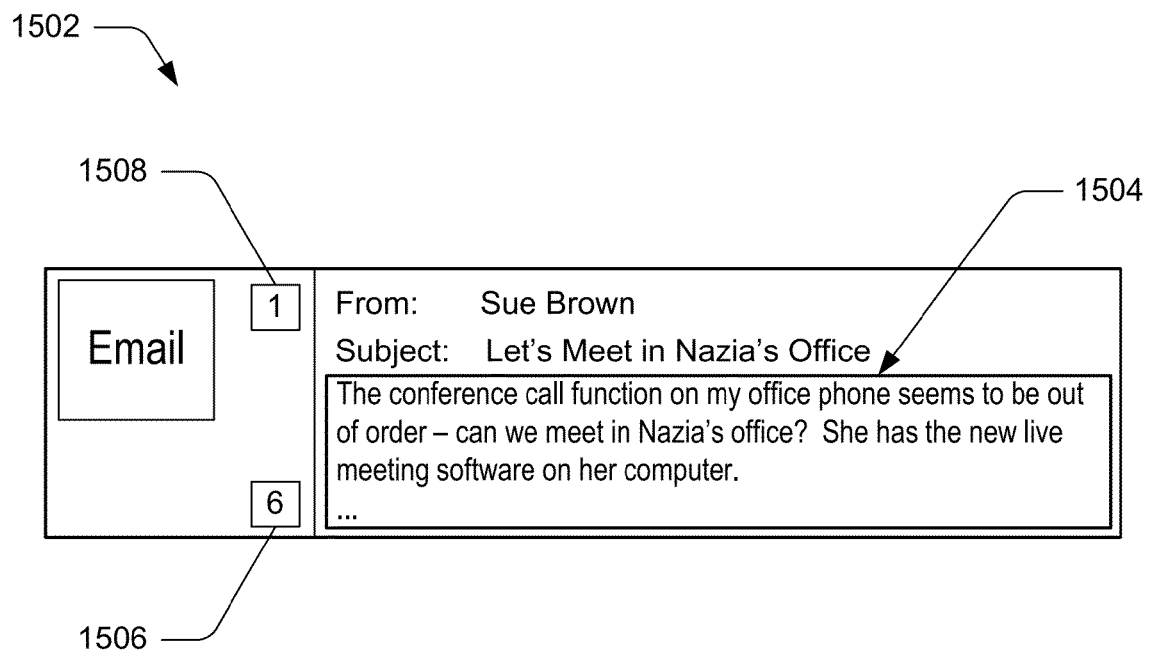
FIG. 15 illustrates presentation of additional content through a tile.

Additional content shown within a tile is illustrated at FIG. 15, which shows an altered version of tile 622 as altered tile 1502. Note that additional content 1504 is now presented, here some of the body of the email though not all of it is shown (the "Thanks, Sue" is missing but shown as missing with " . . . "). More or all of the content can further be selected through the tile or otherwise, such as with a gesture similar to that of FIG. 12 at gesture 1202 with direction shown at arrow 1204.

As shown in numerous example figures herein, a tile may be enlarged to better show details of the tile. This enlarging may be responsive to a user selection to enlarge a tile enabled by reporter 210, or responsive to another selection, such as to present different or additional content or on selection of a selectable indicator of a tile.

Note also that other content can be selected similarly as described in part in method 1100, namely through selection of indicators to move up or down through content changes. These indicators are shown in FIG. 15 at 1506 and 1508.

In addition to these methods 500, 1100, and 1400, the techniques enable still other functions and methods, including those illustrated below.

Figure 16:
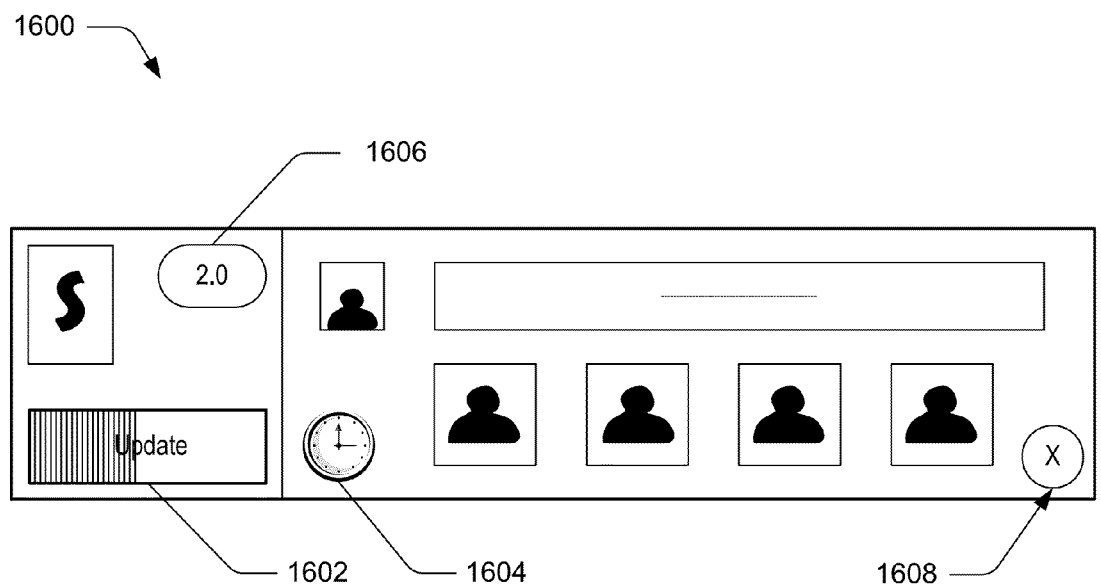
FIG. 16 illustrates an example tile having various indicators.

FIG. 16 illustrates an example tile 1600 as an aid in describing some of the many additional and/or alternative embodiments of the techniques. These additional and/or alternative embodiments may be used as part of, in additional to, or alternatively to those set forth above.

Tile 1600 includes indicators presenting various types of information about an associated application. Examples include an installation indicator 1602, an expiration indicator 1604, a software update indicator 1606, and an execution status indicator 1608. Installation indicator 1602 presents progress on installing the application associated with tile 1600 or progress on installing an update to the application (shown here). Expiration indicator 1604 presents an amount of time or number of uses before the application expires (e.g., a trial use or subscription expiring). Software update indicator 1606 indicates that an update is available. Execution status indicator 1608 indicates whether or not the application is currently executing. Each of these indicators may include a graphic and/or text.

The preceding discussion describes methods for presenting an application change through a tile as well as other methods. These methods are shown as sets of blocks that specify operations performed but are not necessarily limited to the order shown for performing the operations by the respective blocks.

Aspects of these methods may be implemented in hardware (e.g., fixed logic circuitry), firmware, software, manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable memory devices, both local and/or remote to a computer processor. The methods may also be practiced in a distributed computing environment by multiple computing devices.

These techniques may be embodied on one or more of the entities shown in environment 100 of FIG. 1 (and as detailed in FIGS. 2-4) and/or example device 1700 described below, which may be further divided, combined, and so on. Thus, environment 100 and/or device 1700 illustrate some of many possible systems or apparatuses capable of employing the described techniques. The entities of environment 100 and/or device 1700 generally represent software, firmware, hardware, whole devices or networks, or a combination thereof. In the case of a software implementation, for instance, the entities (e.g., reporter 210 of FIG. 2, report generator 306 of FIG. 3, and compiler module 406 of FIG. 4) represent program code that performs specified tasks when executed on a processor (e.g., processor(s) 202, 302, and 402, respectively). The program code can be stored in one or more computer-readable memory devices, such as computer-readable storage media 204, 304, or 404 or computer-readable media 1714 of FIG. 17. The features and techniques described herein are platform-independent, meaning that they may be implemented on a variety of commercial computing platforms having a variety of processors.

Example Apparatus

Figure 17:
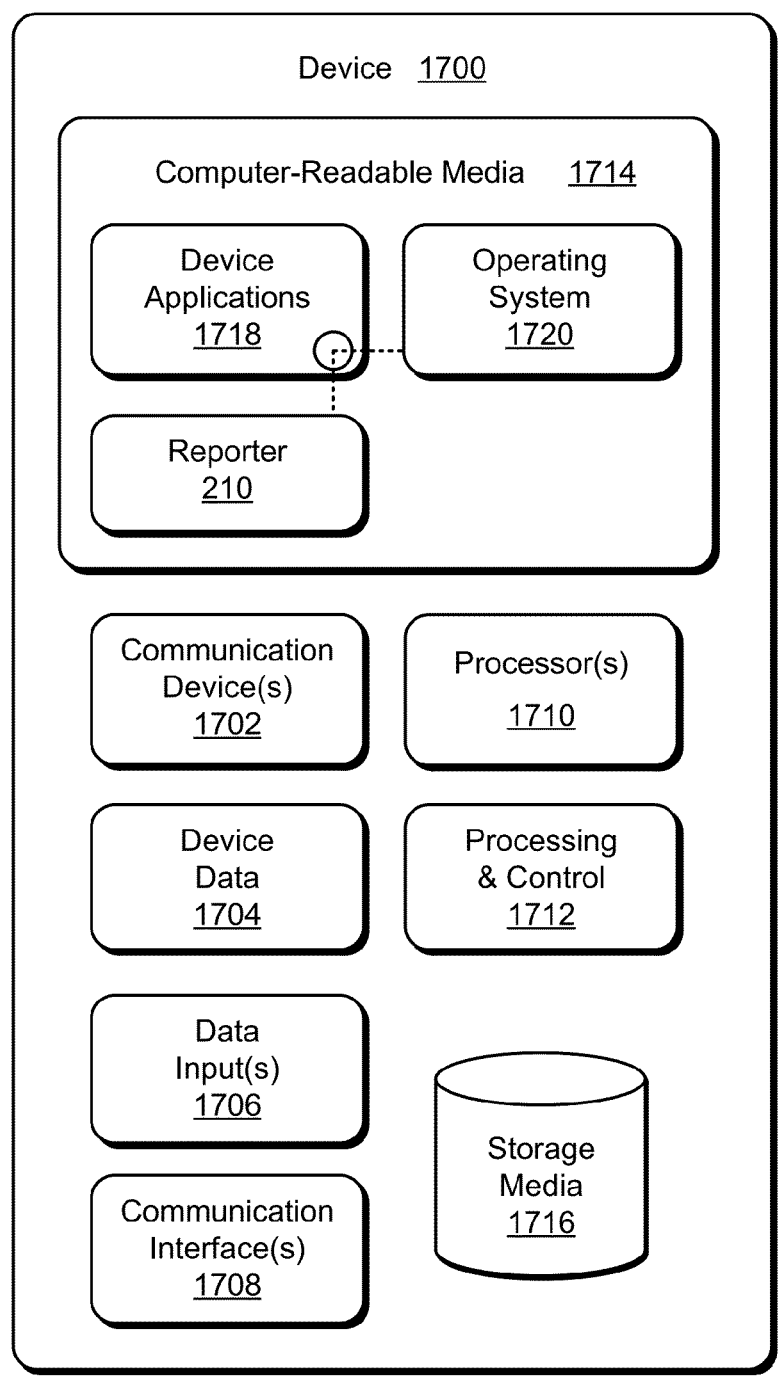
FIG. 17 illustrates an example device in which techniques for presenting an application change through a tile can be implemented.

FIG. 17 illustrates an apparatus having various components, here as part of, or containing, an example device 1700, which can be implemented as any type of client, server, and/or computing device as described with reference to the previous FIGS. 1-16 to implement techniques for presenting an application change through a tile. In embodiments, device 1700 can be implemented as one or a combination of a wired and/or wireless device, as a form of television client device (e.g., television set-top box, digital video recorder (DVR), etc.), consumer device, computer device, server device, portable computer device, user device, communication device, video processing and/or rendering device, appliance device, gaming device, electronic device, and/or as another type of device. Device 1700 may also be associated with a user (e.g., a person) and/or an entity that operates the device such that a device describes logical devices that include users, software, firmware, and/or a combination of devices.

Device 1700 includes communication devices 1702 that enable wired and/or wireless communication of device data 1704 (e.g., received data, data that is being received, data scheduled for broadcast, data packets of the data, etc.). The device data 1704 or other device content can include configuration settings of the device, media content stored on the device, and/or information associated with a user of the device. Media content stored on device 1700 can include any type of audio, video, and/or image data. Device 1700 includes one or more data inputs 1706 via which any type of data, media content, and/or inputs can be received, such as user-selectable inputs, messages, music, television media content, recorded video content, and any other type of audio, video, and/or image data received from any content and/or data source.

Device 1700 also includes communication interfaces 1708, which can be implemented as any one or more of a serial and/or parallel interface, a wireless interface, any type of network interface, a modem, and as any other type of communication interface. The communication interfaces 1708 provide a connection and/or communication links between device 1700 and a communication network by which other electronic, computing, and communication devices communicate data with device 1700.

Device 1700 includes one or more processors 1710 (e.g., any of microprocessors, controllers, and the like), which process various computer-executable instructions to control the operation of device 1700 and to implement techniques for presenting an application change through a tile. Alternatively or in addition, device 1700 can be implemented with any one or combination of hardware, firmware, or fixed logic circuitry that is implemented in connection with processing and control circuits which are generally identified at 1712. Although not shown, device 1700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 1700 also includes computer-readable storage media 1714, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 1700 can also include a mass storage media device 1716.

Computer-readable storage media 1714 provides data storage mechanisms to store the device data 1704, as well as various device applications 1718 and any other types of information and/or data related to operational aspects of device 1700. For example, an operating system 1720 can be maintained as a computer application with the computer-readable storage media 1714 and executed on processors 1710. The device applications 1718 may include a device manager, such as any form of a control application, software application, signal-processing and control module, code that is native to a particular device, a hardware abstraction layer for a particular device, and so on.

The device applications 1718 also include any system components or modules to implement techniques for presenting an application change through a tile. In this example, the device applications 1718 can include reporter 210 and applications 212.

CONCLUSION

Although embodiments of techniques and apparatuses for presenting an application change through a tile have been described in language specific to features and/or methods, it is to be understood that the subject of the appended claims is not necessarily limited to the specific features or methods described. Rather, the specific features and methods are disclosed as example implementations for presenting an application change through a tile.

What is claimed is:

1. A computing device comprising:
one or more computer processors; and
one or more computer-readable storage devices having instructions stored thereon that, responsive to execution by the one or more computer processors, implements a reporter configured to:
present an application-selectable user interface having multiple, selectable tiles associated with multiple applications, respectively, one of the multiple selectable tiles reporting a change associated with the application to which the one of the multiple selectable tiles is associated and within a selectable area of the one of the multiple selectable tiles;
receive selection of the selectable area of the one of the multiple selectable tiles in which the change associated with the application is reported; and
responsive to selection of the selectable area of the selected tile, present the selected application with content associated with the change.

2. The computing device of claim 1, wherein presentation of the selected application with content associated with the change presents an interface superimposed over the application-selectable user interface.

3. The computing device of claim 1, wherein reporting the change presents a portion of the content associated with the change.

4. The computing device of claim 3, wherein presentation of the selected application with the content associated with the change includes the portion of the content associated with the change and additional content associated with the change, the portion of the content and the additional content in a same interface associated with the selected application.

5. The computing device of claim 1, wherein presentation of the selected application with content associated with the change presents a webpage having a full representation of the content.

6. The computing device of claim 1, wherein presentation of the selected application with content associated with the change does not present a default or home interface associated with the application.

7. The computing device of claim 1, wherein presentation of the selected application with content associated with the change executes or launches the selected application.

8. The computing device of claim 1, wherein presentation of the selected application with content associated with the change hides the application-selectable user interface and presents an interface associated with the application in a different environment.

9. The computing device of claim 1, wherein the selected application, wherein the selected application, when selected, is not executing, and wherein presentation of the selected application includes launching the selected application.

10. The computing device of claim 1, wherein the reporter is further configured to:
present, within the application-selectable user interface another of the multiple selectable tiles associated with multiple applications, the other of the multiple selectable tiles having a selectable application-identification area, the selectable application-identification area presenting an identifier associated with the application to which the other of the multiple, selectable tiles is associated;
receive selection of the selectable application-identification area of the other of the multiple selectable tiles; and
responsive to selection of selectable application-identification area of the other of the multiple selectable tiles, launch the other of the multiple selectable tiles in a default or home interface.

11. The computing device of claim 10, wherein the other of the multiple selectable tiles includes a selectable content area showing a content change and the launch in the default or home interface does not present the content change.

12. A computing device comprising:
one or more computer processors; and
one or more computer-readable storage devices having instructions stored thereon that, responsive to execution by the one or more computer processors, implements a reporter configured to:
present an application-selectable user interface having multiple, selectable tiles associated with multiple applications, respectively, two or more of the multiple selectable tiles reporting a change associated with the application to which each of the two or more of the multiple selectable tiles is associated, the reporting without necessitating execution of the applications for which each of the changes is associated;
receive selection of one of the multiple selectable tiles in which the change associated with the application is reported; and
responsive to selection of the selected tile, present the selected application with content associated with the change.

13. The computing device of claim 12, wherein presentation of the selected application with content associated with the change launches the selected application.

14. The computing device of claim 12, wherein presentation of the selected application with content associated with the change presents an interface superimposed over the application-selectable user interface.

15. The computing device of claim 12, wherein presentation of the selected application with content associated with the change hides the application-selectable user interface and presents an interface associated with the application in a different environment.

16. A computer-implemented method comprising:
receiving a first report for a first application, the first report indicating a first content change to the first application;
receiving a second report for a second application, the second report indicating a second content change to the second application;
presenting an application-selectable user interface having first and second selectable tiles, the first selectable tile associated with the first application and presenting, within the first selectable tile, first content associated with the first content change, the second selectable tile associated with the second application and presenting, within the second selectable tile, second content associated with the second content change;
receiving selection of the first or second selectable tile; and
responsive to selection of the selected first or second tile, presenting additional content associated with the first content change or the second content change for the selected first or second application associated with the first or second selected tile.

17. The computer-implemented method of claim 16, wherein presenting the additional content associated with the first content change or the second content change presents the additional content within or associated with the first or second selected tile.

18. The computer-implemented method of claim 16, wherein the selection of the selected first or second tile is through a selectable area presenting the first content change or the second content change and within the first or second selected tile.

19. The computer-implemented method of claim 16, wherein presenting the additional content associated with the first content change or the second content change for the selected first or second application associated with the first or second selected tile of the selected application hides the application-selectable user interface and presents an interface associated with the application in a different environment.

20. The computer-implemented method of claim 16, wherein presenting the additional content associated with the first content change or the second content change for the selected first or second application associated with the first or second selected tile of the selected application presents an interface superimposed over the application-selectable user interface.

* * * * *